US009686582B2

(12) United States Patent
Sirpal et al.

(10) Patent No.: US 9,686,582 B2
(45) Date of Patent: Jun. 20, 2017

(54) SYSTEMS AND METHODS FOR MANAGING DATA IN AN INTELLIGENT TELEVISION

(71) Applicant: Flextronics AP, LLC, San Jose, CA (US)

(72) Inventors: Sanjiv Sirpal, Oakville (CA); Salvador Soto, Toronto (CA); Mohammed Selim, Oakville (CA); Alexander de Paz, Burlington (CA); Fuqu Wu, Burlington (CA); Robert Csiki, Markham (CA); Eduardo Diego Torres Milano, Burlington (CA)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 14/839,679

(22) Filed: Aug. 28, 2015

(65) Prior Publication Data
US 2016/0057502 A1 Feb. 25, 2016

Related U.S. Application Data

(63) Continuation of application No. 13/969,505, filed on Aug. 17, 2013, now abandoned, and a continuation of
(Continued)

(51) Int. Cl.
*H04N 7/173* (2011.01)
*H04N 21/431* (2011.01)
(Continued)

(52) U.S. Cl.
CPC ......... *H04N 21/4316* (2013.01); *G06F 3/017* (2013.01); *G06F 3/0481* (2013.01);
(Continued)

(58) Field of Classification Search
CPC ....... H04N 21/47205; H04N 21/23109; H04N 21/4332
(Continued)

(56) References Cited

U.S. PATENT DOCUMENTS

| 4,284,849 A | 8/1981 | Anderson et al. |
| 5,867,227 A | 2/1999 | Yamaguchi |

(Continued)

FOREIGN PATENT DOCUMENTS

| EP | 1031929 | 8/2000 |
| EP | 1067458 | 1/2001 |

(Continued)

OTHER PUBLICATIONS

Tvonicsuk "Tvonics: How to use the EPG search function." 1 pages retrieved from the internet on Nov. 11, 2013 from [www.youtube.com/watch?v=H8euZ0lydo].
(Continued)

*Primary Examiner* — Pankaj Kumar
*Assistant Examiner* — Franklin Andramuno
(74) *Attorney, Agent, or Firm* — Sheridan Ross P.C.

(57) ABSTRACT

An intelligent television can store and retrieve data about various functions of the television or associated with user behavior. The stored data streamlines the processes of providing electronic programming guide information, providing search results, providing statistics about content, providing channel information, etc. The unique set of data services in the intelligent television receive, store, manage, and retrieve the data for various of the applications or components.

20 Claims, 46 Drawing Sheets

Related U.S. Application Data application No. 13/969,506, filed on Aug. 17, 2013, now abandoned, and a continuation of application No. 13/969,507, filed on Aug. 17, 2013, now Pat. No. 9,167,186, and a continuation of application No. 13/969,508, filed on Aug. 17, 2013, now abandoned, and a continuation of application No. 13/969,510, filed on Aug. 17, 2013, now Pat. No. 9,264,775.

(60) Provisional application No. 61/684,672, filed on Aug. 17, 2012, provisional application No. 61/702,650, filed on Sep. 18, 2012, provisional application No. 61/697,710, filed on Sep. 6, 2012, provisional application No. 61/700,182, filed on Sep. 12, 2012, provisional application No. 61/736,692, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013.

(51) Int. Cl.

| | |
|---|---|
| *H04N 21/422* | (2011.01) |
| *H04N 21/462* | (2011.01) |
| *H04N 1/00* | (2006.01) |
| *H04N 21/231* | (2011.01) |
| *H04N 17/04* | (2006.01) |
| *H04N 5/44* | (2011.01) |
| *H04N 21/482* | (2011.01) |
| *H04N 5/50* | (2006.01) |
| *H04N 21/43* | (2011.01) |
| *H04N 21/262* | (2011.01) |
| *H04N 21/437* | (2011.01) |
| *H04N 21/81* | (2011.01) |
| *H04N 21/442* | (2011.01) |
| *H04N 21/485* | (2011.01) |
| *H04N 21/472* | (2011.01) |
| *H04N 21/4788* | (2011.01) |
| *H04N 21/475* | (2011.01) |
| *H04N 21/84* | (2011.01) |
| *H04N 21/478* | (2011.01) |
| *H04N 21/8358* | (2011.01) |
| *H04N 5/445* | (2011.01) |
| *G06F 3/0481* | (2013.01) |
| *H04N 21/488* | (2011.01) |
| *H04N 21/61* | (2011.01) |
| *H04N 21/439* | (2011.01) |
| *H04N 21/435* | (2011.01) |
| *H04N 21/432* | (2011.01) |
| *H04N 21/47* | (2011.01) |
| *H04L 12/58* | (2006.01) |
| *H04N 21/258* | (2011.01) |
| *H04N 21/45* | (2011.01) |
| *G06F 3/01* | (2006.01) |
| *G06F 3/0488* | (2013.01) |
| *H04N 5/45* | (2011.01) |
| *H04N 21/4782* | (2011.01) |
| *H04N 21/2543* | (2011.01) |
| *H04N 21/441* | (2011.01) |
| *H04N 21/2187* | (2011.01) |
| *H04N 21/4415* | (2011.01) |
| *H04N 21/658* | (2011.01) |
| *H04N 21/235* | (2011.01) |
| *H04N 21/426* | (2011.01) |
| *G06F 3/0484* | (2013.01) |
| *H04N 21/414* | (2011.01) |
| *H04N 21/433* | (2011.01) |

(52) U.S. Cl.
CPC ...... *G06F 3/04817* (2013.01); *G06F 3/04842* (2013.01); *G06F 3/04883* (2013.01); *H04L 51/32* (2013.01); *H04N 1/00448* (2013.01); *H04N 5/44* (2013.01); *H04N 5/4401* (2013.01); *H04N 5/4403* (2013.01); *H04N 5/445* (2013.01); *H04N 5/44591* (2013.01); *H04N 5/45* (2013.01); *H04N 5/50* (2013.01); *H04N 17/04* (2013.01); *H04N 21/2187* (2013.01); *H04N 21/235* (2013.01); *H04N 21/23109* (2013.01); *H04N 21/2543* (2013.01); *H04N 21/25808* (2013.01); *H04N 21/25891* (2013.01); *H04N 21/26291* (2013.01); *H04N 21/414* (2013.01); *H04N 21/4221* (2013.01); *H04N 21/42204* (2013.01); *H04N 21/42207* (2013.01); *H04N 21/42222* (2013.01); *H04N 21/42225* (2013.01); *H04N 21/42684* (2013.01); *H04N 21/432* (2013.01); *H04N 21/433* (2013.01); *H04N 21/435* (2013.01); *H04N 21/4307* (2013.01); *H04N 21/437* (2013.01); *H04N 21/4312* (2013.01); *H04N 21/4396* (2013.01); *H04N 21/441* (2013.01); *H04N 21/442* (2013.01); *H04N 21/4415* (2013.01); *H04N 21/44204* (2013.01); *H04N 21/44213* (2013.01); *H04N 21/44222* (2013.01); *H04N 21/4532* (2013.01); *H04N 21/462* (2013.01); *H04N 21/4622* (2013.01); *H04N 21/47* (2013.01); *H04N 21/472* (2013.01); *H04N 21/475* (2013.01); *H04N 21/478* (2013.01); *H04N 21/4753* (2013.01); *H04N 21/4755* (2013.01); *H04N 21/4756* (2013.01); *H04N 21/4782* (2013.01); *H04N 21/4788* (2013.01); *H04N 21/47202* (2013.01); *H04N 21/47205* (2013.01); *H04N 21/482* (2013.01); *H04N 21/485* (2013.01); *H04N 21/488* (2013.01); *H04N 21/4821* (2013.01); *H04N 21/4823* (2013.01); *H04N 21/4826* (2013.01); *H04N 21/4828* (2013.01); *H04N 21/4858* (2013.01); *H04N 21/4882* (2013.01); *H04N 21/6125* (2013.01); *H04N 21/6175* (2013.01); *H04N 21/6582* (2013.01); *H04N 21/8126* (2013.01); *H04N 21/8133* (2013.01); *H04N 21/8166* (2013.01); *H04N 21/8173* (2013.01); *H04N 21/8358* (2013.01); *H04N 21/84* (2013.01); *G06F 2203/04804* (2013.01); *H04N 21/42219* (2013.01); *H04N 21/4332* (2013.01); *H04N 2005/4407* (2013.01); *H04N 2005/4414* (2013.01); *H04N 2005/4432* (2013.01)

(58) Field of Classification Search
USPC .................................................. 725/93, 105
See application file for complete search history.

(56) References Cited

U.S. PATENT DOCUMENTS

| | | |
|---|---|---|
| 5,964,839 A | 10/1999 | Johnson et al. |
| 6,111,614 A | 8/2000 | Mugura et al. |
| 6,615,248 B1 | 9/2003 | Smith |
| 7,228,556 B2 | 6/2007 | Beach et al. |
| 7,363,591 B2 | 4/2008 | Goldthwaite et al. |
| 7,506,350 B2 | 3/2009 | Johnson |
| 7,543,320 B2 | 6/2009 | Schein et al. |
| 7,623,933 B2 | 11/2009 | Sarosi et al. |
| 7,668,816 B2 | 2/2010 | Morgan et al. |
| 7,698,606 B2 | 4/2010 | Ladd et al. |
| 7,805,634 B2 | 9/2010 | Balazich et al. |
| 7,822,716 B2 | 10/2010 | Lee et al. |
| 8,065,390 B2 | 11/2011 | Cheng |
| 8,089,455 B1 | 1/2012 | Wieder |
| 8,151,215 B2 | 4/2012 | Baurmann et al. |
| 8,201,104 B2 | 6/2012 | Yamamoto et al. |
| 8,473,976 B2 | 6/2013 | Udani |
| 8,683,519 B2 | 3/2014 | McCarthy et al. |
| 8,863,198 B2 | 10/2014 | Sirpal et al. |
| 9,021,517 B2 | 4/2015 | Selim |
| 9,055,254 B2 | 6/2015 | Selim |
| 9,055,255 B2 | 6/2015 | Burdzinski et al. |
| 9,066,040 B2 | 6/2015 | Selim et al. |
| 9,077,928 B2 | 7/2015 | Milano et al. |
| 9,106,866 B2 | 8/2015 | de Paz et al. |
| 9,118,864 B2 | 8/2015 | Sirpal et al. |
| 9,167,186 B2 | 10/2015 | Csiki |
| 9,167,187 B2 | 10/2015 | Dourado et al. |
| 9,264,775 B2 | 2/2016 | Milano |
| 2002/0007485 A1 | 1/2002 | Rodriguez et al. |
| 2002/0049970 A1 | 4/2002 | Park |
| 2003/0003876 A1 | 1/2003 | Rumsey |
| 2003/0110503 A1 | 6/2003 | Perkes |
| 2003/0118323 A1 | 6/2003 | Ismail et al. |
| 2003/0177498 A1 | 9/2003 | Ellis et al. |
| 2003/0182659 A1 | 9/2003 | Ellis et al. |
| 2003/0208763 A1 | 11/2003 | McElhatten et al. |
| 2004/0093616 A1 | 5/2004 | Johnson |
| 2004/0103120 A1 | 5/2004 | Fickle et al. |
| 2004/0148362 A1 | 7/2004 | Friedman |
| 2004/0211282 A1 | 10/2004 | Kim |
| 2005/0015804 A1 | 1/2005 | LaJoie et al. |
| 2005/0022237 A1 | 1/2005 | Nomura |
| 2005/0149964 A1 | 7/2005 | Thomas et al. |
| 2005/0165918 A1 | 7/2005 | Wantanabe et al. |
| 2005/0188318 A1 | 8/2005 | Tamir et al. |
| 2005/0188402 A1 | 8/2005 | de Andrade et al. |
| 2005/0204382 A1 | 9/2005 | Ellis |
| 2005/0232210 A1 | 10/2005 | Karaoguz et al. |
| 2005/0289603 A1 | 12/2005 | Cezeaux et al. |
| 2006/0031875 A1 | 2/2006 | Yu |
| 2006/0090183 A1 | 4/2006 | Zito et al. |
| 2006/0101504 A1 | 5/2006 | Aravamudan et al. |
| 2006/0143674 A1 | 6/2006 | Jones et al. |
| 2006/0158838 A1 | 7/2006 | Kinoshita et al. |
| 2006/0225109 A1 | 10/2006 | Seo |
| 2006/0248557 A1 | 11/2006 | Stark et al. |
| 2006/0262116 A1 | 11/2006 | Moshiri et al. |
| 2007/0028282 A1 | 2/2007 | Kooijmans et al. |
| 2007/0050733 A1 | 3/2007 | Lee et al. |
| 2007/0143809 A1 | 6/2007 | Chen et al. |
| 2007/0154163 A1 | 7/2007 | Cordray |
| 2007/0192715 A1 | 8/2007 | Kataria et al. |
| 2007/0250864 A1 | 10/2007 | Diaz Perez |
| 2008/0086745 A1 | 4/2008 | Knudson et al. |
| 2008/0092198 A1 | 4/2008 | Hutten |
| 2008/0114794 A1 | 5/2008 | Craner |
| 2008/0114861 A1 | 5/2008 | Gildred |
| 2008/0133525 A1 | 6/2008 | Ott |
| 2008/0141307 A1 | 6/2008 | Whitehead |
| 2008/0163307 A1 | 7/2008 | Coburn et al. |
| 2008/0177828 A1 | 7/2008 | Accarie et al. |
| 2008/0276279 A1 | 11/2008 | Gossweiler et al. |
| 2008/0307457 A1 | 12/2008 | Yang et al. |
| 2009/0013350 A1 | 1/2009 | Ohlfs et al. |
| 2009/0064222 A1 | 3/2009 | Dawson et al. |
| 2009/0106793 A1 | 4/2009 | Tecot et al. |
| 2009/0150379 A1 | 6/2009 | Park et al. |
| 2009/0158326 A1 | 6/2009 | Hunt et al. |
| 2009/0160764 A1 | 6/2009 | Myllymäki |
| 2009/0177981 A1 | 7/2009 | Christie et al. |
| 2009/0179989 A1 | 7/2009 | Bessone et al. |
| 2009/0213079 A1 | 8/2009 | Segal et al. |
| 2009/0235311 A1 | 9/2009 | Michel et al. |
| 2009/0293078 A1 | 11/2009 | Pirani et al. |
| 2009/0293079 A1 | 11/2009 | McKee et al. |
| 2010/0071019 A1 | 3/2010 | Blanchard et al. |
| 2010/0086277 A1 | 4/2010 | Craner |
| 2010/0107112 A1 | 4/2010 | Jennings et al. |
| 2010/0161506 A1 | 6/2010 | Bosenick et al. |
| 2010/0172407 A1 | 7/2010 | Ramaswamy |
| 2011/0022450 A1 | 1/2011 | Meredith |
| 2011/0023608 A1 | 2/2011 | Rueger |
| 2011/0041150 A1 | 2/2011 | Schein et al. |
| 2011/0055873 A1 | 3/2011 | Heo et al. |
| 2011/0060661 A1 | 3/2011 | Chai et al. |
| 2011/0067066 A1 | 3/2011 | Barton et al. |
| 2011/0072480 A1 | 3/2011 | Stone |
| 2011/0074591 A1 | 3/2011 | Arling et al. |
| 2011/0078745 A1 | 3/2011 | Macrae et al. |
| 2011/0119626 A1 | 5/2011 | Faenger et al. |
| 2011/0119702 A1 | 5/2011 | Jang et al. |
| 2011/0145881 A1 | 6/2011 | Hartman et al. |
| 2011/0154405 A1 | 6/2011 | Isaias |
| 2011/0161996 A1 | 6/2011 | Hamano et al. |
| 2011/0167452 A1 | 7/2011 | Baumgartner et al. |
| 2011/0179453 A1 | 7/2011 | Poniatowski |
| 2011/0187929 A1 | 8/2011 | Suzuki et al. |
| 2011/0191684 A1* | 8/2011 | Greenberg ............... G06F 3/01 715/719 |
| 2011/0213700 A1 | 9/2011 | Sant'Anselmo |
| 2011/0239253 A1 | 9/2011 | West et al. |
| 2011/0246495 A1 | 10/2011 | Mallinson |
| 2011/0273552 A1 | 11/2011 | Wang et al. |
| 2011/0273625 A1 | 11/2011 | McMahon et al. |
| 2011/0283236 A1* | 11/2011 | Beaumier ............. G07F 11/002 715/835 |
| 2011/0289067 A1 | 11/2011 | Jordan et al. |
| 2011/0289419 A1 | 11/2011 | Yu et al. |
| 2012/0011545 A1 | 1/2012 | Doets et al. |
| 2012/0030317 A1 | 2/2012 | Smyth et al. |
| 2012/0033950 A1 | 2/2012 | Cordray et al. |
| 2012/0042334 A1 | 2/2012 | Choi et al. |
| 2012/0060094 A1 | 3/2012 | Irwin et al. |
| 2012/0072952 A1 | 3/2012 | Vaysman et al. |
| 2012/0079096 A1 | 3/2012 | Cowan et al. |
| 2012/0096264 A1 | 4/2012 | Traversat et al. |
| 2012/0102530 A1 | 4/2012 | Quan |
| 2012/0133840 A1 | 5/2012 | Shirasuka et al. |
| 2012/0144416 A1 | 6/2012 | Wetzer et al. |
| 2012/0144422 A1 | 6/2012 | Han et al. |
| 2012/0144423 A1 | 6/2012 | Kim et al. |
| 2012/0147825 A1 | 6/2012 | Hassan et al. |
| 2012/0154449 A1 | 6/2012 | Ramagem et al. |
| 2012/0173979 A1 | 7/2012 | Lee |
| 2012/0200574 A1 | 8/2012 | Hill et al. |
| 2012/0210370 A1 | 8/2012 | Kim et al. |
| 2012/0218203 A1 | 8/2012 | Kanki |
| 2012/0221972 A1 | 8/2012 | Dougall et al. |
| 2012/0229320 A1 | 9/2012 | Yu |
| 2012/0257108 A1 | 10/2012 | Friedlander et al. |
| 2012/0260284 A1 | 10/2012 | Friedlander et al. |
| 2012/0284752 A1 | 11/2012 | Jung |
| 2012/0291068 A1 | 11/2012 | Khushoo et al. |
| 2013/0191869 A1 | 7/2013 | Sugiyama et al. |
| 2013/0238796 A1 | 9/2013 | Lentzitzky |
| 2013/0275519 A1 | 10/2013 | Nichols |
| 2013/0282839 A1 | 10/2013 | Alcala |
| 2013/0291015 A1 | 10/2013 | Pan |
| 2013/0332856 A1 | 12/2013 | Sanders et al. |
| 2014/0032718 A1* | 1/2014 | Berger ................... H04L 67/06 709/219 |
| 2014/0049651 A1 | 2/2014 | Voth |
| 2014/0049691 A1 | 2/2014 | Burdzinski et al. |

(56) References Cited

U.S. PATENT DOCUMENTS

| | | | |
|---|---|---|---|
| 2014/0049692 A1 | 2/2014 | Sirpal et al. | |
| 2014/0049693 A1 | 2/2014 | Selim et al. | |
| 2014/0052785 A1 | 2/2014 | Sirpal | |
| 2014/0052786 A1 | 2/2014 | de Paz | |
| 2014/0053177 A1 | 2/2014 | Voth | |
| 2014/0053178 A1 | 2/2014 | Voth et al. | |
| 2014/0053179 A1 | 2/2014 | Voth | |
| 2014/0053180 A1 | 2/2014 | Shoykher | |
| 2014/0053190 A1 | 2/2014 | Sirpal | |
| 2014/0053191 A1 | 2/2014 | Selim | |
| 2014/0053192 A1 | 2/2014 | Sirpal | |
| 2014/0053193 A1 | 2/2014 | Selim et al. | |
| 2014/0053194 A1 | 2/2014 | Shoykher et al. | |
| 2014/0053195 A1 | 2/2014 | Sirpal et al. | |
| 2014/0053196 A1 | 2/2014 | Selim | |
| 2014/0053197 A1 | 2/2014 | Shoykher et al. | |
| 2014/0053198 A1 | 2/2014 | Sirpal et al. | |
| 2014/0053200 A1 | 2/2014 | de Paz et al. | |
| 2014/0053202 A1 | 2/2014 | Selim | |
| 2014/0053205 A1 | 2/2014 | Sirpal et al. | |
| 2014/0053206 A1 | 2/2014 | Shoykher et al. | |
| 2014/0053207 A1 | 2/2014 | Shoykher et al. | |
| 2014/0053211 A1 | 2/2014 | Milano | |
| 2014/0053212 A1 | 2/2014 | Shoykher et al. | |
| 2014/0053222 A1 | 2/2014 | Shoykher et al. | |
| 2014/0053225 A1 | 2/2014 | Shoykher et al. | |
| 2014/0055673 A1 | 2/2014 | Sirpal et al. | |
| 2014/0059480 A1 | 2/2014 | de Paz et al. | |
| 2014/0059578 A1 | 2/2014 | Voth et al. | |
| 2014/0059589 A1 | 2/2014 | Sirpal | |
| 2014/0059596 A1 | 2/2014 | Dourado | |
| 2014/0059598 A1 | 2/2014 | Milano | |
| 2014/0059599 A1 | 2/2014 | Sirpal et al. | |
| 2014/0059600 A1 | 2/2014 | Dourado | |
| 2014/0059601 A1 | 2/2014 | Sirpal | |
| 2014/0059602 A1 | 2/2014 | Sirpal | |
| 2014/0059603 A1 | 2/2014 | Lee et al. | |
| 2014/0059605 A1 | 2/2014 | Sirpal et al. | |
| 2014/0059606 A1 | 2/2014 | Selim et al. | |
| 2014/0059609 A1 | 2/2014 | Dourado | |
| 2014/0059610 A1 | 2/2014 | Sirpal et al. | |
| 2014/0059614 A1 | 2/2014 | Shoykher et al. | |
| 2014/0059615 A1 | 2/2014 | Sirpal et al. | |
| 2014/0059635 A1 | 2/2014 | Sirpal et al. | |
| 2014/0059637 A1 | 2/2014 | Chen et al. | |
| 2014/0067954 A1 | 3/2014 | Sirpal | |
| 2014/0068673 A1 | 3/2014 | Sirpal et al. | |
| 2014/0068674 A1 | 3/2014 | Sirpal et al. | |
| 2014/0068683 A1 | 3/2014 | Selim et al. | |
| 2014/0068685 A1 | 3/2014 | Selim et al. | |
| 2014/0068689 A1 | 3/2014 | Sirpal et al. | |
| 2014/0075475 A1 | 3/2014 | Sirpal et al. | |
| 2014/0075476 A1 | 3/2014 | de Paz et al. | |
| 2014/0075479 A1 | 3/2014 | Soto et al. | |
| 2014/0075483 A1 | 3/2014 | de Paz et al. | |
| 2014/0075484 A1 | 3/2014 | Selim et al. | |
| 2014/0075487 A1 | 3/2014 | Selim et al. | |
| 2014/0115633 A1 | 4/2014 | Selim et al. | |
| 2014/0115641 A1* | 4/2014 | Zhang | H04N 21/2743 725/93 |
| 2015/0156548 A1 | 6/2015 | Sirpal et al. | |
| 2015/0156554 A1 | 6/2015 | Sirpal et al. | |
| 2015/0163537 A1 | 6/2015 | Sirpal et al. | |
| 2015/0172765 A1 | 6/2015 | Shoykher et al. | |
| 2015/0189390 A1 | 7/2015 | Sirpal et al. | |
| 2015/0201147 A1 | 7/2015 | Sirpal et al. | |
| 2015/0208135 A1 | 7/2015 | Sirpal et al. | |

FOREIGN PATENT DOCUMENTS

| | | |
|---|---|---|
| EP | 1770956 | 4/2007 |
| EP | 2328346 | 6/2011 |
| EP | 2487922 | 8/2012 |
| WO | WO 99/21308 | 4/1999 |
| WO | WO 01/06784 | 1/2001 |
| WO | WO 03/044755 | 5/2003 |
| WO | WO 2011/163481 | 12/2011 |
| WO | WO 2012/030024 | 3/2012 |
| WO | WO 2012/073027 | 6/2012 |
| WO | WO 2012/094247 | 7/2012 |
| WO | WO 2012/103121 | 8/2012 |

OTHER PUBLICATIONS

International Search Report and Written Opinion for International (PCT) Patent Application No. PCT/US2013/055340, mailed Feb. 10, 2014 10 pages.
International Preliminary Report on Patentability for International (PCT) Patent Application No. PCT/US2013/055340, mailed Feb. 26, 2015 8 pages.
Official Action for U.S. Appl. No. 13/969,505, mailed Jul. 15, 2014 7 pages.
Official Action for U.S. Appl. No. 13/969,505, mailed Feb. 24, 2015 9 pages.
Official Action for U.S. Appl. No. 13/969,505, mailed May 28, 2015 8 pages.
Official Action for U.S. Appl. No. 13/969,506, mailed Oct. 2, 2014 9 pages.
Official Action for U.S. Appl. No. 13/969,506, mailed Jan. 23, 2015 9 pages.
Official Action for U.S. Appl. No. 13/969,506, mailed Jul. 21, 2015 9 pages.
Official Action for U.S. Appl. No. 13/969,506, mailed Feb. 2, 2016 10 pages.
Official Action for U.S. Appl. No. 13/969,507, mailed Aug. 29, 2014 30 pages.
Official Action for U.S. Appl. No. 13/969,507, mailed Jan. 27, 2015 30 pages.
Notice of Allowance for U.S. Appl. No. 13/969,507, mailed Jun. 8, 2015 5 pages.
Official Action for U.S. Appl. No. 13/969,508, mailed Nov. 7, 2014 10 pages.
Official Action for U.S. Appl. No. 13/969,508, mailed Mar. 5, 2015 9 pages.
Official Action for U.S. Appl. No. 13/969,508, mailed Jan. 5, 2016 15 pages.
Official Action for U.S. Appl. No. 13/969,510, mailed Jun. 25, 2014 13 pages.
Official Action for U.S. Appl. No. 13/969,510, mailed Nov. 3, 2014 16 pages.
Official Action for U.S. Appl. No. 13/969,510, mailed Feb. 24, 2015 17 pages.
Notice of Allowance for U.S. Appl. No. 13/969,510, mailed Oct. 2, 2015 13 pages.
Official Action for U.S. Appl. No. 13/969,508, mailed Aug. 14, 2015 13 pages.

* cited by examiner

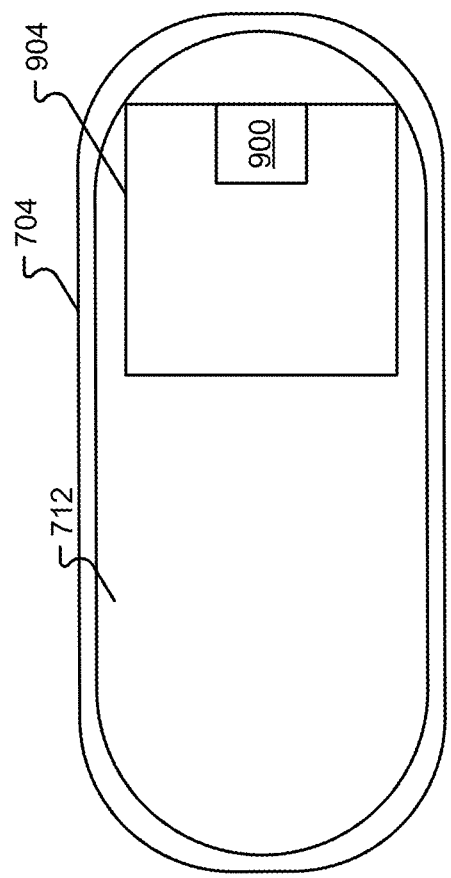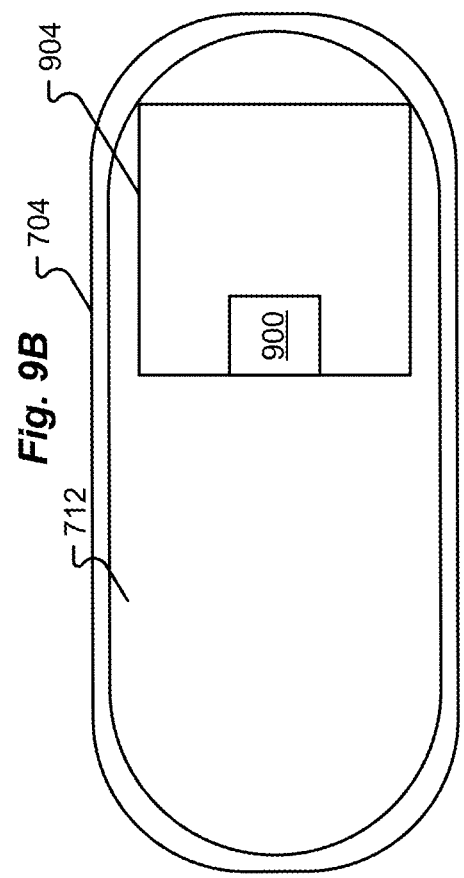

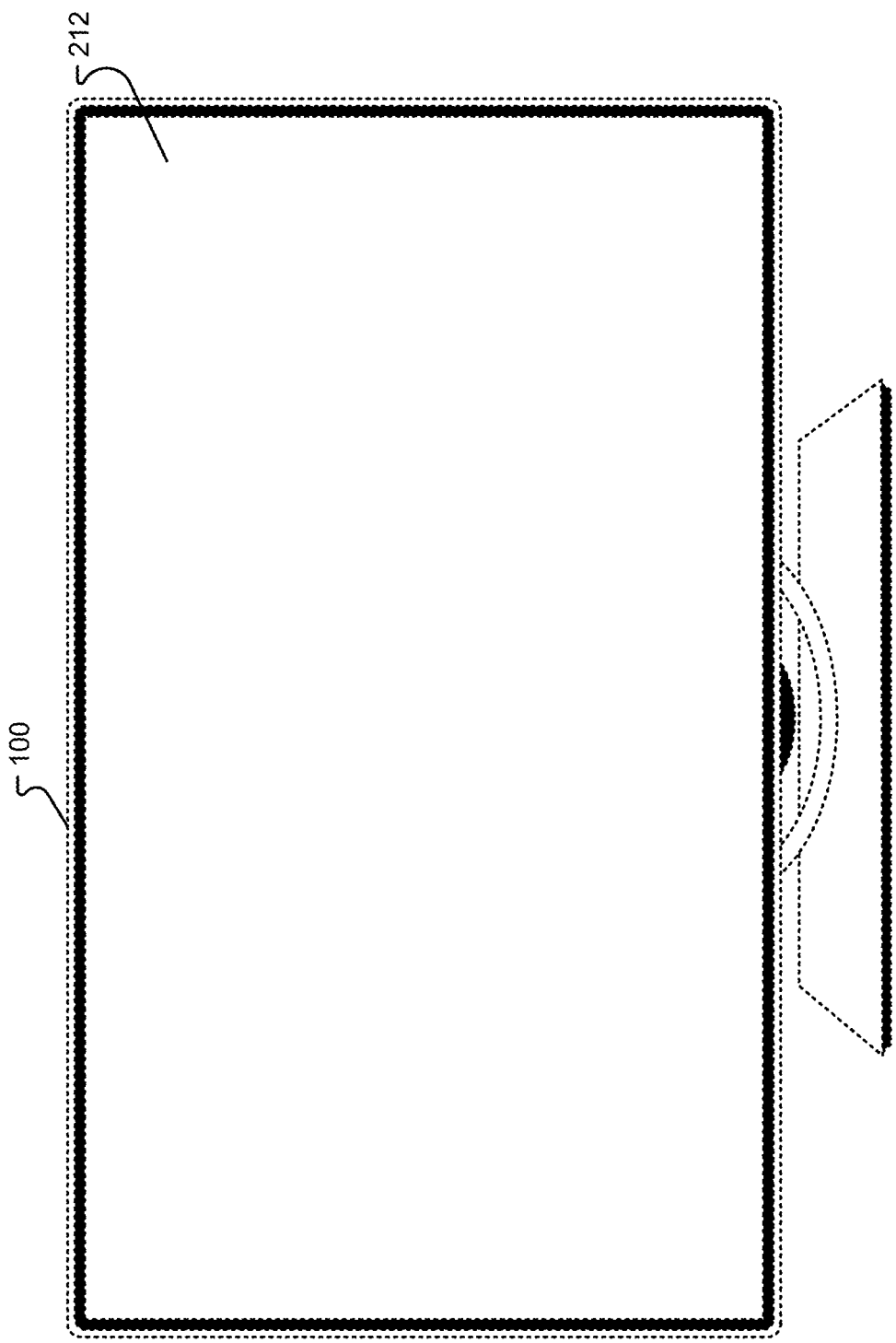

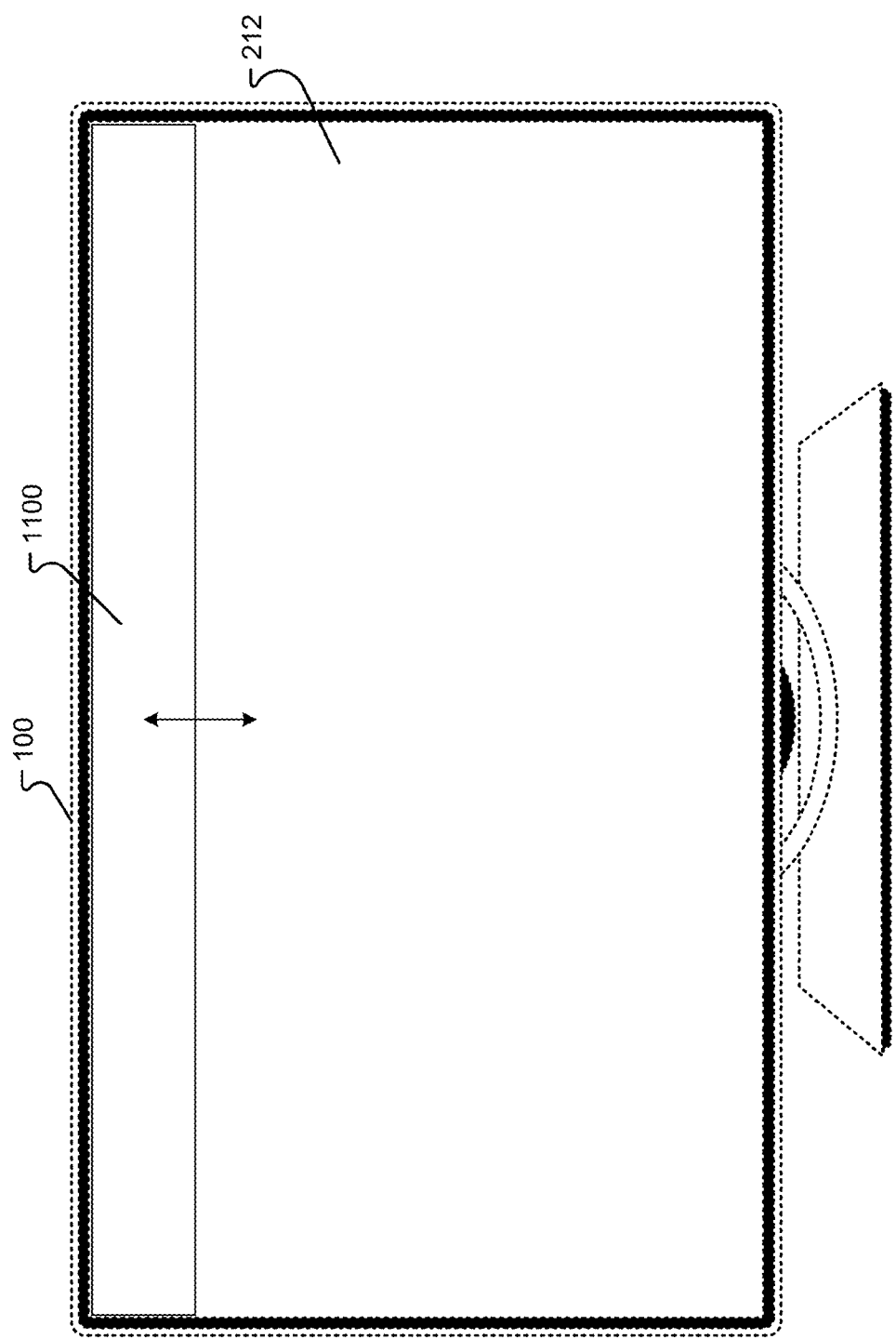

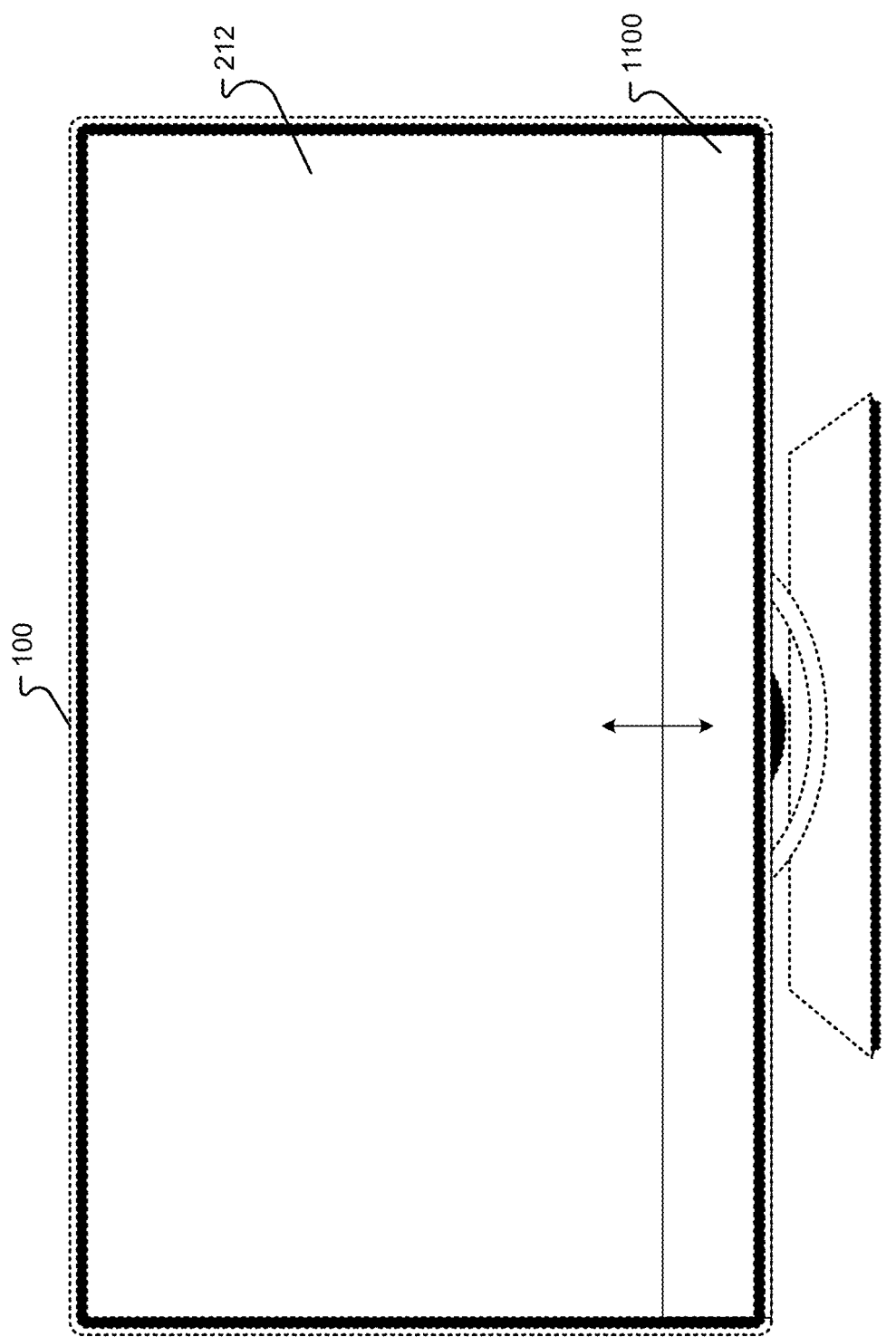

US 9,686,582 B2

SYSTEMS AND METHODS FOR MANAGING DATA IN AN INTELLIGENT TELEVISION

CROSS REFERENCE TO RELATED APPLICATION

The present application is a continuation of and claims priority to U.S. patent application Ser. No. 13/969,505 filed on Aug. 17, 2013; Ser. No. 13/969,506 filed on Aug. 17, 2013; Ser. No. 13/969,507 filed on Aug. 17, 2013; Ser. No. 13/969,508 filed on Aug. 17, 2013; and Ser. No. 13/969,510 filed on Aug. 17, 2013; each of which claims the benefits of and priority, under 35 U.S.C. §119(e), to U.S. Provisional Application Ser. Nos. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." Each of the aforementioned documents is incorporated herein by reference in their entirety for all that they teach and for all purposes.

BACKGROUND

Consolidation of device features or technological convergence is in an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet, digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

A method for managing data associated with an intelligent television, the method comprising: automatically determining a live television source; automatically scanning for one or more live television channels in the live television source; and providing a list of the live television channels.

An aspect of the above method includes wherein the scan is completed without input from a user of the intelligent television.

An aspect of the above method further comprises: receiving an indication to begin a first time experience for the user; and in response to the indication, automatically scanning for the one or more live television channels.

An aspect of the above method includes wherein the first time experience begins when the user first uses the intelligent television.

An aspect of the above method includes wherein the user provides other selections during the first time experience.

An aspect of the above method includes wherein the other selections are made while the automatic scanning is on-going.

An aspect of the above method includes wherein the automatic scanning occurs in the background.

An aspect of the above method includes wherein the automatic scan is of one or more of analog or digital television sources.

An aspect of the above method includes wherein the automatic scan is of two or more live television sources.

An aspect of the above method includes wherein the list is populated in a channel change user interface.

An intelligent television system comprising: a memory operable to store social media data; a processor in communication with the memory, the processor operable to: execute a live television source plug-in operable to: automatically determine a live television source; automatically scan for one or more live television channels in the live television source; execute a user interface application in communication with the live television source plug-in, the user interface application operable to: provide a list of the live television channels.

An aspect of the above intelligent television system includes wherein the processor is further operable to: receive an indication to begin a first time experience for the user; and in response to the indication, automatically scan for the one or more live television channel, wherein the live television source plug-in is operable to automatically scan for the one or more live television channels, wherein the first time experience begins when the user first uses the intelligent television.

An aspect of the above intelligent television system includes wherein the user provides other selections during the first time experience, and wherein the other selections are made while the automatic scanning is on-going.

An aspect of the above intelligent television system includes wherein the automatic scanning occurs in the background, wherein the automatic scan is of one or more of analog or digital television sources, and wherein the automatic scan is of two or more live television sources.

An aspect of the above intelligent television system includes wherein the list is populated in a channel change user interface, and wherein the scan is completed without input from a user of the intelligent television.

A computer readable medium having stored thereon processor executable instructions that cause a computing system to execute a method, the instructions comprising: instructions to automatically determine a live television source; instructions to automatically scan for one or more live television channels in the live television source; instructions to provide a list of the live television channels.

An aspect of the above computer readable medium includes the instructions further comprising instructions to: receive an indication to begin a first time experience for the user; and in response to the indication, automatically scan for the one or more live television channel, wherein the live television source plug-in is operable to automatically scan for the one or more live television channels, wherein the first time experience begins when the user first uses the intelligent television.

An aspect of the above computer readable medium includes wherein the user provides other selections during the first time experience, and wherein the other selections are made while the automatic scanning is on-going.

An aspect of the above computer readable medium includes wherein the automatic scanning occurs in the background, wherein the automatic scan is of one or more of analog or digital television sources, and wherein the automatic scan is of two or more live television sources.

An aspect of the above computer readable medium includes wherein the list is populated in a channel change user interface, and wherein the scan is completed without input from a user of the intelligent television.

A method for managing data associated with an intelligent television, the method comprising: receiving media associated with a user at the intelligent television; receiving one or more user-defined organization criteria; storing the one or more user-defined organization criteria; organizing media based on the one or more user-defined organization criteria; and providing a user interface having the media and organized based on the one or more user-defined organization criteria.

An aspect of the above method includes wherein the media includes one or more of a video file, and picture file, or an audio file.

An aspect of the above method includes wherein the media includes a source, and wherein the source of the media data is also stored.

An aspect of the above method includes wherein the media includes one or more items of metadata stored with the media, and wherein the user-defined criteria sort the media based on one or more of the metadata.

An aspect of the above method includes wherein the metadata includes one or more of a location at which the media was created, a time at which the media was created, and a date at which the media was created.

An aspect of the above method includes wherein the media is stored in a media database that is local to the intelligent television.

An aspect of the above method includes wherein there are two or more user-defined organization criteria are stored as categories in the media database.

An aspect of the above method includes wherein a first set user-defined organization criteria are associated with a first user and a second set user-defined organization criteria are associated with a second user.

An aspect of the above method further comprises: determining whether new media has been received; if new media has been received, retrieving the one or more user-defined organization criteria; changing the user interface to incorporate the new media while organized based on the one or more user-defined organization criteria; and providing the changed user interface.

An aspect of the above method includes wherein the intelligent television receives new media from a device in communication with the intelligent television.

An intelligent television system comprising: a memory operable to store social media data; a processor in communication with the memory, the processor operable to: execute a live television subservice operable to: receive media associated with a user at the intelligent television; receive one or more user-defined organization criteria; store the one or more user-defined organization criteria; organize media based on the one or more user-defined organization criteria; and execute a user interface application in communication with the live television subservice, the user interface application operable to provide a user interface have the media and organized based on the one or more user-defined organization criteria.

An aspect of the above intelligent television system includes wherein the media includes one or more of a video file, and picture file, or an audio file, and wherein the media includes a source, and wherein the source of the media data is also stored.

An aspect of the above intelligent television system includes wherein the media includes one or more items of metadata stored with the media, and wherein the user-defined criteria sort the media based on one or more of the metadata, and wherein the metadata includes one or more of a location at which the media was created, a time at which the media was created, and a date at which the media was created.

An aspect of the above intelligent television system includes wherein there are two or more user-defined organization criteria are stored as categories in the media database, and wherein a first set user-defined organization criteria are associated with a first user and a second set user-defined organization criteria are associated with a second user.

An aspect of the above intelligent television system includes wherein the live television subservice is further operable to: determine whether new media has been received, wherein the intelligent television receives new media from a device in communication with the intelligent television; if new media has been received, retrieve the one or more user-defined organization criteria; wherein the user interface application is further operable to: change the user interface to incorporate the new media while organized based on the one or more user-defined organization criteria; and provide the changed user interface.

A computer readable medium having stored thereon processor executable instructions that cause a computing system to execute a method, the instructions comprising: instructions to receive media associated with a user at the intelligent television; instructions to receive one or more user-defined organization criteria; instructions to store the one or more user-defined organization criteria; instructions to organize media based on the one or more user-defined organization criteria; and instructions to provide a user interface have the media and organized based on the one or more user-defined organization criteria.

An aspect of the above computer readable medium includes wherein the media includes one or more of a video file, and picture file, or an audio file, and wherein the media includes a source, and wherein the source of the media data is also stored.

An aspect of the above computer readable medium includes wherein the media includes one or more items of metadata stored with the media, and wherein the user-defined criteria sort the media based on one or more of the metadata, and wherein the metadata includes one or more of a location at which the media was created, a time at which the media was created, and a date at which the media was created.

An aspect of the above computer readable medium includes wherein there are two or more user-defined organization criteria are stored as categories in the media database, and wherein a first set user-defined organization criteria are associated with a first user and a second set user-defined organization criteria are associated with a second user.

An aspect of the above computer readable medium further comprises: instructions to determine whether new media has been received, wherein the intelligent television receives new media from a device in communication with the intelligent television; if new media has been received, instructions to retrieve the one or more user-defined organization criteria; instructions to change the user interface to incorporate the new media while organized based on the one or more user-defined organization criteria; and instructions to provide the changed user interface.

A method for managing data associated with an intelligent television, the method comprising: receiving, by a processor of the intelligent television, electronic programming guide (EPG) information including a content listing including information about two or more items of content that are or will be presented on the intelligent television; storing the EPG information; receiving a user-defined attribute associated with a first item of content; and storing the user-defined attribute with the EPG information in the content listing and associated with the first item of content.

An aspect of the above method includes wherein the user-defined attribute is a favorite designation or a reminder.

An aspect of the above method includes wherein the EPG information is for live television content.

An aspect of the above method further comprises displaying a user interface including the EPG information.

An aspect of the above method includes wherein the user interface includes a visual indicia associated with a portion of the channel listing that provides an indication of the user-defined attribute associated with the item of content.

An aspect of the above method includes wherein the visual indicia is a star indicating that the content is a favorite.

An aspect of the above method further comprises: while viewing the user interface including the EPG information, receiving new EPG information; and dynamically updating the user interface to provide the new EPG information.

An aspect of the above method includes wherein the user-defined attribute is associated with a new item of content in the new EPG information.

An aspect of the above method further comprises dynamically adding a new visual indicia to a new item of content in the new EPG information.

An aspect of the above method further comprises storing the new EPG information with at least one user-defined attribute associated with the new item of content in the new EPG information.

An intelligent television system comprising: a memory operable to store social media data; a processor in communication with the memory, the processor operable to: execute a EPG subservice operable to: receive, by a processor of the intelligent television, electronic programming guide (EPG) information including a content listing including information about two or more items of content that are or will be presented on the intelligent television; store the EPG information; receive a user-defined attribute associated with a first item of content; and store the user-defined attribute with the EPG information in the content listing and associated with the first item of content.

An aspect of the above intelligent television system includes wherein the user-defined attribute is a favorite designation or a reminder, and wherein the EPG information is for live television content.

An aspect of the above intelligent television system further comprises the processor executing a user interface application operable to display a user interface including the EPG information, wherein the user interface includes a visual indicia associated with a portion of the channel listing that provides an indication of the user-defined attribute associated with the item of content, wherein the visual indicia is a star indicating that the content is a favorite.

An aspect of the above intelligent television system includes wherein the EPG subservice is further operable to, while viewing the user interface including the EPG information, receive new EPG information, and wherein the user interface application is further operable to dynamically updating the user interface to provide the new EPG information, wherein the user-defined attribute is associated with a new item of content in the new EPG information.

An aspect of the above intelligent television system includes wherein the user interface application is further operable to dynamically add a new visual indicia to a new item of content in the new EPG information, and wherein the EPG subservice is further operable to store the new EPG information with at least one user-defined attribute associated with the new item of content in the new EPG information.

A computer readable medium having stored thereon processor executable instructions that cause a computing system to execute a method, the instructions comprising: instructions to receive, by a processor of the intelligent television, electronic programming guide (EPG) information including a content listing including information about two or more items of content that are or will be presented on the intelligent television; instructions to store the EPG information; instructions to receive a user-defined attribute associated with a first item of content; and instructions to store the user-defined attribute with the EPG information in the content listing and associated with the first item of content.

An aspect of the above computer readable medium includes wherein the user-defined attribute is a favorite designation or a reminder, and wherein the EPG information is for live television content.

An aspect of the above computer readable medium further comprises: instructions to display a user interface including the EPG information, wherein the user interface includes a visual indicia associated with a portion of the channel listing that provides an indication of the user-defined attribute associated with the item of content, wherein the visual indicia is a star indicating that the content is a favorite.

An aspect of the above computer readable medium further comprises: while viewing the user interface including the EPG information, instructions to receive new EPG information; and instructions to dynamically updating the user interface to provide the new EPG information, wherein the user-defined attribute is associated with a new item of content in the new EPG information.

An aspect of the above computer readable medium further comprises: instructions to dynamically add a new visual indicia to a new item of content in the new EPG information; and instructions to store the new EPG information with at least one user-defined attribute associated with the new item of content in the new EPG information.

A method for managing data associated with an intelligent television, the method comprising: receiving a search query for content in the intelligent television, wherein the search query includes two or more terms; returning at least one result based on the two or more terms; parsing the two or more terms; and storing the search query and the at least one result, wherein the stored search query includes the two or more terms.

An aspect of the above method further comprises: receiving a new search query for content in the intelligent television; retrieving the stored search query; and presenting the previous search query as a selectable user interface device.

An aspect of the above method includes wherein two or more search queries are stored and presented as previous searches.

An aspect of the above method further comprises: presenting a first result after a first search term is entered; and dynamically presenting a second result after a second search term is entered.

An aspect of the above method further comprises: determining if the search query is alphanumeric or statistical; if the search query is alphanumeric, receiving the two or more terms; if the search query is alphanumeric or statistical, determining the statistic used for the search query.

An aspect of the above method includes wherein the statistic is one of last viewed, most viewed, recently added, or favorite.

An aspect of the above method further comprises returning a result based on the determined statistic.

An aspect of the above method includes wherein at least two most recently added returns are presented.

An aspect of the above method includes wherein the last viewed result included content that was partially viewed.

An aspect of the above method includes wherein the search is entered in a search panel that overlays the content being viewed.

An intelligent television system comprising: a memory operable to store social media data; a processor in communication with the memory, the processor operable to: execute a live television subservice operable to: receive a search query for content in the intelligent television, wherein the search query includes two or more terms; return at least one result based on the two or more terms; parse the two or more terms; and store the search query and the at least one result, wherein the stored search query includes the two or more terms.

An aspect of the above intelligent television system includes wherein the live television subservice is further operable to: receive a new search query for content in the intelligent television; retrieve the stored search query; and wherein the user interface application is further operable to present the previous search query as a selectable user interface device, wherein two or more search queries are stored and presented as previous searches.

An aspect of the above intelligent television system includes wherein the user interface application is further operable to: present a first result after a first search term is entered; and dynamically present a second result after a second search term is entered.

An aspect of the above intelligent television system includes wherein the live television subservice is further operable to: determine if the search query is alphanumeric or statistical; if the search query is alphanumeric, receive the two or more terms; if the search query is alphanumeric or statistical, determine the statistic used for the search query, wherein the statistic is one of last viewed, most viewed, recently added, or favorite; and return a result based on the determined statistic.

An aspect of the above intelligent television system includes wherein at least two most recently added returns are presented.

A computer readable medium having stored thereon processor executable instructions that cause a computing system to execute a method, the instructions comprising: instructions to receive a search query for content in the intelligent television, wherein the search query includes two or more terms; instructions to return at least one result based on the two or more terms; instructions to parse the two or more terms; and instructions to store the search query and the at least one result, wherein the stored search query includes the two or more terms.

An aspect of the above computer readable medium further comprises instructions to: receive a new search query for content in the intelligent television; retrieve the stored search query; and present the previous search query as a selectable user interface device, wherein two or more search queries are stored and presented as previous searches.

An aspect of the above computer readable medium further comprises instructions to: present a first result after a first search term is entered; and dynamically present a second result after a second search term is entered.

An aspect of the above computer readable medium further comprises instructions to: determine if the search query is alphanumeric or statistical; if the search query is alphanumeric, receive the two or more terms; if the search query is alphanumeric or statistical, determine the statistic used for the search query, wherein the statistic is one of last viewed, most viewed, recently added, or favorite; and return a result based on the determined statistic.

An aspect of the above computer readable medium includes wherein at least two most recently added returns are presented.

A method for managing data associated with an intelligent television, the method comprising: receiving a selection of content for the intelligent television; storing the selection of content; and creating a database of content selected by a user, wherein the selection is associated with the user.

An aspect of the above method further comprises: determining if the content has been viewed; if the content has been viewed, storing the selection; and if the content has not been viewed, forgoing the selection.

An aspect of the above method includes wherein the determination of if the content has been viewed is based on an amount of time the user views the content before selecting another user interface action.

An aspect of the above method further comprises: receiving a designation of a favorite for the content; and storing the favorite designation.

An aspect of the above method further comprises: receiving a date and time; receiving new content at the intelligent television; and storing information about the new content in the database.

An aspect of the above method further comprises: receiving a request for statistical information; retrieving statistics on one or more of selections or new content.

An aspect of the above method includes wherein the statistics include one or more categories, wherein the categories include one or more of most viewed content, last viewed content, favorite content, or new content.

An aspect of the above method includes wherein the statistics are presented in a user interface for the user to select content based on the statistics.

An aspect of the above method further comprises providing the statistics to a third party.

An aspect of the above method includes wherein the database stores statistics for two or more users, and wherein the database stores at least two statistics, in each category, for each user.

An intelligent television system comprising: a memory operable to store social media data; a processor in communication with the memory, the processor operable to execute a statistics subservice operable to: receive a selection of content for the intelligent television; store the selection of content; and create a database of content selected by a user, wherein the selection is associated with the user.

An aspect of the above intelligent television system includes wherein the statistics subservice is further operable to: determine if the content has been viewed, wherein the determination of if the content has been viewed is based on an amount of time the user views the content before selecting another user interface action; if the content has been viewed, store the selection; and if the content has not been viewed, forgo the selection.

An aspect of the above intelligent television system includes wherein the statistics subservice is further operable to: receive a designation of a favorite for the content; store the favorite designation; receive a date and time; receive new content at the intelligent television; and store information about the new content in the database.

An aspect of the above intelligent television system includes wherein the statistics subservice is further operable to: receive a request for statistical information; and retrieve statistics on one or more of selections or new content, wherein the statistics include one or more categories, wherein the categories include one or more of most viewed content, last viewed content, favorite content, or new content, and wherein the statistics are presented in a user interface for the user to select content based on the statistics.

An aspect of the above intelligent television system includes wherein the statistics subservice is further operable to provide the statistics to a third party.

A computer readable medium having stored thereon processor executable instructions that cause a computing system to execute a method, the instructions comprising: instructions to receive a selection of content for the intelligent television; store the selection of content; and create a database of content selected by a user, wherein the selection is associated with the user.

An aspect of the above computer readable medium further comprises instructions to: determine if the content has been viewed, wherein the determination of if the content has been viewed is based on an amount of time the user views the content before selecting another user interface action; if the content has been viewed, store the selection; and if the content has not been viewed, forgo the selection.

An aspect of the above computer readable medium further comprises instructions to: receive a designation of a favorite for the content; store the favorite designation; receive a date and time; receive new content at the intelligent television; and store information about the new content in the database.

An aspect of the above computer readable medium further comprises instructions to: receive a request for statistical information; and retrieve statistics on one or more of selections or new content, wherein the statistics include one or more categories, wherein the categories include one or more of most viewed content, last viewed content, favorite content, or new content, and wherein the statistics are presented in a user interface for the user to select content based on the statistics.

An aspect of the above computer readable medium further comprises instructions to provide the statistics to a third party.

The systems and methods herein provide new processes for managing data. The processes provide for data that streamlines searches and that tracks user behavior. The data may then be used to make the intelligent television operate more intuitively. These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" (ETV) refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p-1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777,600 pixels (approximately 0.8 megapixels) per field or 1,555,200 pixels (approximately 1.6 megapixels) per frame), or 720p-1280×720p: 921,600 pixels (approximately 0.9 megapixels) per frame. As will be appreciated, "frame size" in pixels is defined as number of horizontal pixels× number of vertical pixels, for example 1280×720 or 1920× 1080. Often the number of horizontal pixels is implied from context and is omitted, as in the case of 720p and 1080p, "scanning system" is identified with the letter "p" for progressive scanning or "i" for interlaced scanning, and "frame rate" is identified as number of video frames per second. For interlaced systems an alternative form of specifying number of fields per second is often used. For purposes of this disclosure, "high-definition television" is deemed to include other high-definition analog or digital video formats, including ultra high definition television.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTÉ Player in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; and iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content (e.g., a media center, a file system, etc.). An application can be a software service that provides a particular type of function (e.g., Live TV, Video on Demand, User Applications, photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

The term "Intelligent TV," as used herein, refers to a television configured to provide one or more intuitive user interfaces and interactions based on a unique application platform and architecture. The Intelligent TV utilizes processing resources associated with the television to integrate Internet connectivity with parallel application functionality. This integration allows a user the ability to intuitively access various sources of media and content (e.g., Internet, over-the-top content, on-demand streaming media, over-the-air broadcast media, and/or other forms of information) via the Intelligent TV in a quick and efficient manner. The Intelligent TV can be a soft television. Although the Intelligent TV disclosed herein may comprise one or more components of a "smart TV," it is an aspect of the Intelligent TV to provide expanded intuitive user interaction capability for navigating and executing the various features of the television. A "smart TV," sometimes referred to as a connected TV, or hybrid TV (not to be confused with IPTV, Internet TV, or with Web TV), describes a trend of integration of the Internet and Web 2.0 features into television sets and set-top boxes, as well as the technological convergence between computers and these television sets/set-top boxes. The smart TV devices have a higher focus on online interactive media, Internet TV, over-the-top content, as well as on-demand streaming media, and less focus on traditional broadcast media than traditional television sets and set-top boxes. As can be appreciated, the Intelligent TV encompasses a broader range of technology than that of the smart TV defined above.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "display," as used herein, refers to at least a portion of a screen used to display the output of the television to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate" and "compute," and variations thereof, as used herein, are used interchangeably and include any type of methodology, process, mathematical operation or technique.

The term "touch screen" or "touchscreen" refer to screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, Myspace, Newgrounds, Blip.tv, and Crackle.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The terms "online community", "e-community", or "virtual community" mean a group of people that primarily interact via a computer network, rather than face to face, for social, professional, educational or other purposes. The interaction can use a variety of media formats, including wilds, blogs, chat rooms, Internet forums, instant messaging, email, and other forms of electronic media. Many media formats are used in social software separately or in combination, including text-based chatrooms and forums that use voice, video text or avatars.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellites and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator (URL), Universal Resource Identifier (URI), Address of Record (AOR), electronic alias in a database, like addresses, and combinations thereof.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "social media" can refer to the means of interactions among people in which they create, share, and exchange information and ideas in virtual communities and networks. Embodiments of social media can include a group of Internet-based applications that allow the creation and exchange of content. Furthermore, social media may depend on mobile and web-based technologies to create highly interactive platforms through which individuals and communities share, co-create, discuss, and modify user-generated content. Social media differentiates from traditional/industrial media in many aspects such as quality, reach, frequency, usability, immediacy, and permanence.

The term "social media site" can refer to a social network or social network service.

The term "social media posting" can refer to an item of content or a provider of content on a social media site.

The term "social media poster" can refer to an author of an item of content or a provider of content on a social media site.

The term "social media pile" can refer to a user interface where each social media posters is represented by a thumbnail or other visual indicia. The social media pile can include two or more thumbnails or visual indicia formed into an arrangement that resembles a pile.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 9B is a bottom view of an embodiment of a remote control with the joystick in a lower position;

FIG. 9C is a bottom view of an embodiment of a remote control with the joystick in an upper position;

FIG. 11A is a front view of an embodiment of an Intelligent TV screen;

FIG. 11B is a front view of an embodiment of an Intelligent TV screen;

FIG. 11C is a front view of an embodiment of an Intelligent TV screen;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a network-enabled telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
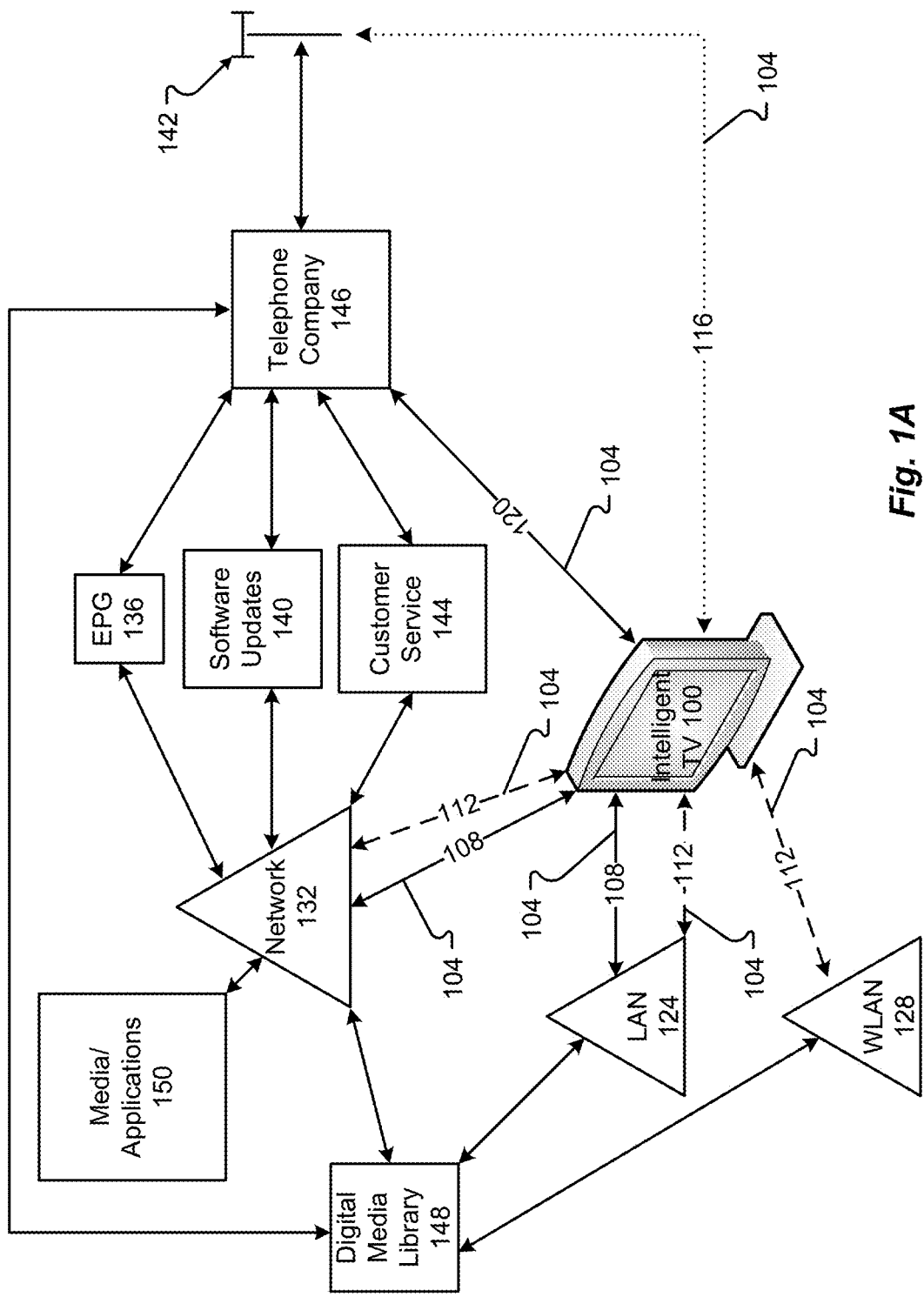
FIG. 1A includes a first view of an embodiment of an environment of an intelligent television.
Figure 1B:
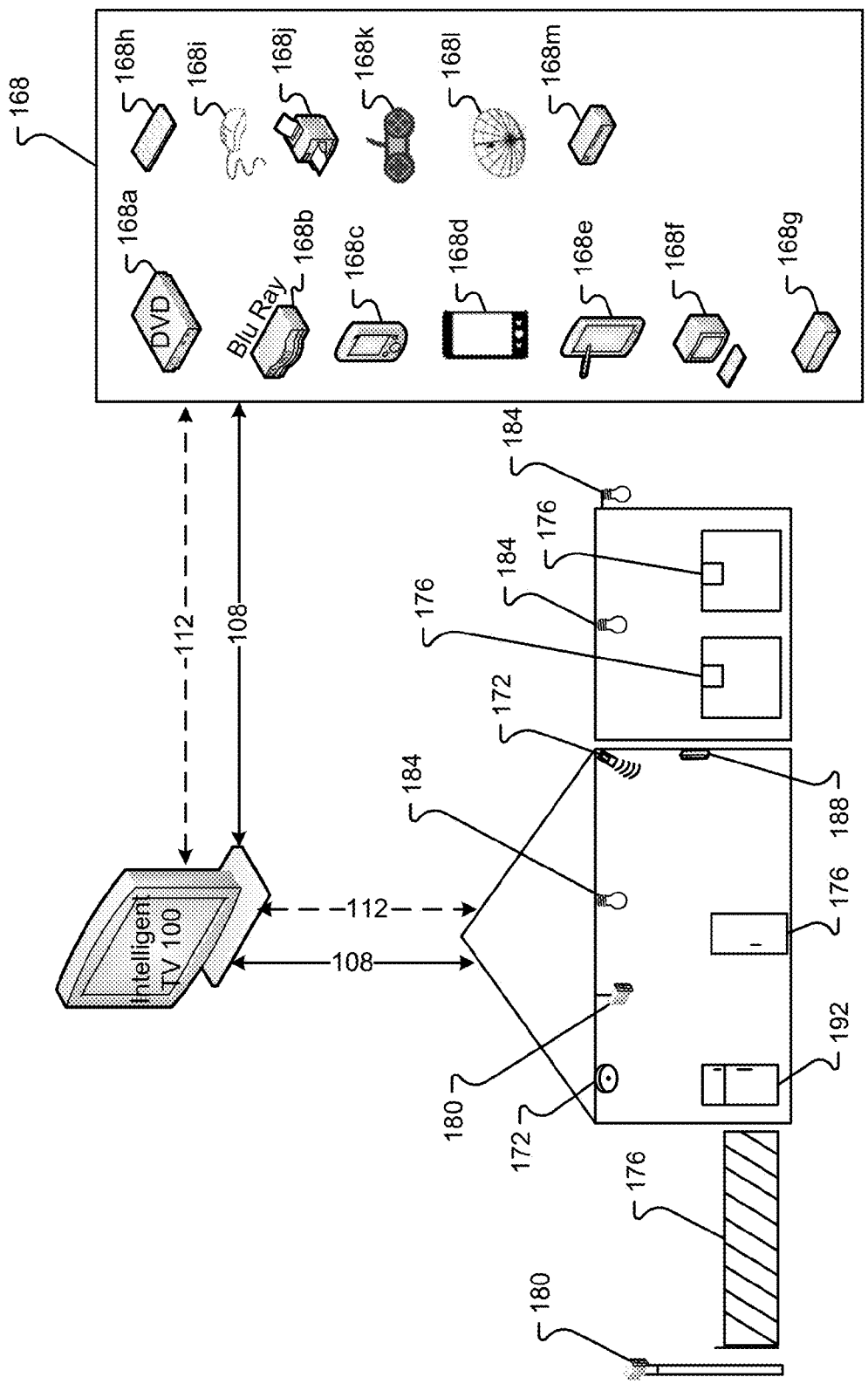
FIG. 1B includes a second view of an embodiment of an environment of an intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV 100 can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, his, and other applications).

The Intelligent TV 100 may also be a communications device which can establish network connections 104 through many alternate means, including wired 108 or wireless 112 means, over cellular networks 116 to connect via cellular base antenna 142 to telephone networks operated by telephone company 146, and by using a telephone line 120 to connect to telephone networks operated by telephone company 146. These connections 104 enable the Intelligent TV 100 to access one or more communication networks 132. The communication networks may comprise any type of known communication medium or collection of communication media and may use any type of protocols to transport messages or signals between endpoints. The communication networks may include wired and/or wireless communication technologies. The Internet is an example of a communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks 132 may be connected in a redundant manner to ensure network access. In other words, if one connection is interrupted, the Intelligent TV 100 can use an alternate communications path to reestablish and/or maintain the network connection 104. Among other things, the Intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or an online community (e.g., Facebook™ Twitter™, LinkedIn™, Pinterest™, Google+™, MySpace™, and the like) maintained by a social network service. In combination with other components of the Intelligent TV 100 described in more detail below, these network connections 104 also enable the Intelligent TV 100 to conduct video teleconferences, electronic meetings, and other communications. The Intelligent TV 100 may capture and store images and sound, using associated cameras, microphones, and other sensors. Additionally or alternatively, the Intelligent TV 100 may create and save screen shots of media, images, and data displayed on a screen associated with the Intelligent TV 100.

Further, as shown in FIG. 1B, the Intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168a, BluRay players 168b, portable digital media devices 168c, smart phones 168d, tablet devices 168e, personal computers 168f, external cable boxes 168g, keyboards 168h, pointing devices 168i, printers 168j, game controllers and/or game pads 168k, satellite dishes 168l, external display devices 168m, and other universal serial bus (USB), local area network (LAN), Bluetooth™, or high-definition multimedia interface (HDMI) compliant devices, and/or wireless devices. When connected to an external cable box 168g or satellite dish 168l, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 100 may also be used to control the operation of, and may interface with, other smart components such as security systems 172, door/gate controllers 176, remote video cameras 180, lighting systems 184, thermostats 188, refrigerators 192, and other appliances.

Figure 2A:
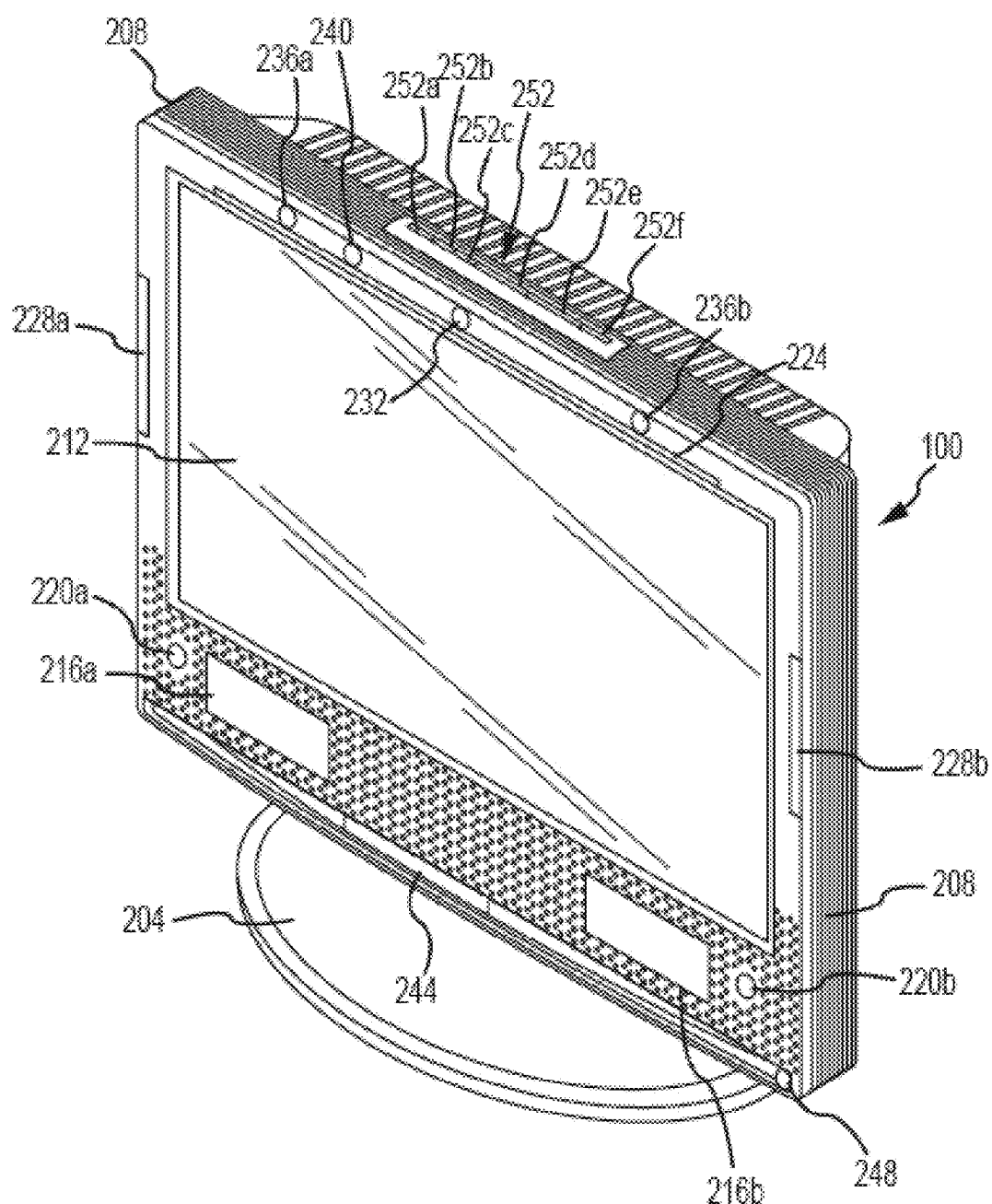
FIG. 2A includes a first view of an embodiment of an intelligent television.

Intelligent TV:

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light. Emitting Diode (LED) screen, or other screen types. In embodiments, the entire front surface of the screen 212 may be touch sensitive and capable of receiving input by the user touching the front surface of the screen 212.

The Intelligent TV 100 may include integrated speakers 216 and at least one microphone 220. A first area of the frame 208 may comprise a horizontal gesture capture region 224 and second areas comprise vertical gesture capture regions 228. The gesture capture regions 224, 228 may comprise areas or regions that are capable of receiving input by recognizing gestures made by the user, and in some examples, without the need for the user to actually touch the screen 212 surface of the Intelligent TV 100. However, the gesture capture regions 224, 228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture devices 232, and the range finding device 240 may be used by the Intelligent TV 100 to recognize individual users. Additionally or alternatively, the Intelligent TV 100 may learn and remember preferences associated with the individual users. In some embodiments, the learning and remembering (i.e., identifying and recalling stored information) may be associated with the recognition of a user.

An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252a-f, which can be configured for specific inputs. For example, the first button 252a may be configured as an on/off button used to control overall system power to the Intelligent TV 100. The buttons 252 may be configured to, in combination or alone, control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds. A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

Figure 2B:
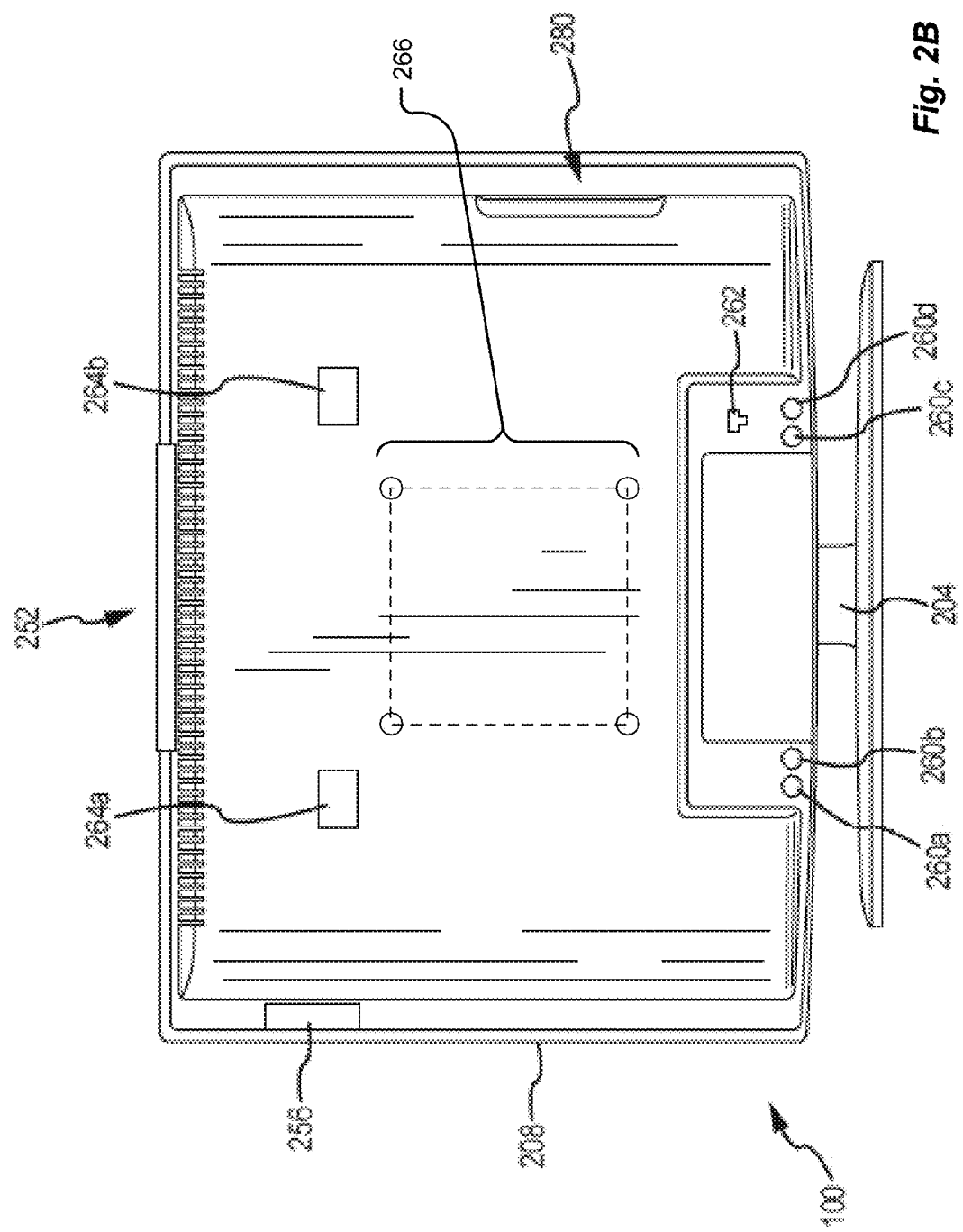
FIG. 2B includes a second view of an embodiment of an intelligent television.

In support of communications functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces. The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one example, the Intelligent TV 100 may incorporate at least one Video Equipment Standards Association (VESA) mounting interface for attaching the device 100 to the surface.

Figure 2C:
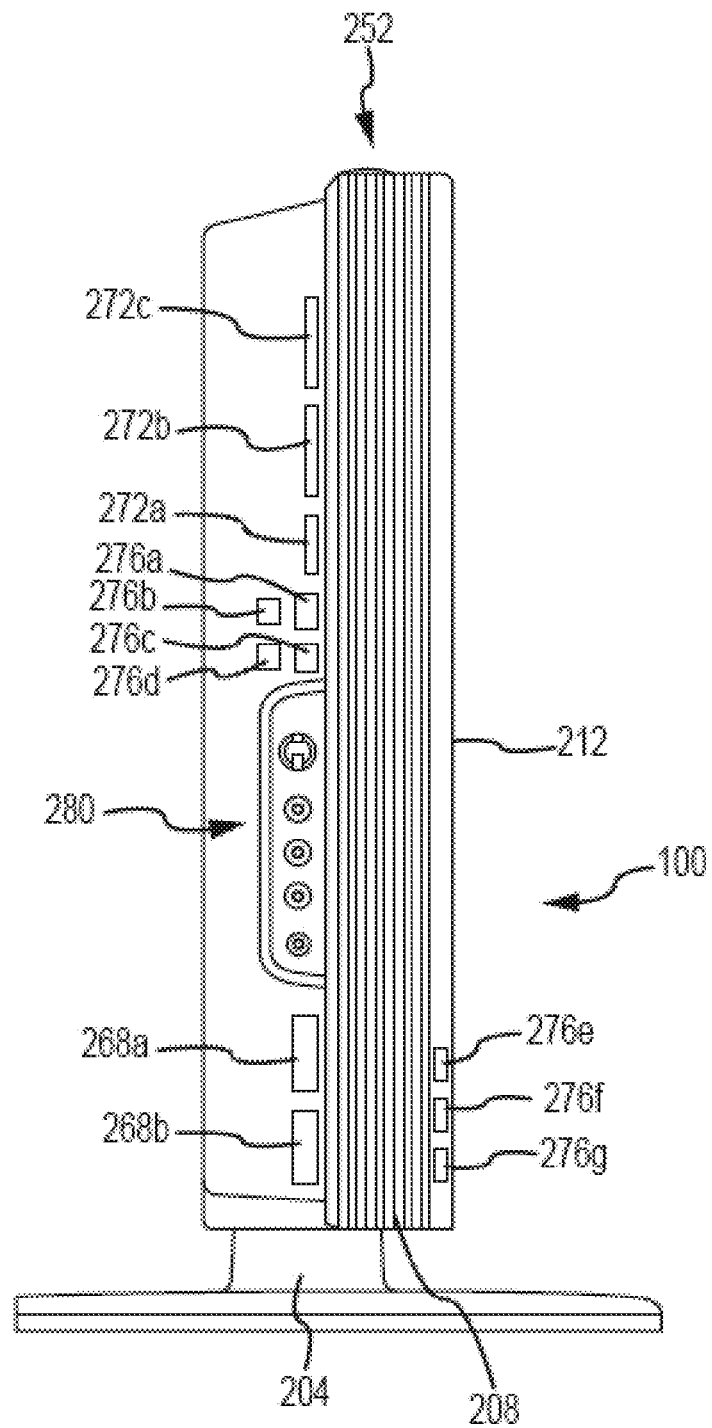
FIG. 2C includes a third view of an embodiment of an intelligent television.
Figure 2D:
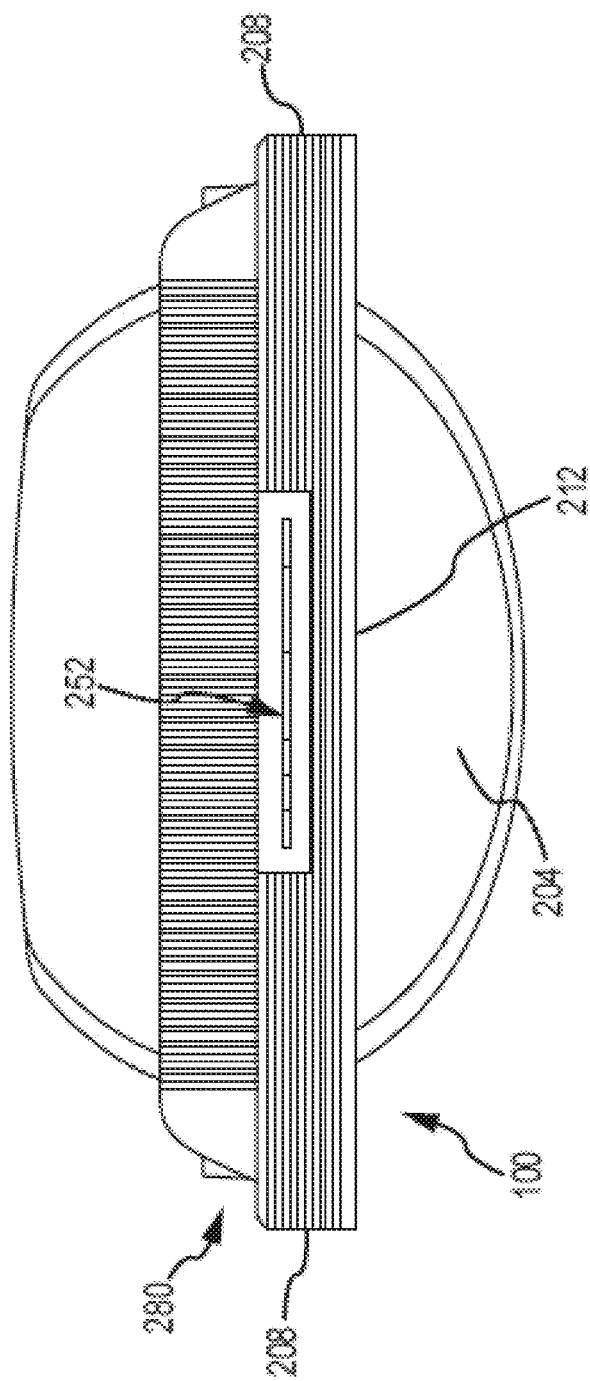
FIG. 2D includes a fourth view of an embodiment of an intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (A/V) I/O module 280 can be included to provide audio to an interconnected speaker or other device, and to receive audio input from a connected microphone or other device. As an example, the audio input/output interface 280 may comprise an associated amplifier and analog-to-digital converter.

Figure 3:
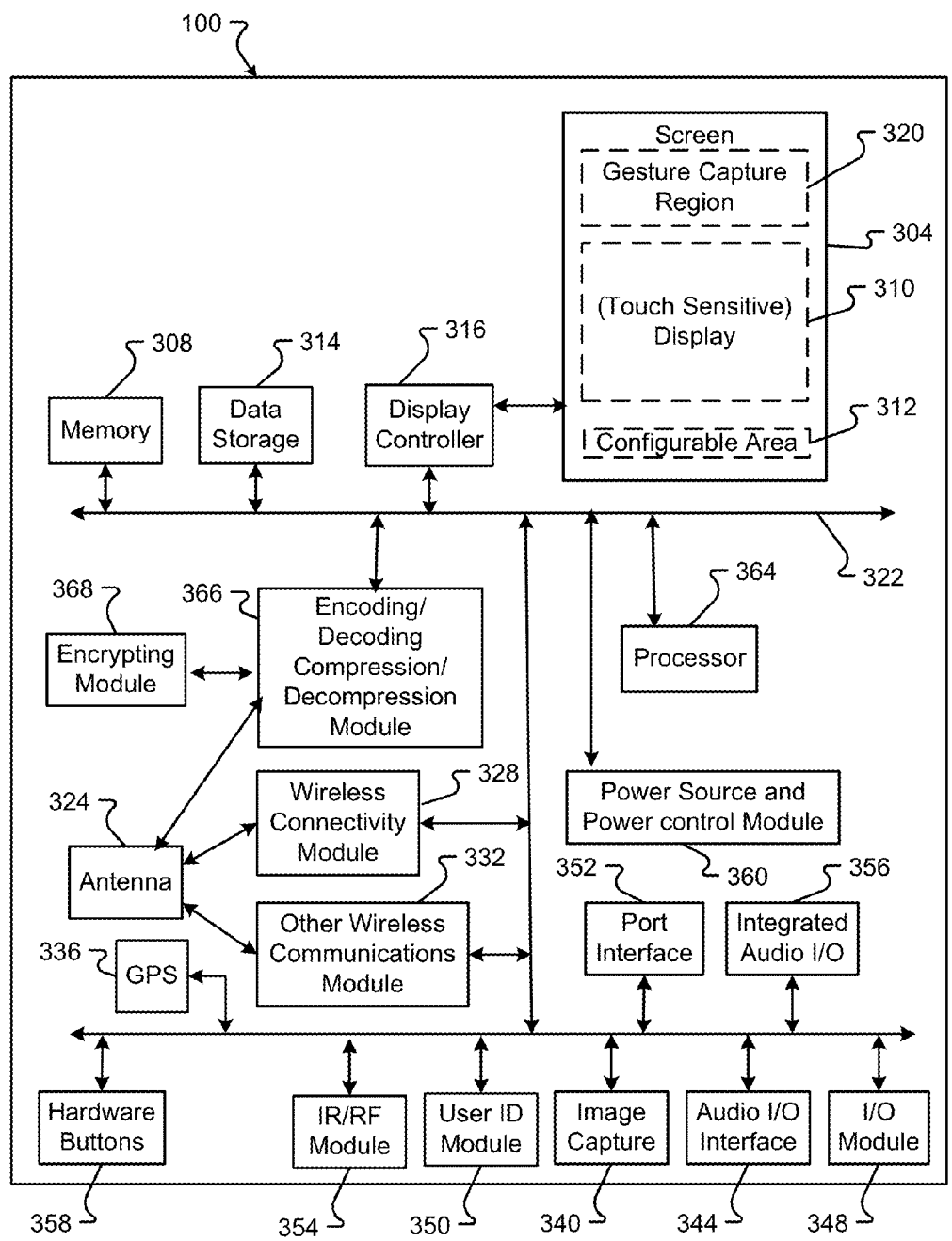
FIG. 3 is a block diagram of an embodiment of the hardware of an intelligent television.

Hardware Features:

FIG. 3 illustrates components of a Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Blutooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC-to-DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 4:
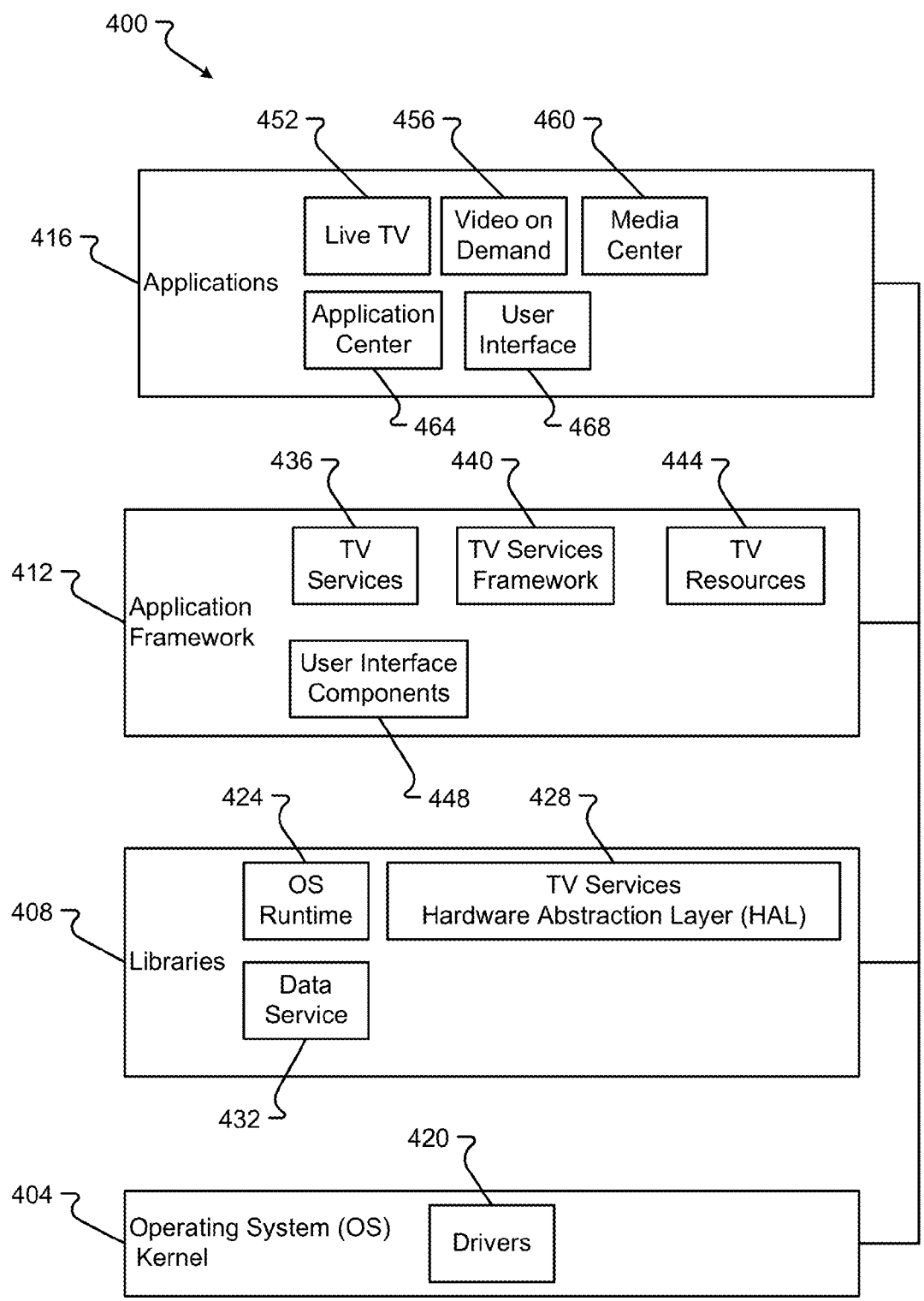
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hardware abstraction layer (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hardware abstraction layer library 428 can include code required by TV services either executed in the application framework 412 or an application 416. The TV services HAL library 428 is specific to the Intelligent TV 100 operations that control different functions of the Intelligent TV. The TV service HAL library 428 can also be formed from other types of application languages or embodiments of different types of code or formats for code beyond the hardware abstraction layer.

Figure 6:
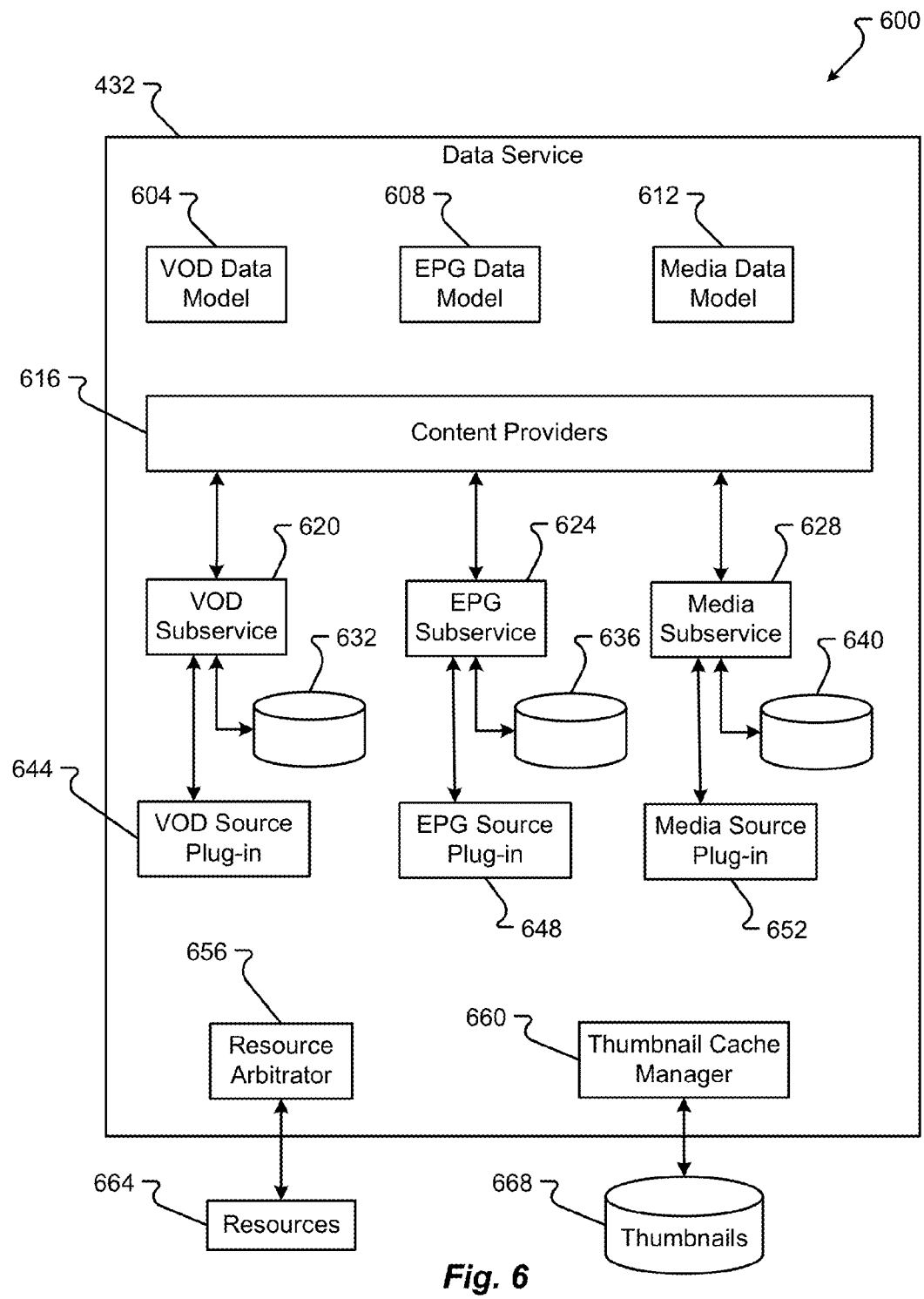
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more applications 416 to provide specific application functions or software for those applications. Thus, the framework 412 can include one or more different services, or other applications, that can be accessed by the applications 416 to provide general functions across two or more applications. Such functions include, for example, management of one or more of windows or panels, surfaces, activities, content, and resources, The application framework 412 can include one or more, but is not limited to, TV services 434, TV services framework 440, TV resources 444, and user interface components 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources 444 including any type of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a video on demand application 456, a media center application 460, an application center application 464, and a user interface application 468. The live TV application 452 can provide live TV over different signal sources. For example, the live TV application 452 can provide TV from input from cable television, over air broadcasts, from satellite services, or other types of live TV services. Live TV application 452 may then present the multimedia presentation or video and audio presentation of the live television signal over the display of the Intelligent TV 100.

The video on demand application 456 can provide for video from different storage sources. Unlike Live TV application 452, video on demand 456 provides for display of videos that are accessed from some memory source. The sources of the video on demand can be associated with users or with the Intelligent TV or some other type of service. For example, the video on demand 456 may be provided from an iTunes library stored in a cloud, from a local disc storage that contains stored video programs, or from some other source.

The media center application 460 can provide applications for different types of media presentation. For example, the media center 460 can provide for displaying pictures or audio that is different from, but still accessible by the user and different from live TV or video on demand. The media center 460 allows for the access of different sources to obtain the media in the display of such media on the Intelligent TV 100.

The application center 464 allows for the provision, storage and use of applications. An application can be a game, a productivity application, or some other application generally associated with computer systems or other devices, but may be operated within the Intelligent TV. An application center 464 may obtain these applications from different sources, store them locally and then execute those types of applications for the user on the Intelligent TV 100.

Figure 5:
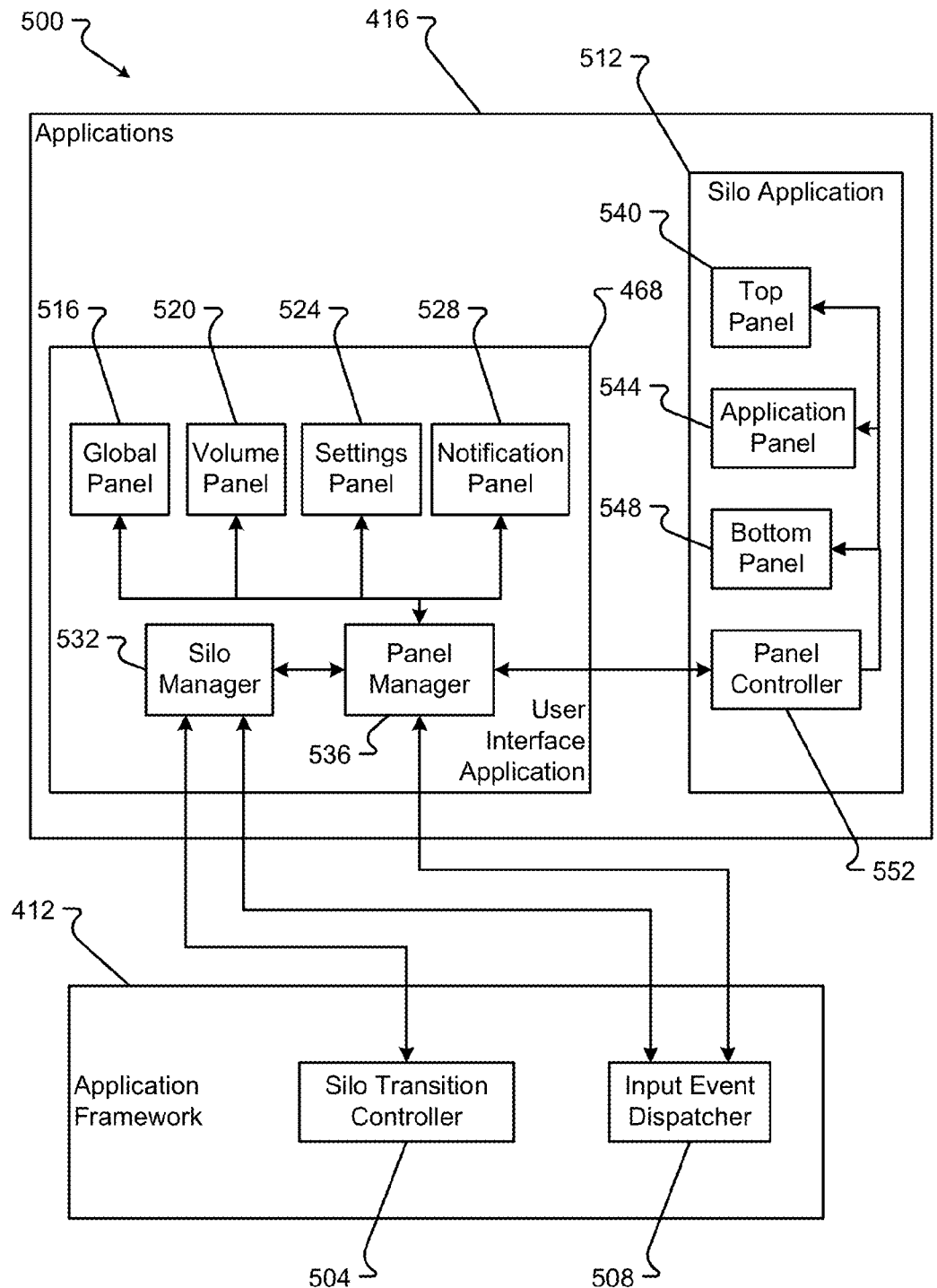
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. Here the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV that contains information for user. The transition controller 504 can manage the changes between two silos when an event occurs in the user interface. The input event dispatcher 508 can receive user interface events that may be received from the operating system and provided to the input event dispatcher 508. These events can include selections of buttons on a remote control or on the TV or other types of user interface inputs. The input event dispatcher 508 may then send these events to a silo manager 532 or panel manager 536 depending on the type of the event. The silo transition controller 504 can interface with the silo manager 532 to affect changes in the silos.

The applications layer 416 can include a user interface application 468 and/or a silo application 512. The applications layer 416 can include more or fewer user interface applications as necessary to control the user interface of the Intelligent TV 100 than those shown in FIG. 5. The user interface application 468 can include a silo manager 532, a panel manager 536, and one or more types of panels 516-528. The silo manager 532 manages the display and/or features of silos. The silo manager 532 can receive or send information from the silo transition controller 504 or the input event dispatcher 508 to change the silos displayed and/or to determine types of input received in the silos.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, and/or a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, video on demand displays, favorites, currently provided programs, or other information. Notifications can be associated with the media or with some type of setting, or operation or the Intelligent TV 100. The panel manager 536 may be in communication with the panel controller 552 of the silo application 512.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548.

An embodiment of the data service 432 and the operation of the data management is shown in FIG. 6. The data management 600 can include one or more code components that are associated with different types of data. For example, there may be code components within the data service 432 that execute and are associated with video on demand, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (video on demand, electronic programming guide, media) each have a data subservice 620, 624, and/or 628 that is in communication with one or more internal and/or external content providers 616. The data subservices 620, 624, and 628 that communicate with the content providers 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservices 620, 624, and 628 may determine and then enable or initiate a different source plug-in 644, 648, and/or 652. The content providers 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager 660 may obtain thumbnail information from one of the data subservices 620, 624, 628 and store that information in the thumbnails database 668. Further, the thumbnail cache manager 660 may extract or retrieve that information from the thumbnails database 668 to provide to one of the data subservices 620, 624, 628.

Figure 13:
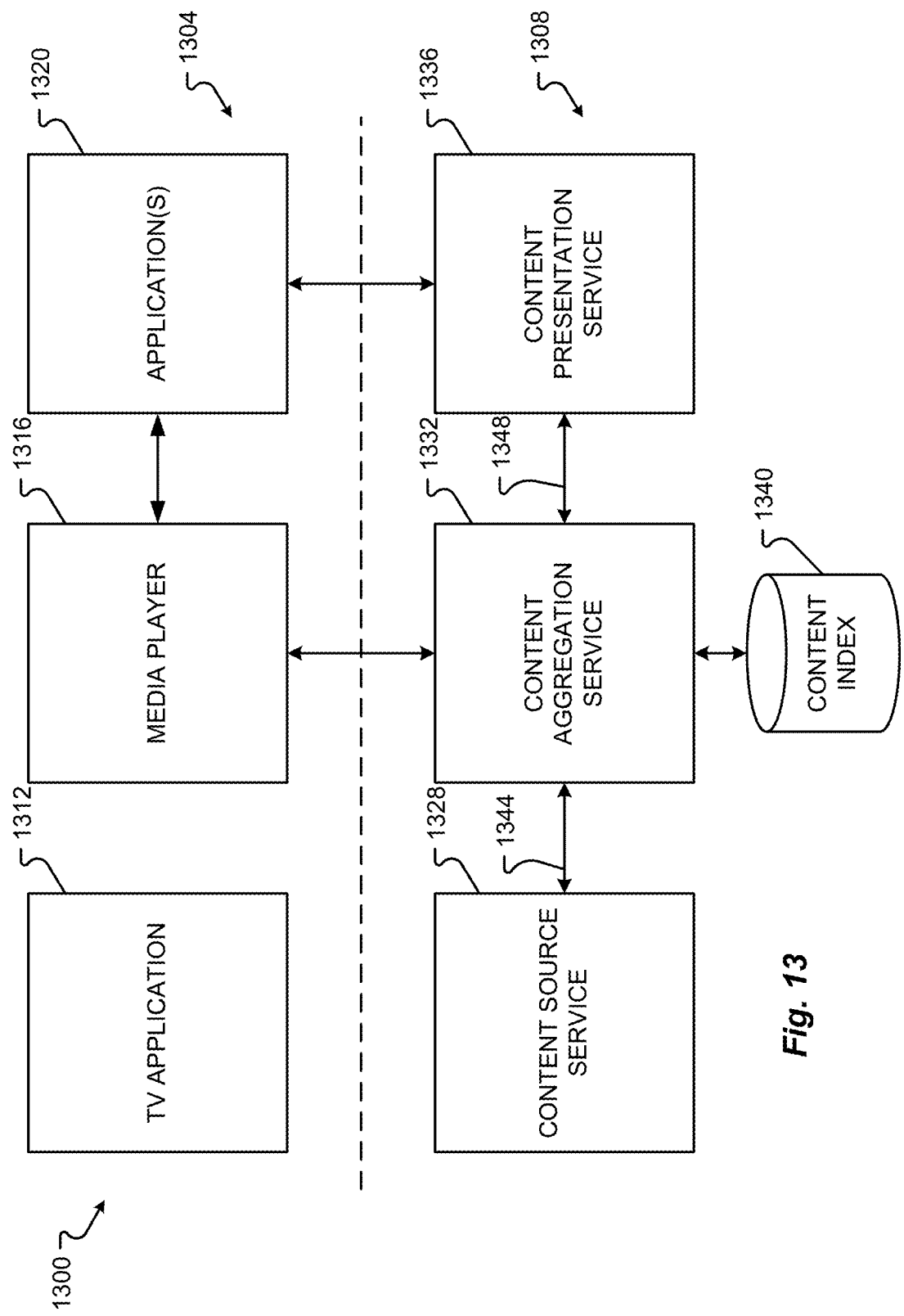
FIG. 13 is a block diagram of an embodiment of a content data service.

An exemplary content aggregation architecture 1300 is shown in FIG. 13. The architecture can include a user interface layer 1304 and a content aggregation layer 1308. The user interface layer 1304 may include a TV application 1312, media player 1316, and application(s) 1320. The TV application 1312 enables the viewer to view channels received via an appropriate transmission medium, such as cable, satellite, and/or the Internet. The media player 1316 views other types of media received via an appropriate transmission medium, such as the Internet. The application(s) 1320 include other TV-related (pre-installed) applications, such as content viewing, content searching, device viewing, and setup algorithms, and coordinates with the media player 1316 to provide information to the viewer.

The content source layer 1308 includes, as data services, a content source service 1328, a content aggregation service 1332 and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television or IPTV, digital television or DTV (including high definition and enhanced TV), third party services (such as those referenced above), and applications (such as Android applications).

Content source investigators can track content sources and are typically configured as binaries. The content source service 1328 starts content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index 1340, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or by an action associated with user), the user interface layer 1300 disconnects the socket. As shown, media can be provided directly by the content aggregation service 1332 to the media player 1316 for presentation to the user.

Figure 7:
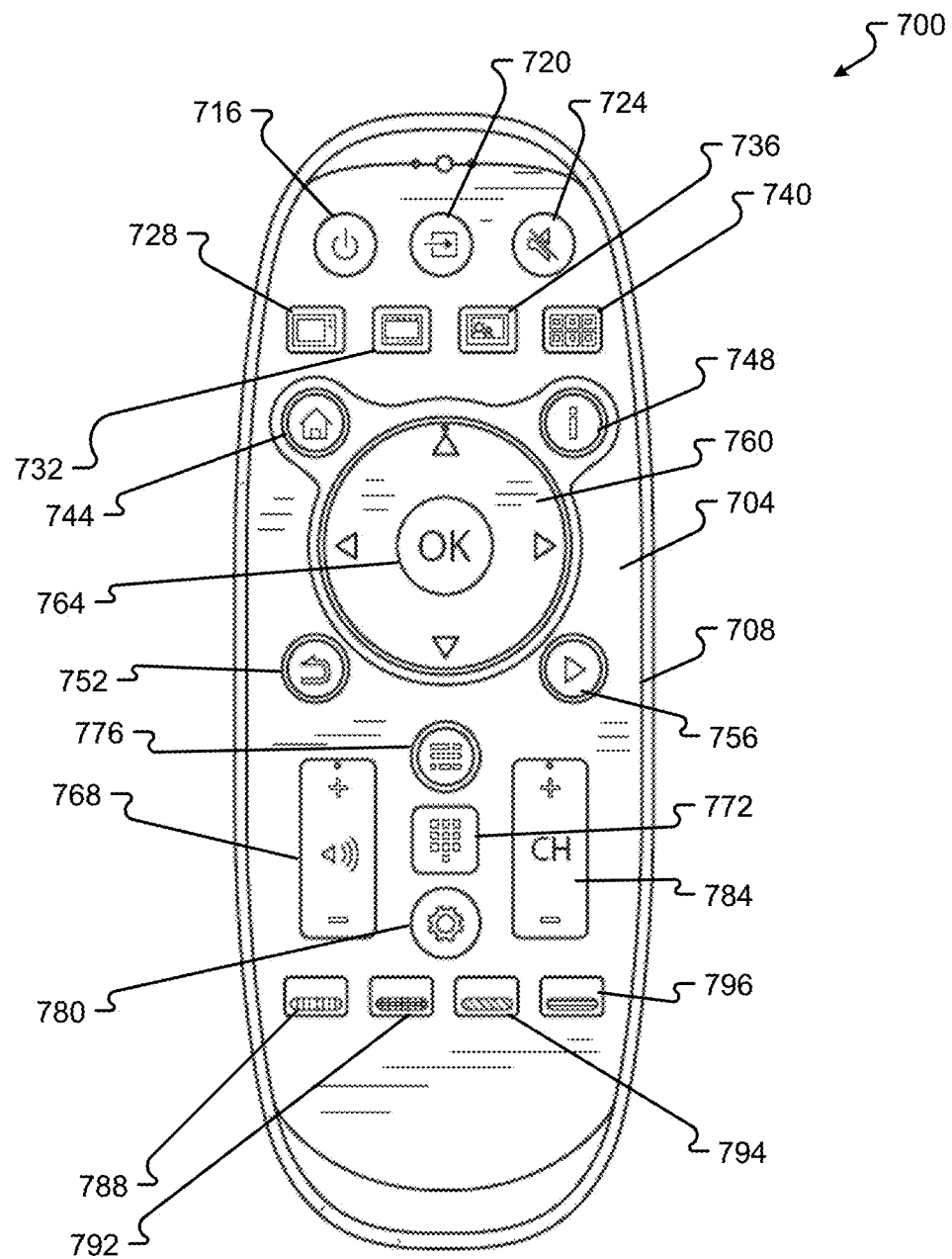
FIG. 7 is a plan view of an embodiment of a handheld remote control.
Figure 8:
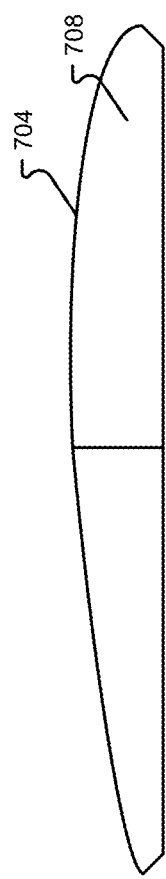
FIG. 8 is a side view of an embodiment of a remote control.

Remote Control:

A handheld remote control can be provided to enable user interaction with the Intelligent TV 100. An exemplary handheld remote control is shown in FIGS. 7-9. The remote control 700 can include one or more of, but is not limited to, top, side and bottom housings 704, 708, and 712, an (on/off) power button 716, an input source button 720 (to select input source such as Live TV, video on demand, media center, application center, high definition multimedia interface or HDMI, component or COMP, audio/Video or A/V, digital or analog television or DTV/ATV, and video graphics array (VGA)), a (volume) mute button 724, a Live TV button 728 (to activate or select the Live TV silo), a video on demand (VOD) button 732 (to activate or select the video on demand silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780 (which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third and fourth hotkeys 788, 792, 794, and 796, and/or a moveable joystick 900 on a bottom of the remote control 700. The first, second, third, and fourth hotkeys are generally assigned different colors, which color indexing is depicted as visual indicia on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can includes previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and/or information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can one or more of identify the selected application, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen. Commonly, a currently assigned function of any of the first, second, third, and fourth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add", and, when in the second position hotkey functionality enabled can be "add" and disabled is "configure" and "remove". Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, video on demand, media center, and application center are always connected/detected.

Figure 9A:
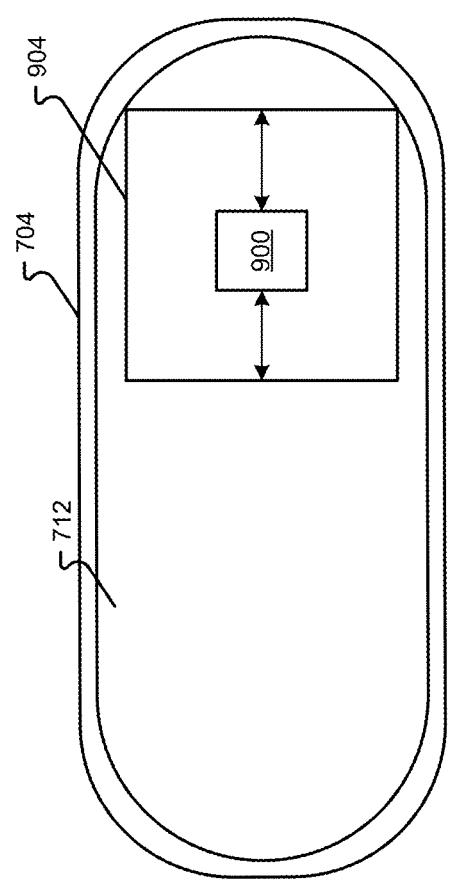
FIG. 9A is a bottom view of an embodiment of a remote control with a joystick in a neutral position.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a drop down window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially the same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 1100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and Web browser), and/or information about input source(s), When the joystick 900 is in either the forward or reverse position, the user can select an actuator on the front of the remote control, such as the OK button 764, and be taken, by displayed images on the screen 212, to another location in the user interface, such as a desktop. This process can be done in a nonintrusive manner and without affecting the flow of content that is pushed up or down. The joystick 900 could be moved, additionally or differently, from side-to-side to cause the window to appear at the left or right edge of the screen 212.

Figure 10:
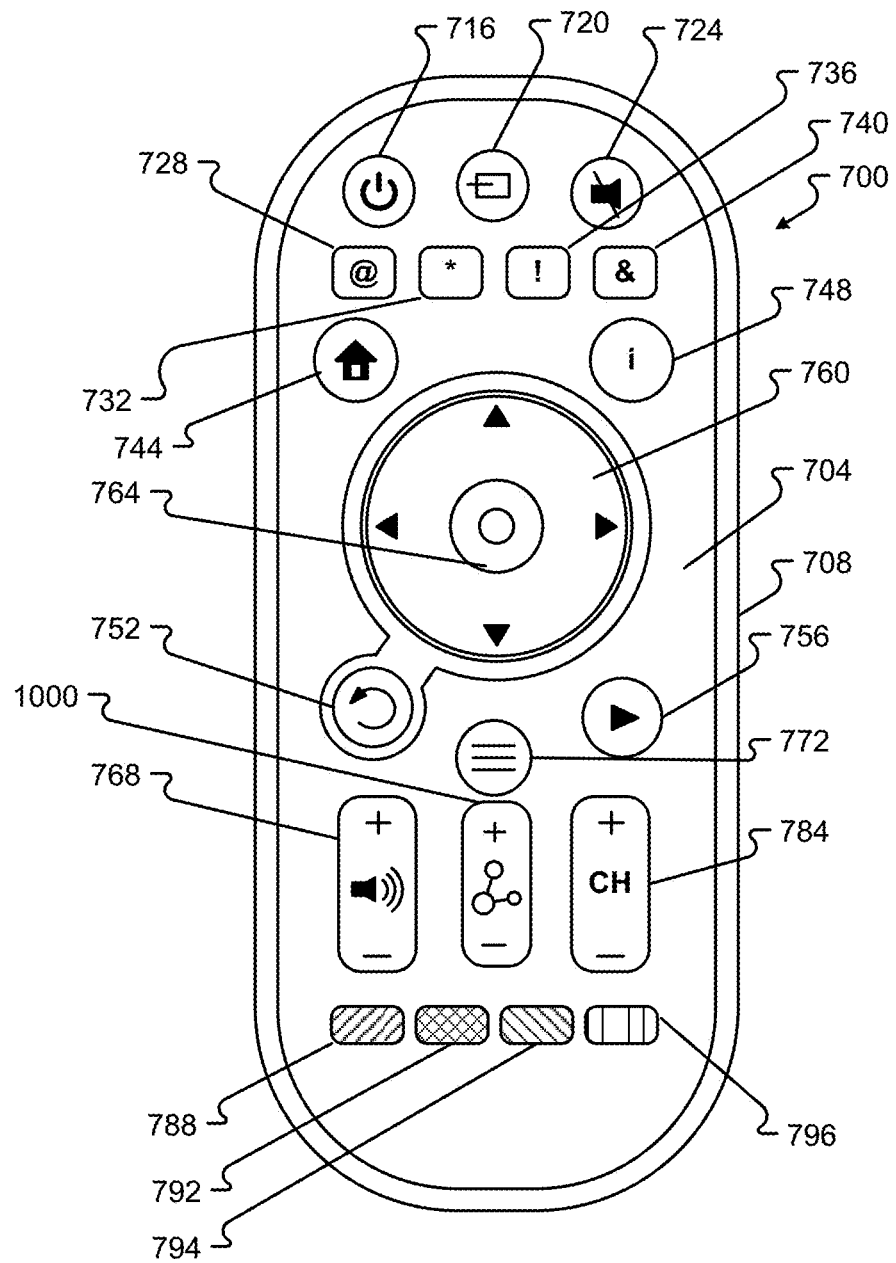
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via LinkedIn™, Myspace™, Twitter™, YouTube™, DailyMotion™, Facebook™, Google+™) or Second Life™. The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (−), the viewer can increase the size and/or numbers of linked contact tiles provided to the viewer. In other words, by increasing the social volume the viewer can view, access, and/or push more social content from those of his or her social networks associated with him or her in a memory of the Intelligent TV. By decreasing the social volume, the viewer can view, access, and/or push less social content from his or her associated social networks. By selecting the mute button 724, the viewer can stop or pause any interactivity with his or her associated social networks (e.g., inbound or outbound messages). Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different) mute setting, control, and/or button can stop or pause inbound social network activity (e.g., inbound social messages).

Figure 12:
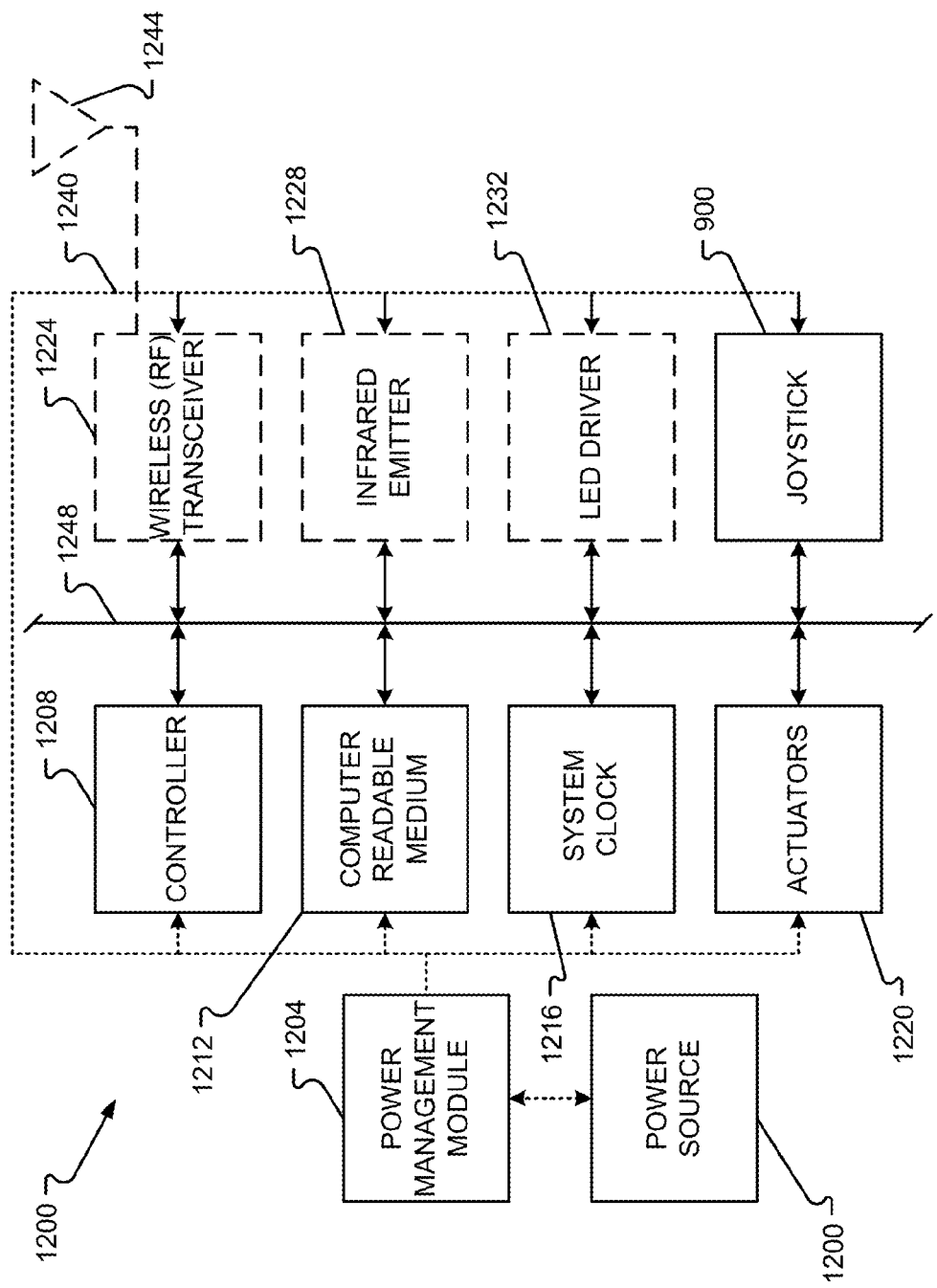
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

Figure 14:
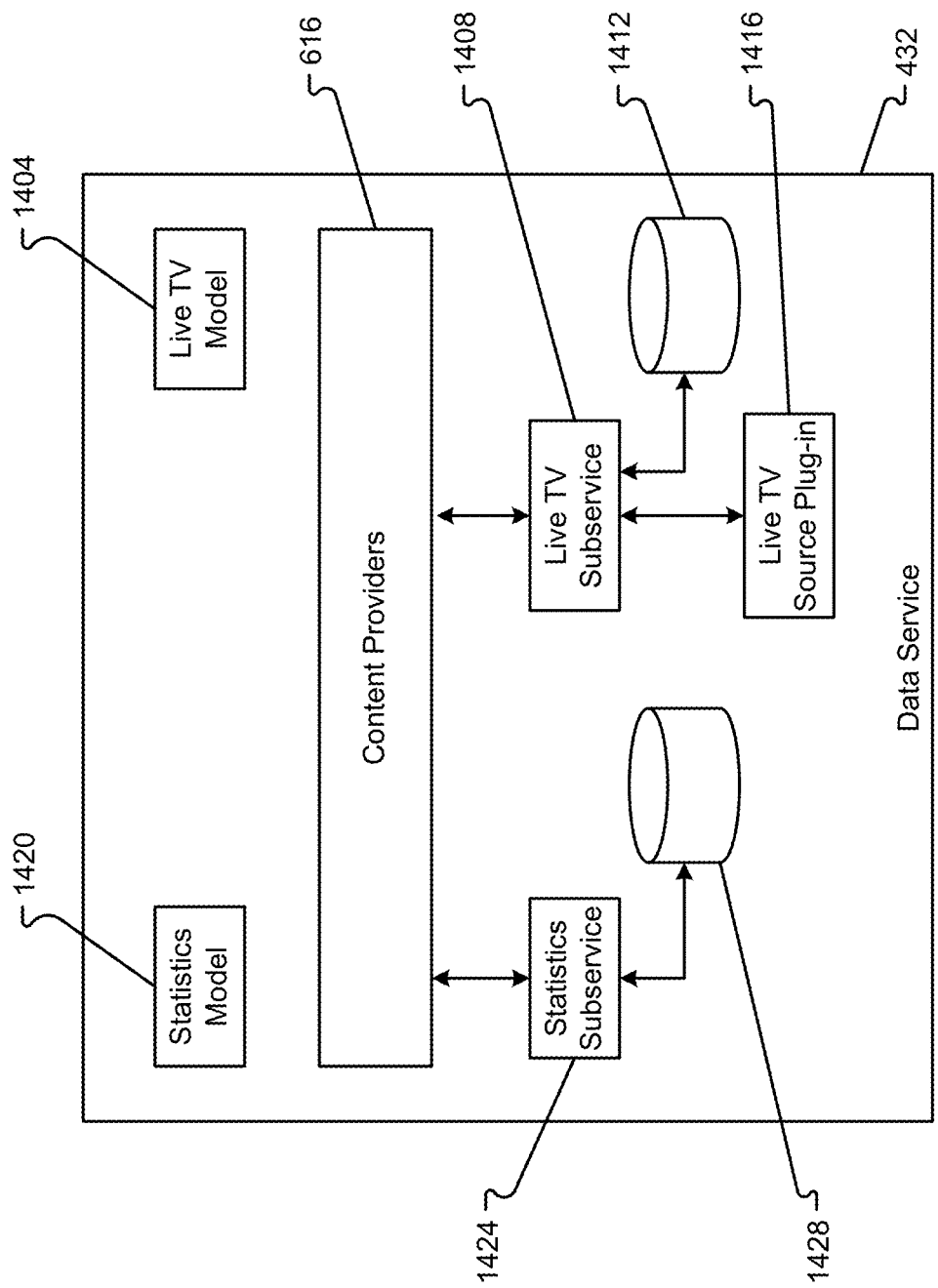
FIG. 14 is a block diagram of an embodiment of a data service for statistics and other data associated with the Intelligent TV.

Another example of the data service 432 is shown in FIG. 14. The system shown in FIG. 14 may supplement or be an alternative to the system described in FIG. 13. Thus, any description herein mentioning the components of FIG. 14 may also apply to the system described in FIG. 13. Here, the data service 432 includes the ability to update live TV applications or content, and to record, store, manage, and retrieve data or statistics about user viewing habits. The live TV data can be governed by a live TV data model 1404. The live TV data model 1404 can include a description of what data is stored, how the date is stored, and in what areas of memory the date is stored. This information is used to ensure a consistent storage process and routine for the live TV data.

Live TV data can include information about channel availability for the user. This information may be updated periodically as the user may add content channels to their TV subscription. For example, the user may, at some point, add a subscription or paid TV channel to their live TV content. The live TV data model 1404 stores the information about which channels are available for the user to view. To obtain the live TV data information, a live TV subservice 1408 may communicate with content provider 616 to obtain the information.

A live TV subservice 1408 can store data into a database 1412. The live TV subservice 1408 may also instantiate an instance of a live TV source plug-in 1416 operable to scan for content channels. The live TV subservice may receive information from, or communicate with, the content providers 616 to effectuate the scanning of channels and the recordation of which channels the user has available. Here, the live TV source plug-in 1416 may be called by the live TV subservice 1408 to determine channels during a period when setting up the Intelligent Television 100.

The live TV source plug-in 1416 may interact with the processor 364 to scan information being received from an antenna 324. The antenna signal 324 may be sent to an encoding/decoding compression/decompression module 366 and then sent onto the bus 322 for analysis. The processor 364 may then execute the live TV source plug-in 1416 to look for information or data indicative of a channel in the information provided by module 366. The TV data may be digital and the channels may be determined by which content is provided in which area of the digital stream. In other embodiments, the TV signal may be an analog signal, and the processor 364 may determine which data is in which frequency range. The live TV source plug-in module 1416 may determine these different types of content sources in the TV stream and provide that information to the live TV subservice 1408 for storage in database 1412. The database 1412 may be updated with this information during a setup of the Intelligent Television 100, and then periodically updated based on changes in the signal.

User statistics may be stored by, or in accordance with, a statistics model 1420. The statistics model 1420 can govern what information will be recorded, how that information will be recorded, when the information shall be recorded for each of the users using the Intelligent Television 100. Statistics may include information about what the user is watching, how often the user is watching, the user's favorites, the user's recommendations, time the user spends watching certain content, and other information. The model is accessed by the statistics subservice 1424 to store user statistics in the database 1428.

The statistics subservice 1424 may receive information from a content provider 616. This information may be information about for what the user is using the Intelligent Television. Further, the information can include signals as to when the user is selecting content, what that content is, and when the user changes to a different type of content. This information may be stored by the statistics subservice 1424 in the database 1428. The data may also be managed or processed by the statistics subservice 1424 into more usable information. Further, the statistics subservice 1424 may access and retrieve information in the database 1428 to send to external services that may use these statistics for better content provision, for targeting advertising to the user, or for other types of functions or services.

Figure 15:
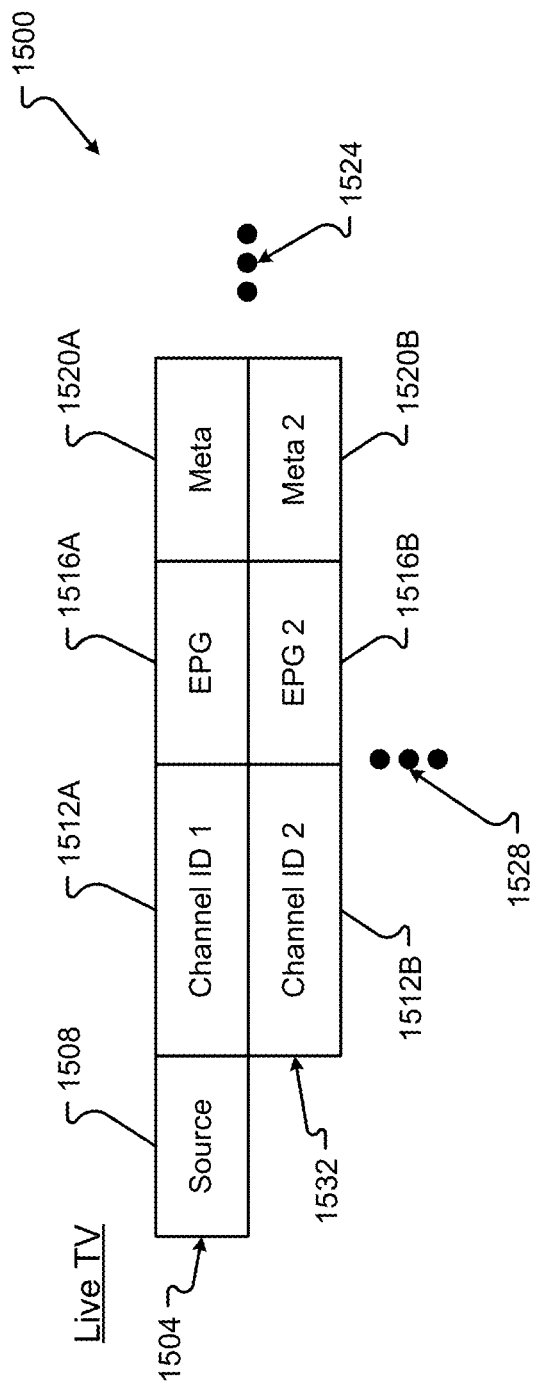
FIG. 15 is a block diagram of an embodiment of a channel listing database.

An embodiment of information stored in the database 1500 for live TV data is shown in FIG. 15. The database 1500 may be the same or similar to database 1412, described in conjunction with FIG. 14. The database 1500 can include one or more data structures 1504 that include live TV information. The data structure 1504 may include one or more of, but is not limited to, a source field 1508, a channel identifier (ID) field 1512, an electronic programming guide field 1516, and/or a metadata field 1520. There may be more or fewer fields within the data structure 1504, as represented by ellipses 1524.

For each content source identified in field 1508, there may be several channel, which contain data stored in the several fields, as represented by second data structure 1532. Thus, for each source of live TV data, there is a listing of channel information 1532. A source field 1508 can include information about the source of the live TV data. The source can be a set of bandwidth from an antenna, content from an analog source, content from a digital source; the source may include information about whether the data was received over an antenna or over a network. Any source information, such as an ID or how to connect with the source, may be stored in the source field 1508.

Channel ID field 1512 can include information about which channel the data is associated with. The channel ID may not necessarily be an analog channel, but may be a digital content provider, thus the A channel, such as CBS, TNT, HBO, may be referred to in channel ID 1512A or 1512B. The channel ID may also be a "channel," such as channel 4 or channel 7. This information is stored to identify the channel associated with the information that is stored in the data structure 1504.

An electronic programming guide field 1516A, 1516B, can include information about the correlation between the channel and the electronic programming guide. This information assures that the EPG data is associated with the correct channel.

Metadata fields 1520A and 1520B include any information associated with the channel. The Metadata 1520 can include information, for example, when the channel is to be updated, where the channel information can be provided, for example, a description of channel episode information on that channel from an internet source. This information may also include information provided by the user about the channel. This information may be stored to ensure better navigation for the collection of channel information. There may be more channel data structures 1504 and 1532, than those shown in FIG. 15, as represented by ellipses 1528.

Figure 16:
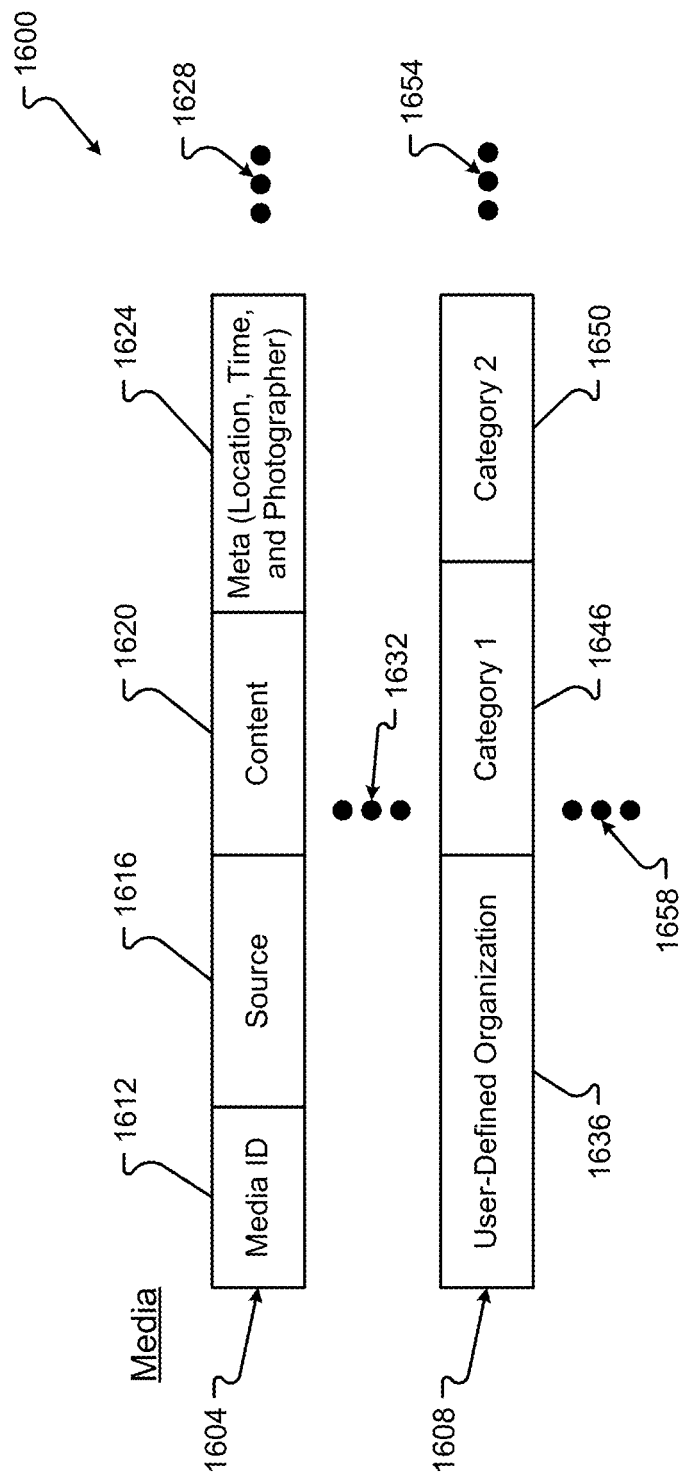
FIG. 16 is a block diagram of an embodiment of a media database.

An embodiment of information or data 1600 about media stored with, or associated with, the Intelligent Television 100 is shown in FIG. 16. Here, the media data 1600 may be the same or similar to that as provided in database 640. The media data can include one or more data structures 1604 which describe the media within the database 1600. The media database 1600 can also include one or more data structures 1608 that are associated with user defined organizational features of the database 1600.

The data structure 1604 describes the media within the database 1600, and includes one or more fields, but is not limited to, a media identifier field 1612, a source field 1616, a content field 1620, and/or a metadata field 1624. There may be more or fewer fields than those shown for data structure 1604, as represented by ellipses 1628.

The media ID field 1612 can be a unique identifier, such as an alphanumeric ID, a globally unique ID (GUID), or some other identifier that uniquely identifies this media from other media stored in the media database 1600.

The source data 1616 can include any information about where the media was obtained. This information may include whether the source is local or from a social media site. The source information 1616 can also include information about what system or device the media was obtained. For example, if the media is a picture taken with a smartphone, the source field 1616 may store information about the device that took the picture.

The content field 1620 contains the information for the media. Thus, if the media is a picture, the content field 1620 can store the information about the pixels used to generate the picture. If the media is a video, the content field 1620 can store the MPEG or other video format file. The content field 1620 can include any information in any format used to store the media.

The metadata field 1624 can include any information describing the media's data. This information can include the location the picture was taken, the time the picture was taken, or the user that took the picture. There may be more information that describes the media data and may be used to organize the media into different categories. There may be more than a single data structure 1604 in the database 1600, as represented by ellipses 1632.

The user defined organization structure 1608 can include one or more fields, but is not limited to, a user-defined organization field 1636, a first category field 1646, a second category field 1650. There may be more or fewer fields than those shown in data structure 1608, as represented by ellipses 1654. Each user may have a set of defined categories, thus, there may be more user defined organizational features 1608 than that shown in FIG. 16, as represented by ellipses 1658.

The user defined organization 1636 may identify the user, and that user's specific set of categories that are used organizational features. Thus, there might be a user ID in the user-defined organization field 1636. Further, the user may name this type of organization or identify the organization separately; thus, there may be some ID for associating this set of categories with the user and how the user wants to organize the media.

The first category of organization 1646 can include a first set of data, which may include the source data 1616 or metadata 1624, with which the user desires to organize the media. This organizational information can include information, for example where the picture was taken, who took the picture, the subject of the picture, the source of the picture, or other information. This information can be placed in the category as a top level organization. A second organization may be included in second category field 1650. This information may be the same or similar to category one, but include a different category to organize the data by. Thus, the user may enter several categories to best organize the information within the media database 1600.

Figure 17:
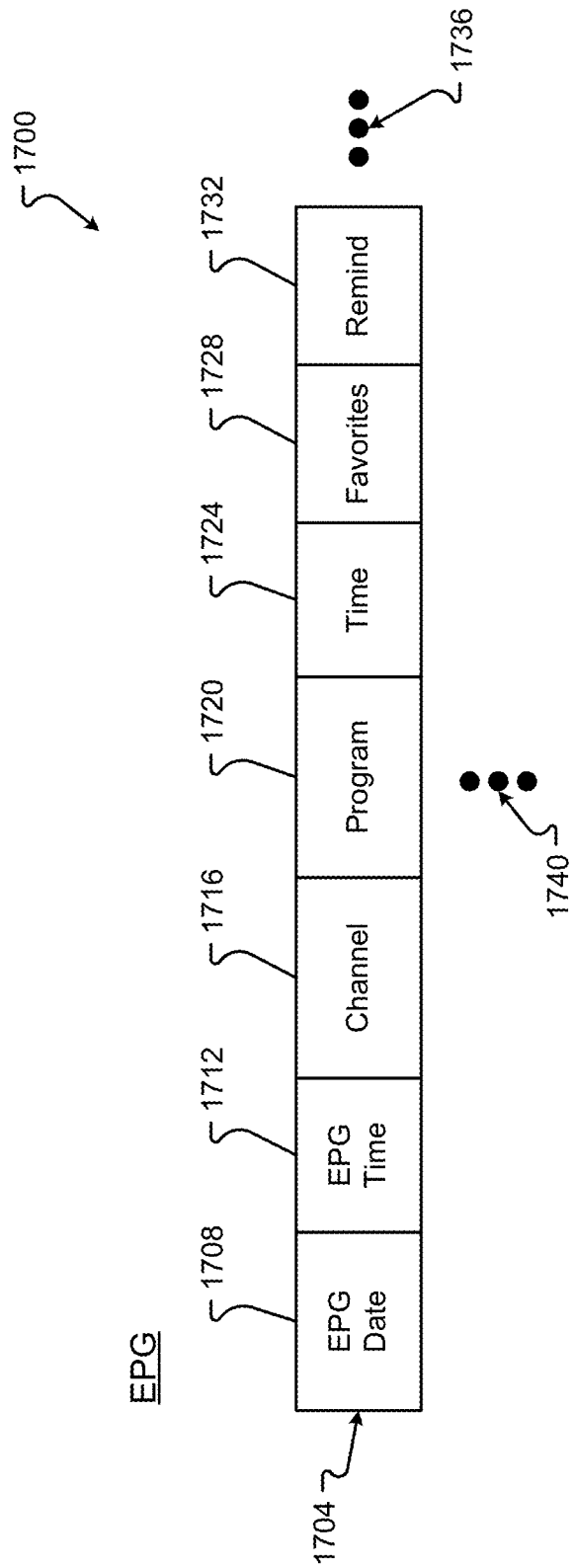
FIG. 17 is a block diagram of an embodiment of a electronic programming guide database.

An embodiment of electronic programming guide 1700 is shown in FIG. 17. This example of the electronic programming guide 1700 can have one or more data structures 1704 that define content within the Intelligent Television 100 that may be provided currently or in the future. While there is a single data structure 1704 shown in FIG. 17, there may be more or fewer than data structures 1704 that that shown in FIG. 17, as represented by ellipses 1740. The EPG data structure 1704 can include one or more fields, but is not limited to, an EPG date field 1708, an EPG time field 1712, a channel field 1716, a program field 1720, a time field 1724, a favorites designation 1728, and a reminder field 1732. There may be more or fewer fields than those shown in FIG. 17, as represented by ellipses 1736.

An EPG date field 1708 can include the date upon which this EPG was obtained, stored, or updated. The date 1708 can be any type of date in any format. The EPG time field 1712 can include a time when the EPG data was obtained, stored, or updated. This time 1712 and date 1708 provide an indication of when the EPG data was created. This time 1712 and date 1708 may then be used to determine whether updates to the EPG information need to be made on a periodic basis or sometime in the future.

A channel field 1716 can be an indication of the channel or content provider for the particular series of programs or content associated with that content provider. The channel field 1716 can be associated with channel IDs 1512, described in conjunction with FIG. 15. The channel may include an analog frequency range, may include a content provider ID, or name, such as, HBO, TNT, CBS, etc. This channel information 1716 may then be used to identify one or more programs or episodes that are to be provided on that channel into the future.

The program field 1720 includes an ID or indication of the actual content being provided on that channel. The content program information 1720 can include the name of the content and any metadata associated therewith. For example, the metadata can include descriptions, times, episode numbers, ratings, and other information about the program. The program information 1720 may also be associated with the time 1724, thus, each program may have a particular time or time range when the program is meant to be provided on the channel 1716. Thus, the time field 1724 includes a date and time that the program is to be provided. Thus, there may be several program and time associations with the channel. This is represented by ellipses 1740. Further, there may be several channel data structures which are also represented by ellipses 1740.

The channel or program may also be associated with the favorites indication 1728. Thus, as the user decides that a certain channel or an episode is a favorite, the EPG data stores this information in the favorites indication 1728. Thus, the favorites indication 1728 can be an indication that there is a favorite, and the association with whether the favorite is associated with the channel or the particular program.

A reminder field 1732 may also be associated with either the channel or the program. The reminder 1732 can be a date and time reminder to watch the channel 1716 at the date and time. The reminder 1732 can also be a reminder associated with the program 1720 to either watch the program when a new episode or a particular episode is playing. Thus, the reminder has the information needed to determine what to remind the user of, and when to remind that user of.

Figure 18:
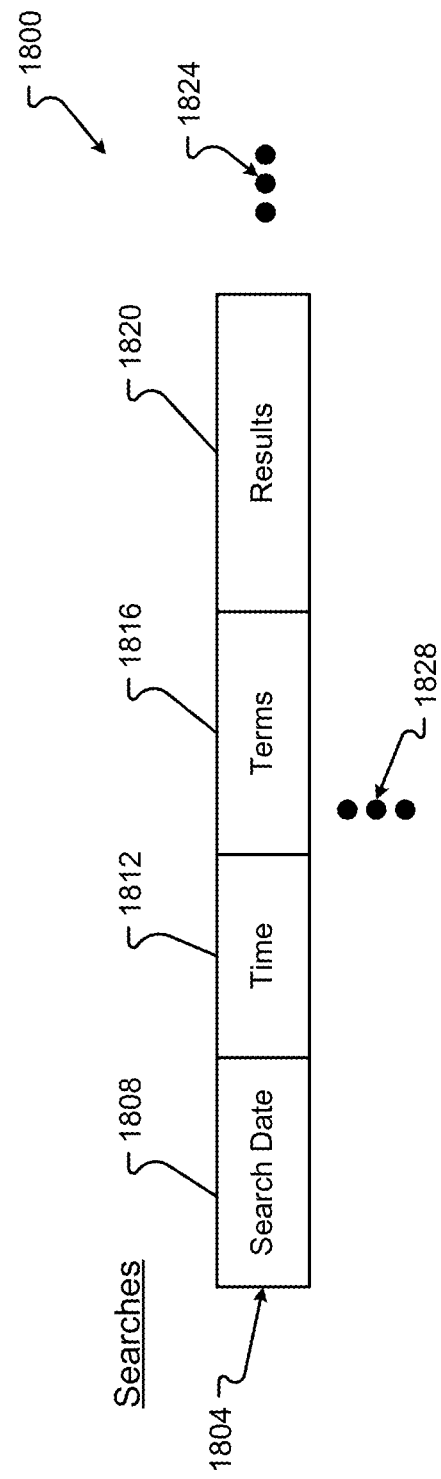
FIG. 18 is a block diagram of an embodiment of a past searches database.

An embodiment for search data 1800 is shown in FIG. 18. The search data can include one or more data structures 1804, which describe previous searches conducted by the user. There may be more or fewer data structures 1804 than those shown in FIG. 18, as represented by ellipses 1828. The data structure 1804 can include one or more of, but is not limited to, a search date field 1808, a search time field 1812, search terms field 1816, and results field 1820. There may be more or fewer fields associated with each data structure 1804, as represented by ellipses 1824.

The search date 1808 can include the date upon which the user conducted the search. The search date 1808 can be used to rank order or date order the searches provided by the user. A time field 1812 can also include a time indication of when the search was conducted. The date and time 1808 and 1812 allow the searches to be date ranked or time ordered for presentment to the user at a later date. There may also be included a user ID field (not shown) within the search database to associate any search with a particular user.

A terms field 1816 can include the search terms used by the user to do the search. The search terms can include letters or numbers used in a general search. A search terms 1816 can also use any category the user used to search EPG data 1700.

The results field 1820 can provide either the results provided in the search, or a definition of how the results can be obtained again. Thus, the results may be quickly provided to a user if the user wants to execute that particular search again.

Figure 19:
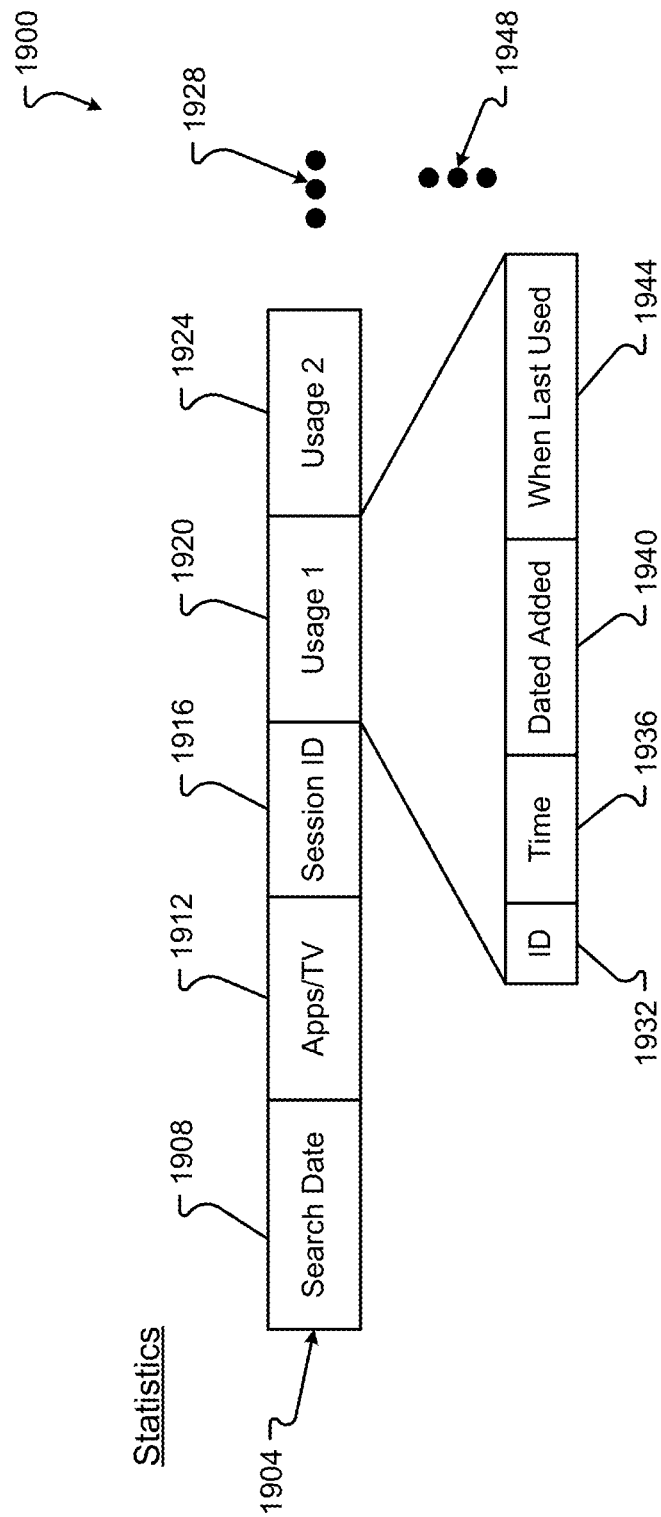
FIG. 19 is a block diagram of an embodiment of a statistics database.

An embodiment of a statistics database 1900 storing user usage statistics is shown in FIG. 19. The statistics database 1900 can include one or more data structures 1904 that store information about usage statistics for a user. There may be more or fewer data structures 1904 than that shown in the database 1900, as represented by ellipses 1948. Each data structure 1904 can include one or more fields associated with usage statistics, including one or more of, but not limited to, a user identifier field 1908, an application or TV indication field 1912, a usage statistics set field 1920, etc.

The applications/TV field 1912 can store an identifier for the particular television and for any application used by the user.

Each one of these usage statistics sets may include a session identifier 1916. The session identifier 1916 indicates a set of data associated with the viewing session by the user. For example, the user may turn on a television and begin a new session; when the user turns off the television, the session ends. Thus, for each time the user has a viewing session, a new session ID 1916, and set of usage statistics, is created.

The user might have several usage statistics sets included with each session. For example, the data structure 1904 includes usage statistics set one 1920 and usage statistics set two 1924. There may be more or fewer sections or fields of data associated with each data structure 1904, as represented by ellipses 1928. The usage statistics set can include one or more fields including one or more of, but not limited to, an identifier field 1932, a time field 1936, a date field 1940, a when used last field 1944, a favorites field (not shown), a content identifier field (not shown), or other information. The identifier field 1932 can include information that uniquely identifies this first usage statistic. The time field 1936 can include a time upon which this usage statistic was created or a time duration to which the usage statistic is associated. The date added field 1940 can be a date when the content or usage statistic was created. The when last field 1944 can be information about when the user had last accessed the content. There may be more or fewer fields than those shown in each usage statistic, for example, last used, most recently used, favorites, etc. There may be particular usage statistics for different types of media, for example, picture media, television channel episodes and series content, video content, etc. Thus, the information in each usage statistic 1920 may change depending on the type of media.

Figure 20:
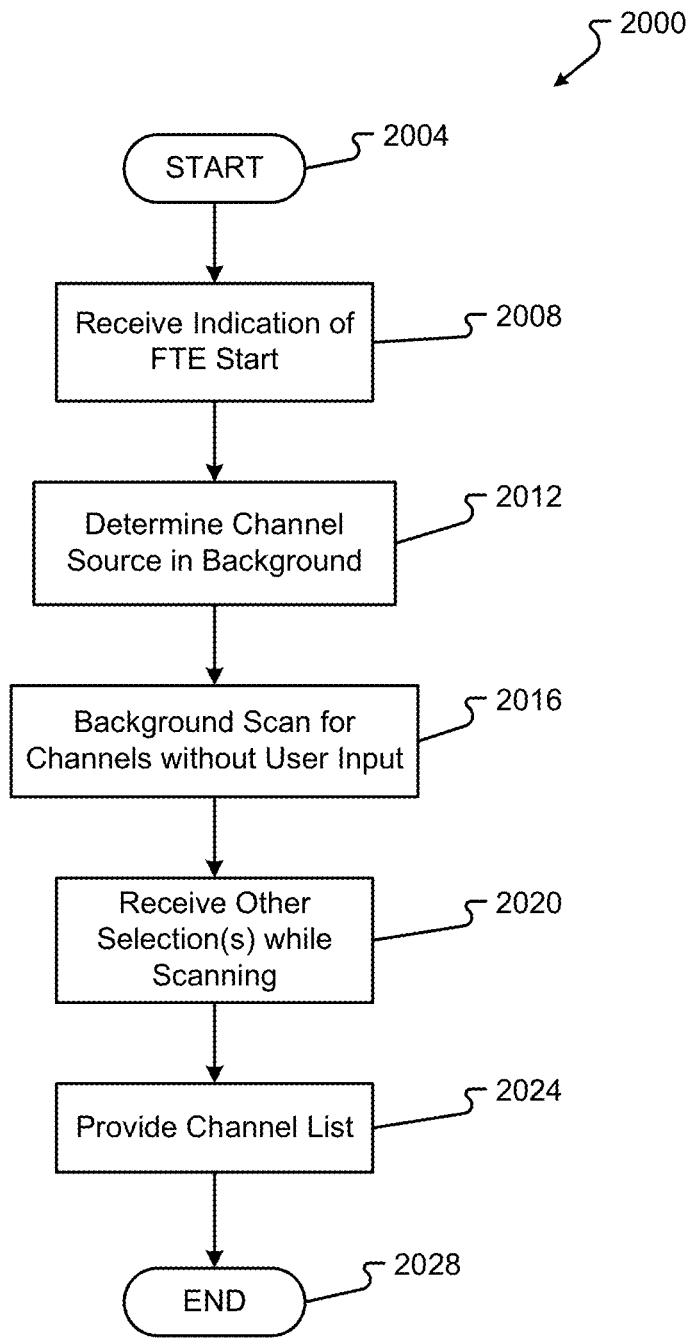
FIG. 20 is a flowchart view of an embodiment of a method for background scanning channels.

An embodiment of a method 2000 for auto-scanning channel information is shown in FIG. 20. While a general order for the steps of the method 2000 is shown in FIG. 20. Generally, the method 2000 starts with a start operation 2004 and ends with an end operation 2028. The method 2000 can include more or fewer steps or can arrange the order of the steps differently than those shown in FIG. 20. The method 2000 can be executed as a set of computer-executable instructions, executed by a computer system, and encoded or stored on a computer readable medium. Further, the method 2000 can be executed by a gate or other hardware device or component in an Application Specific Integrated Circuit, a Field Programmable Gate Array, or other type of hardware device. Hereinafter, the method 2000 shall be explained with reference to the systems, components, modules, software, data structures, user interfaces, etc. described herein.

The Intelligent TV 100 receives an indication of a first time experience (FTE) start, in step 2008. Here, the processor 364 receives the first signal by a user that the television is beginning to be operated. The processor 364 then may instruct the data service 432 to collect channel information. The data service 432 may execute the live TV subservice 1408 which creates an instance of the live TV source plug-in 1416. The live TV source plug-in 1416 may then interface with the encoding/decoding, compression/decompression module 366 connected to the antenna 324.

Figure 21:
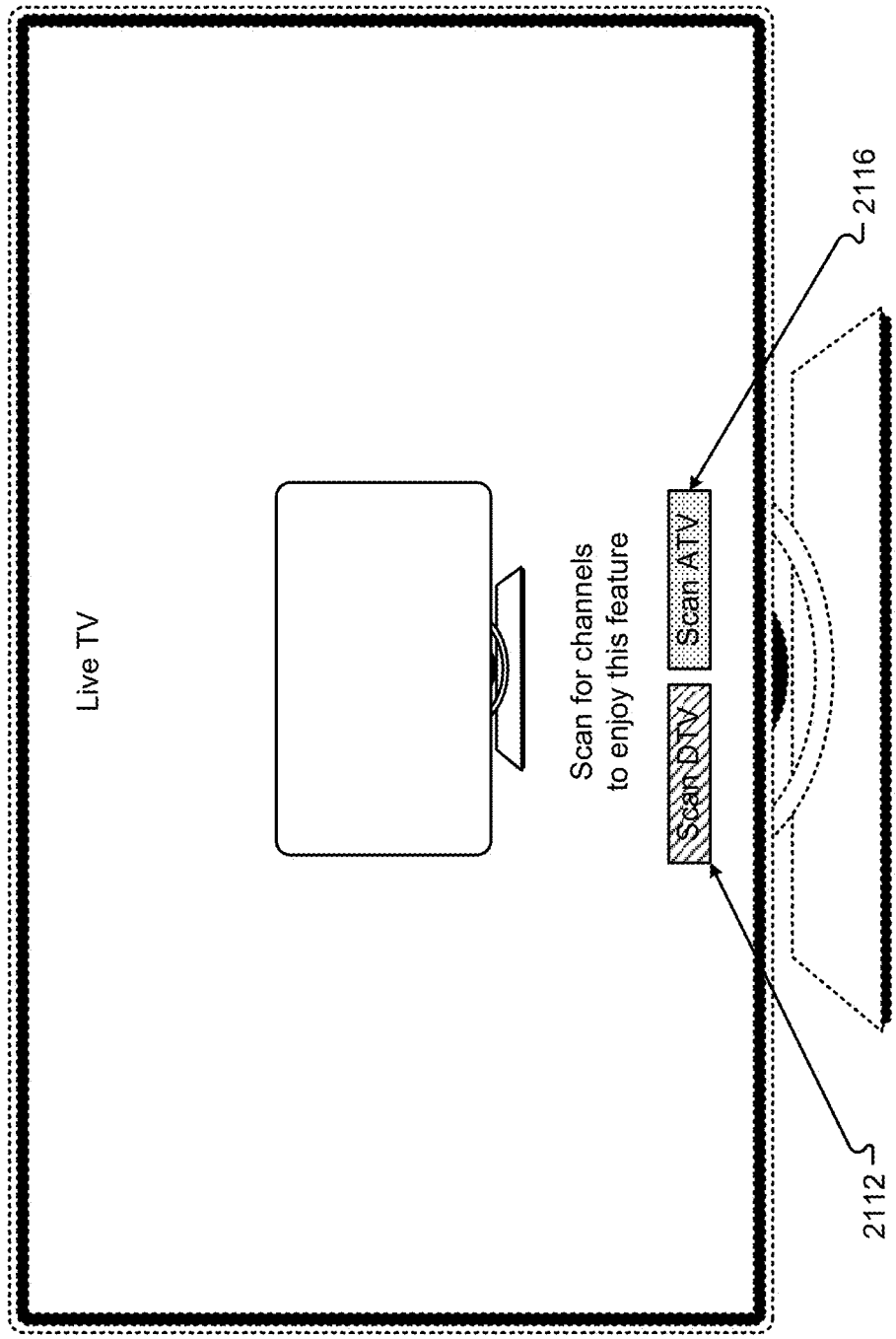
FIG. 21 is a view of an embodiment of a user interface for an Intelligent TV for managing data.

The live TV source plug-in 1416 may then do a background determination of the existence of any channel source, in step 2012. The "background" determination means that the user need not select a user interface device, for example, user interface device 2112 or 2116, as shown in FIG. 21. Rather, the user need only begin the first time experience. In this way, the user is not slowed in setting up the television by having to wait for the channel scan, but the channel scan occurs in the background during the FTE without the knowledge of the user.

Thus, the live TV source plug-in 1416 determines channel sources received by antennas or from other sources, such as from a port interface 352. Based on the channel source information, the live TV source plug-in 1416 may then do a background scan for channels on any antenna 324 or received from any port interfaces 352, in step 2016. The scanning involves determining if there is content being provided and then determining the information about that content. For analog television, the live TV source plug-in 1416 can determine which frequency ranges include data that may be provided for content viewing. This data may be in certain channel bands. For digital TV, the live TV source plug-in 1416 can determine which content packets are associated with which content providers.

This "channel" information may then be used to populate the database 1500, which is stored in database 1412. Thus, the live TV source plug-in 1416 populates the database 1500 while the user is making other selections during the first time experience, in step 2020. This means that the user, once completed with the first time experience, may not need to do a manual scan of the TV using the interface shown in FIG. 21. Thereinafter, the user interface application 468 can provide the channel list either as an electronic programming guide or some other user interface, in step 2024. In this way, the user interface application 468 can obtain the information from database 1500 to provide to the user for channel selection.

Figure 22:
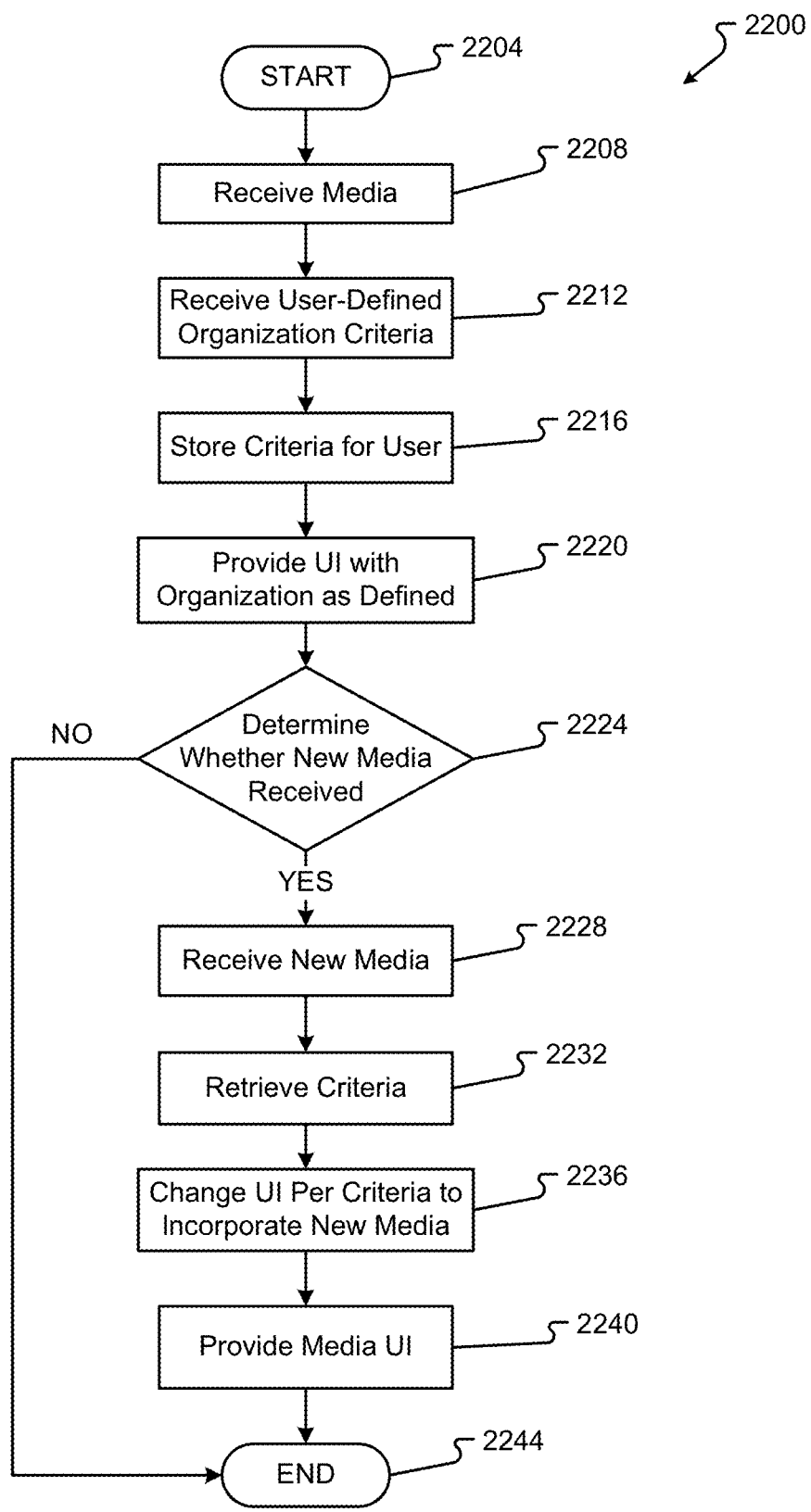
FIG. 22 is a flowchart view of an embodiment of a method for managing media.

An embodiment of the method 2200 for storing media in the Intelligent Television 100 is shown in FIG. 22. While a general order for the steps of the method 2200 is shown in FIG. 22. Generally, the method 2200 starts with a start operation 2204 and ends with an end operation 2244. The method 2200 can include more or fewer steps or can arrange the order of the steps differently than those shown in FIG. 22. The method 2200 can be executed as a set of computer-executable instructions, executed by a computer system, and encoded or stored on a computer readable medium. Further, the method 2200 can be executed by a gate or other hardware device or component in an Application Specific Integrated Circuit, a Field Programmable Gate Array, or other type of hardware device. Hereinafter, the method 2200 shall be explained with reference to the systems, components, modules, software, data structures, user interfaces, etc. described herein.

An Intelligent Television 100 may receive media, in step of 2208. Here, the processor 364 may detect a connection of a device or media source at a port interface 352. The connection may be to a local network 132, which connects to one or more local devices 168. Further, the connection may be through the network 132 to one or more visual media libraries 148, or through the telephone company 146 to a distant site, such as a social media site. The processor 364 may then execute the media subservice 628 to retrieve the media data and store the media data in the local database 640. The media subservice 628 may create an instance of the media source plug-in 652 to retrieve the media data, to receive the media data, and/or to store the media data in the database 640. Once the media is stored, the media subservice 628 may then organize the data.

In organizing the data, the media subservice 628 can receive user-defined organizational criteria, in step 2212. The criteria may determine how to organize types of media, for example, by date, by place, by time taken, and other information, which is stored in metadata in the media database 1600. Thus, any metadata 624 provided in the database 1600 stored in database 640 can be used to organize the media. Any information received by the user can be stored in data structures 1608. Thus, the media subservice 628 can store the user-defined criteria 1608, in step 2216.

Figure 23:
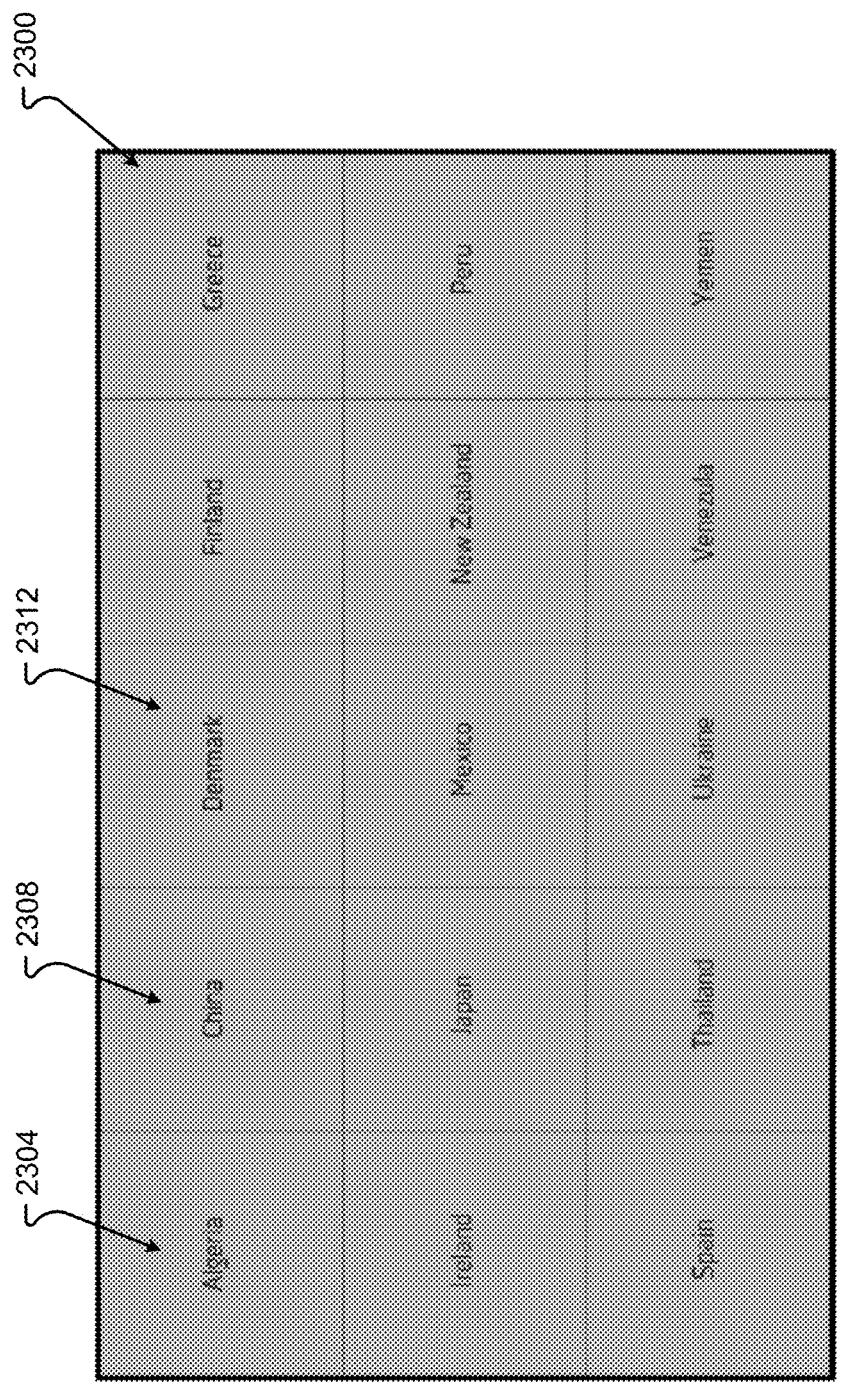
FIG. 23 is a view of an embodiment of a user interface for an Intelligent TV for managing data.

The media subservice 628 may then retrieve information from the database 640 to provide to the user interface application 468 to provide a user interface with the organization of the media as defined by the user, in step 2220. An example of a media user interface 2300 is shown in FIG. 23. In FIG. 23, the user interface 2300 organizes the media by the place at which place the video or photos were taken. For example, the user interface 2300 presents a bunch of location tiles 2304, 2308, 2312. These tiles 2304-2312 may be user-selectable devices to enter that category of media to view pictures associated with the place listed in the tile 2304-2312. The user may select to organize media by place taken, and then sort the tile category, for example, alphabetically or date ordered. In this case, as shown in FIG. 23, the place categories are organized alphabetically. This information may be user-defined, and stored in data structure 1608, but retrieved by media subservice 628 to provide the user interface 468.

Figure 27:
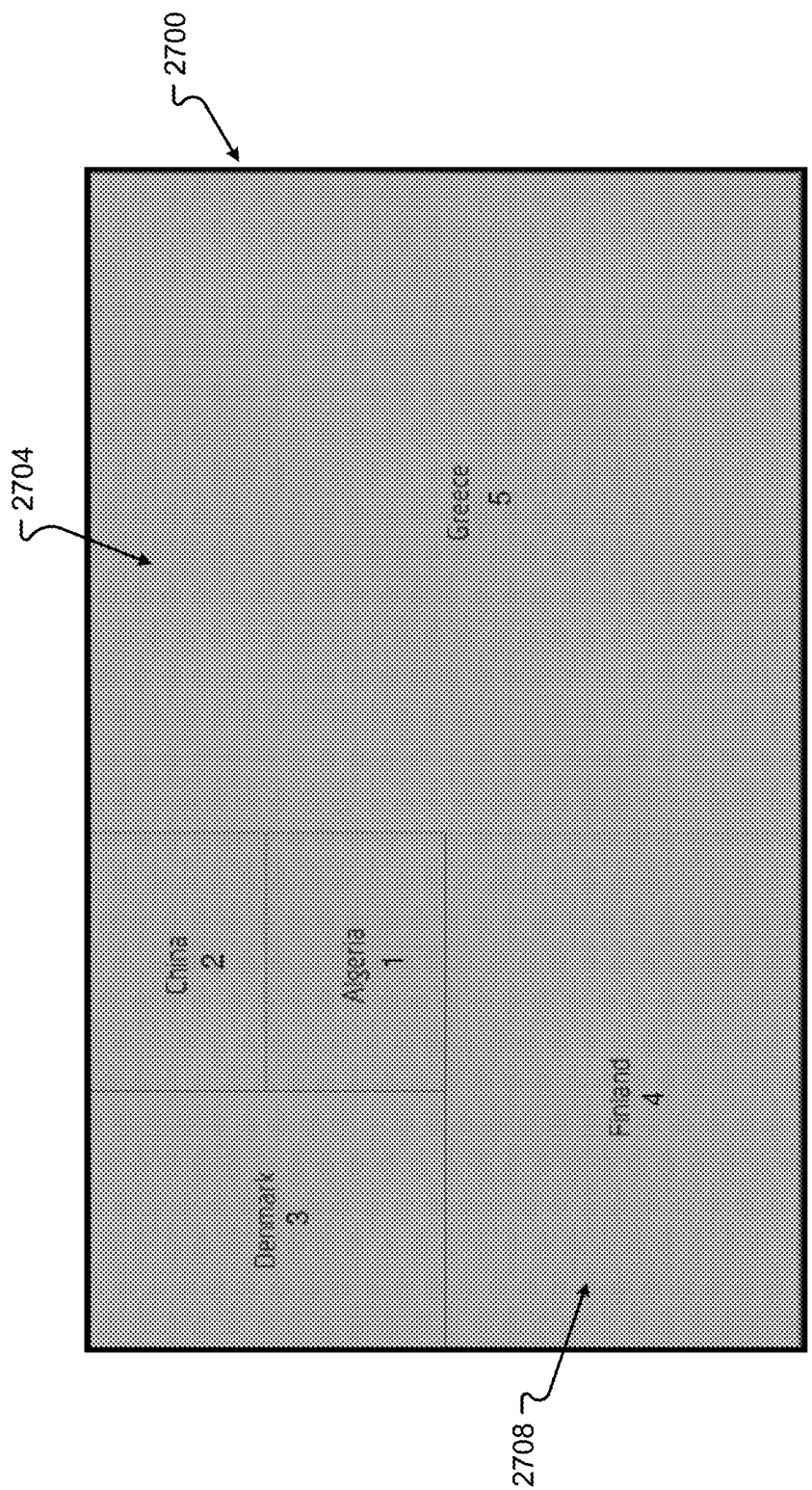
FIG. 27 is a view of an embodiment of a user interface for an Intelligent TV for managing data.

A second user interface 2700 is shown in FIG. 27. In FIG. 27, a different type of Fibonacci spiral view is presented in user interface 2700. Here again, the media may be organized by the place in which the media was taken. However, rather than being alphabetical or date ordered, the organization may be based on the number of photographs, or the amount of media presented or associated with the place. Thus, the most amount of media may be associated with the tile 2704, while the second most is associated with tile 2708. This type or organization may, again, be user-defined and stored in data structure 1608, and used by the media subservice 628 to provide information to the user interface application 468.

At some time thereinafter, the processor 364 may determine whether new media is received, in step 2224. The processor 364 may detect whether a new device 168 is attached to the network 132. In other circumstances, the processor 364 may scan media databases 148 to determine if there have been changes or updates made. If there has been new media received at the Intelligent Television 100, the method 2200 proceeds YES, to step 2228. If there is no new media received, then method 2200 proceeds NO to process operation 2244.

In step 2228, the processor 364 receives the new media in a process or operation similar to that described in conjunction with step 2208. The processor 364 may then execute the media subservice 628 to retrieve organizational criteria 1608, in step 2232. Here the media subservice 1628 may store the new media in database 1600, and then determine how to organize the new media based on the user-defined criteria 1608.

Figure 24:
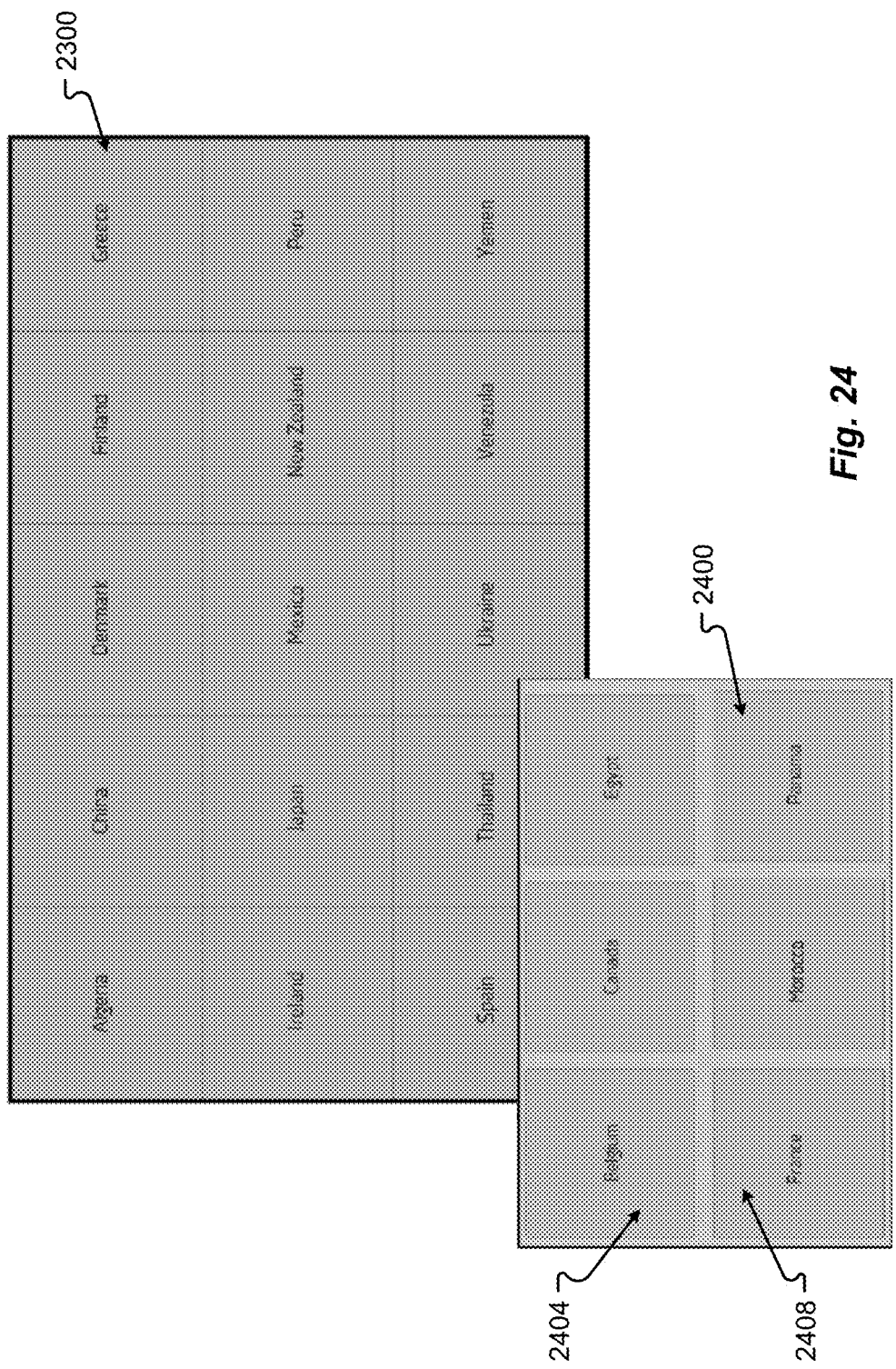
FIG. 24 is a view of an embodiment of a user interface for an Intelligent TV for managing data.

The media subservice 628 may then provide the new organized data to the user interface application 468, which can change the user interface, based on a user-defined criteria, to incorporate the new media, in step 2236. For example, as shown in FIG. 24, the user interface 468 may be providing an interface 2300 without the new media. The new media 2400 may include more media from different places, such as that associated with tiles 2404 and 2408. The media subservice 628 may provide this new information to the user interface application 468 to change the view of the media provided by the Intelligent Television 100.

Figure 25:
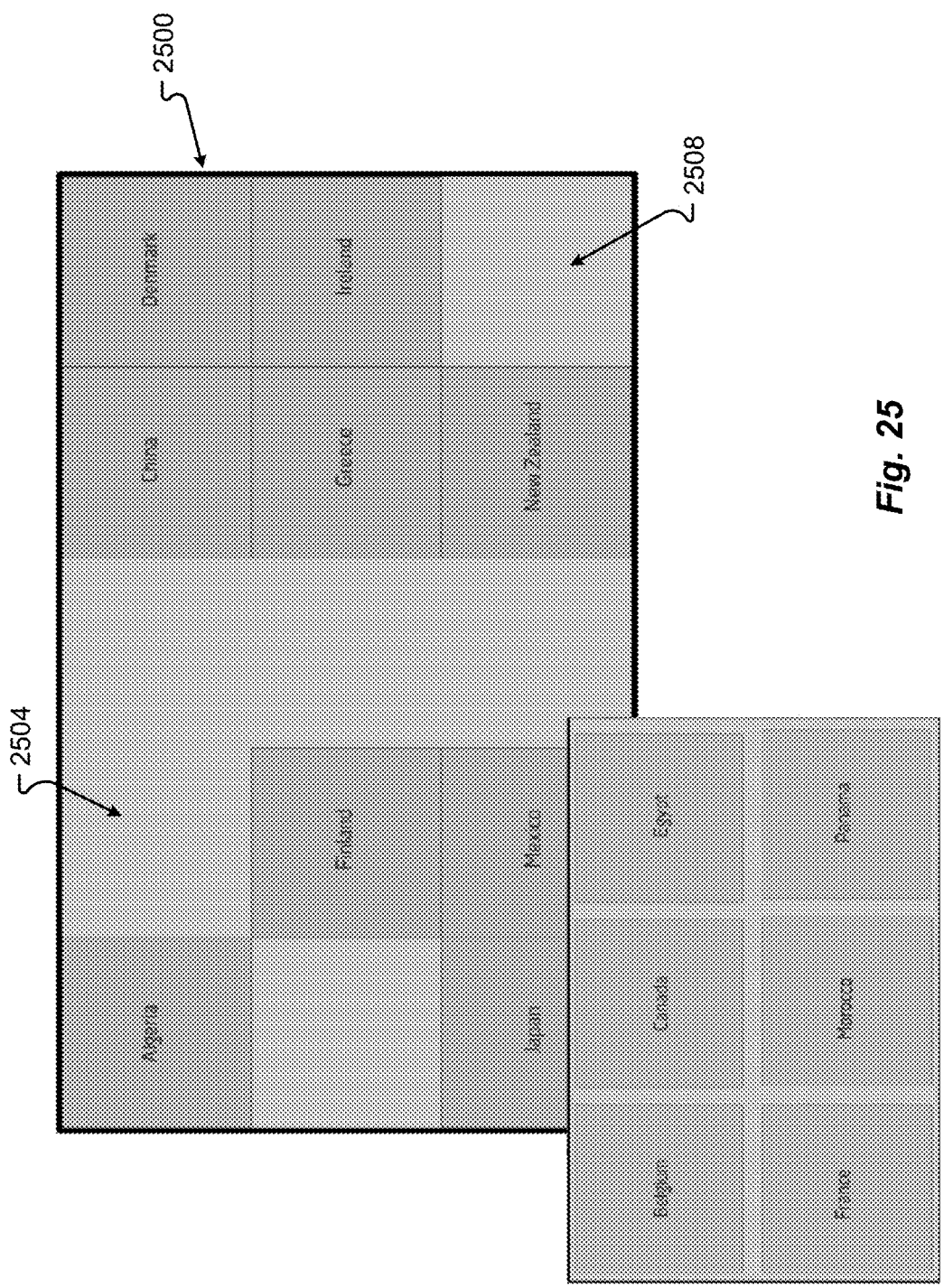
FIG. 25 is a view of an embodiment of a user interface for an Intelligent TV for managing data.
Figure 26:
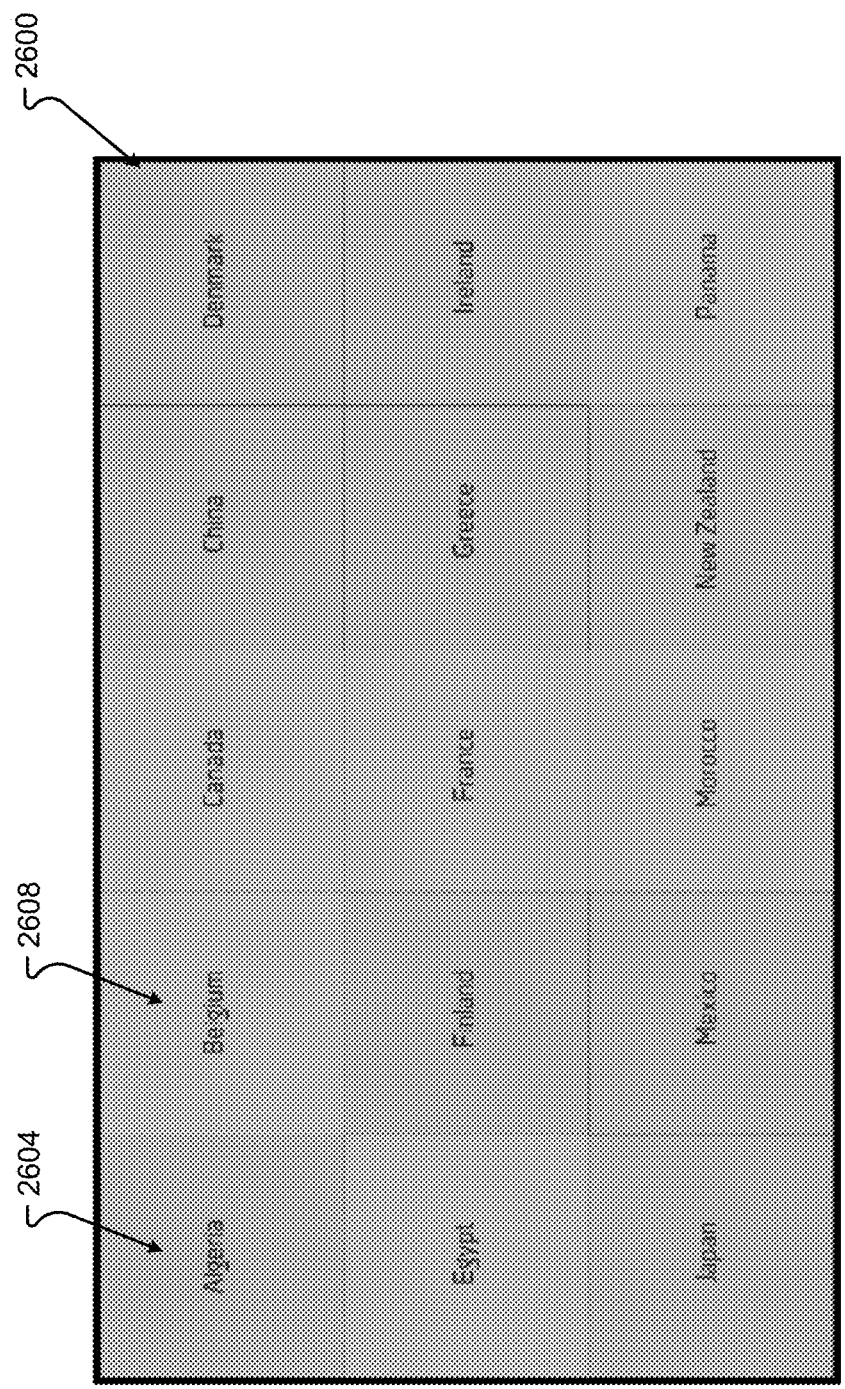
FIG. 26 is a view of an embodiment of a user interface for an Intelligent TV for managing data.

The user interface 468 may shift the user interface 2500 as shown in FIG. 25. Here, the user interface is providing spots or slots 2504, 2508, to insert the new media. Upon insertion of the new media, the user interface application 468 provides a user interface 2600, shown in FIG. 26. Here, the media subservice 628 has provided the new media information to allow the user interface application 468 to create a new tile arrangement with a new alphabetical arrangement of the location tiles, for example, 2604, 2608, that includes the new media. Thus, once organized and determined, the user interface application 468 provides the new interface, in step 2240.

Figure 28:
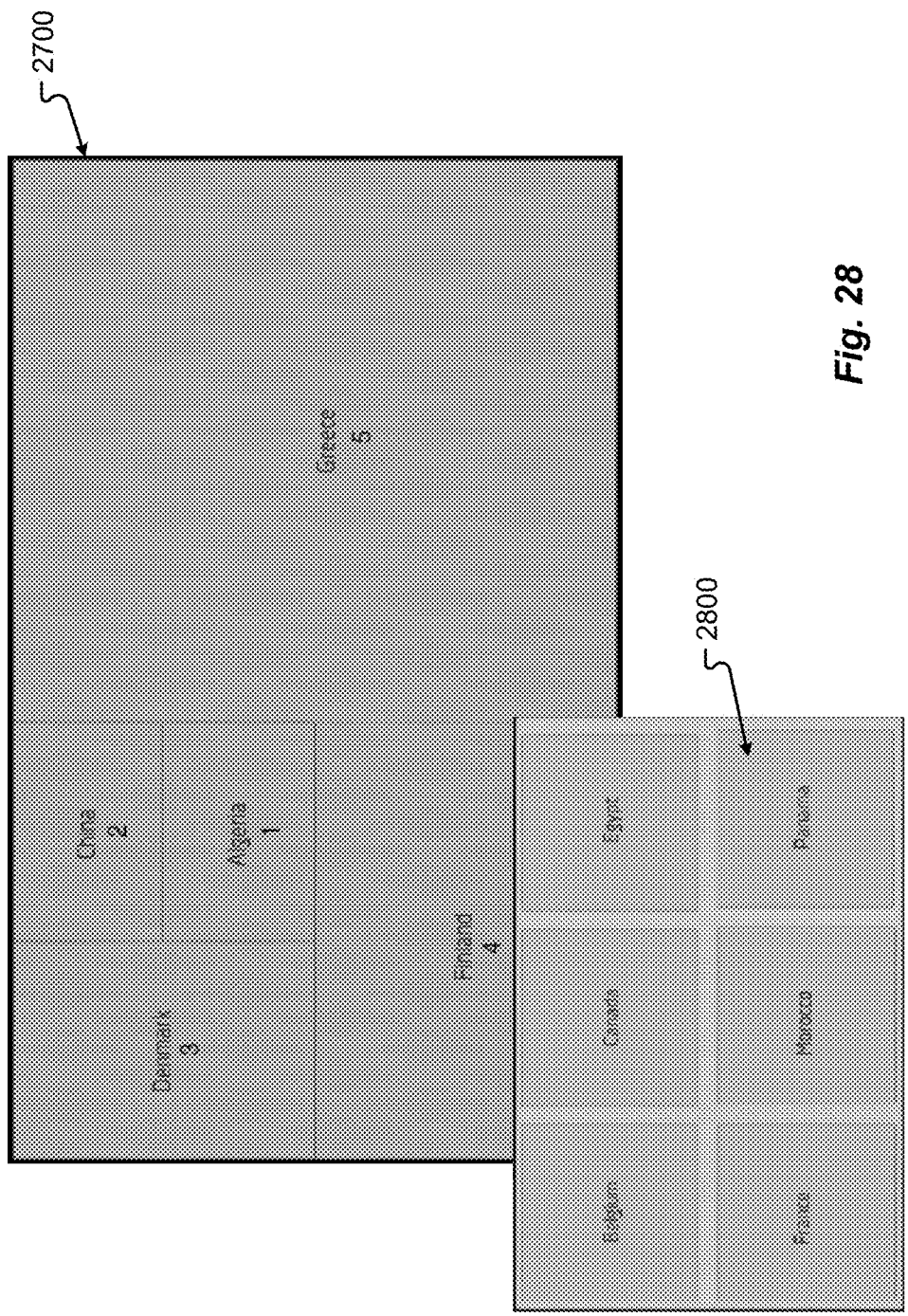
FIG. 28 is a view of an embodiment of a user interface for an Intelligent TV for managing data.
Figure 29:
FIG. 29 is a view of an embodiment of a user interface for an Intelligent TV for managing data.
Figure 30:
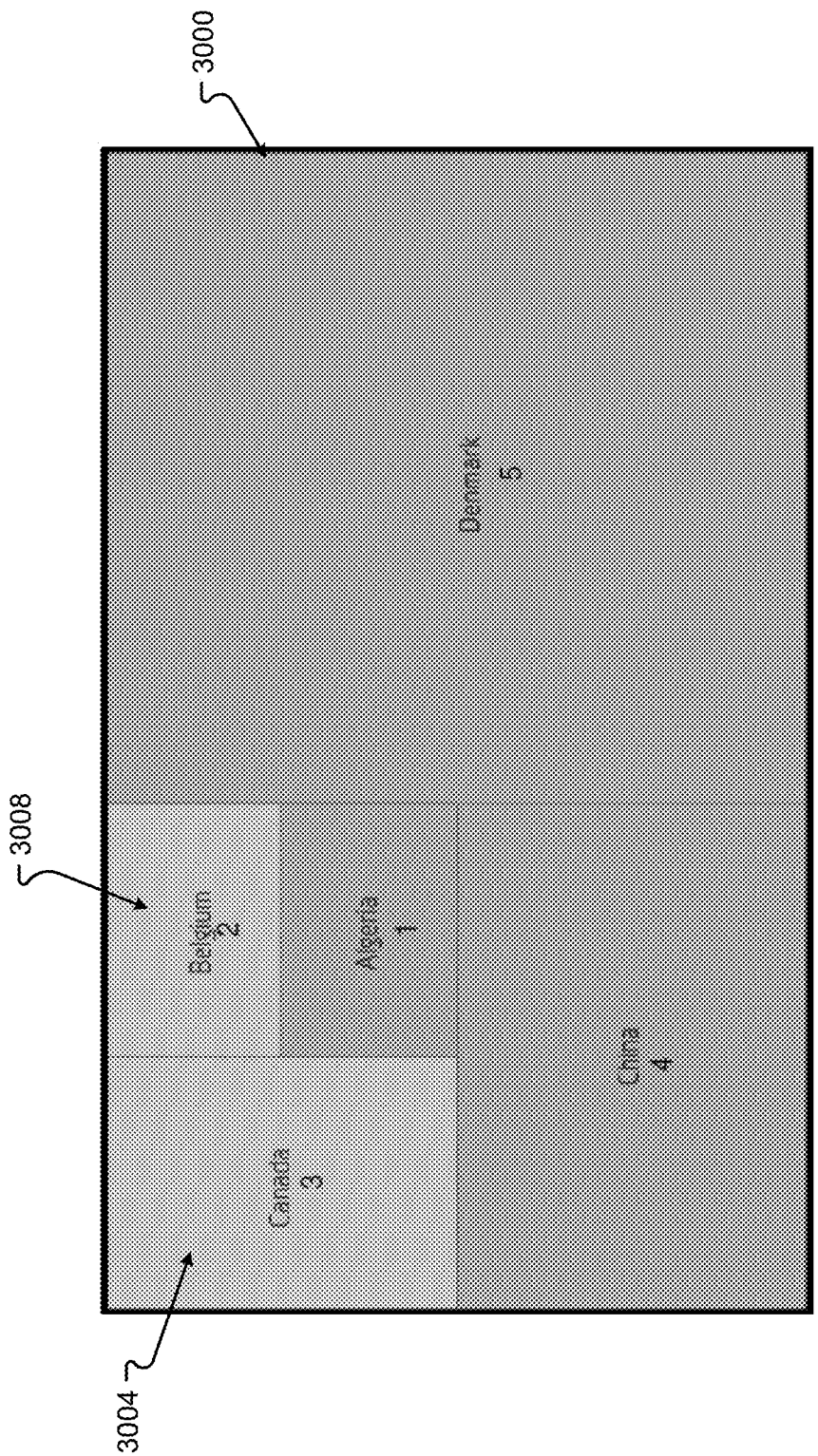
FIG. 30 is a view of an embodiment of a user interface for an Intelligent TV for managing data.

In another example, as shown in FIG. 28, user interface 2700 needs to be changed to incorporate new media 2800. The media subservice 628 can determine whether the new media 2800 has more media associated with certain new location tiles than that shown in original user interface 2700. If there are changes to be made, the media subservice 628 indicates as such to the user interface 468 to create spaces 2908 in user interface 2904, shown in FIG. 29. New tiles are created 3004 and 3008 and inserted in the user interface 3000, as shown in FIG. 30. Thus, the media subservice 628 can organize the information and dynamically change user interfaces or dynamically change the way media is provided based on predefined user organizational criteria 1608.

Figure 31:
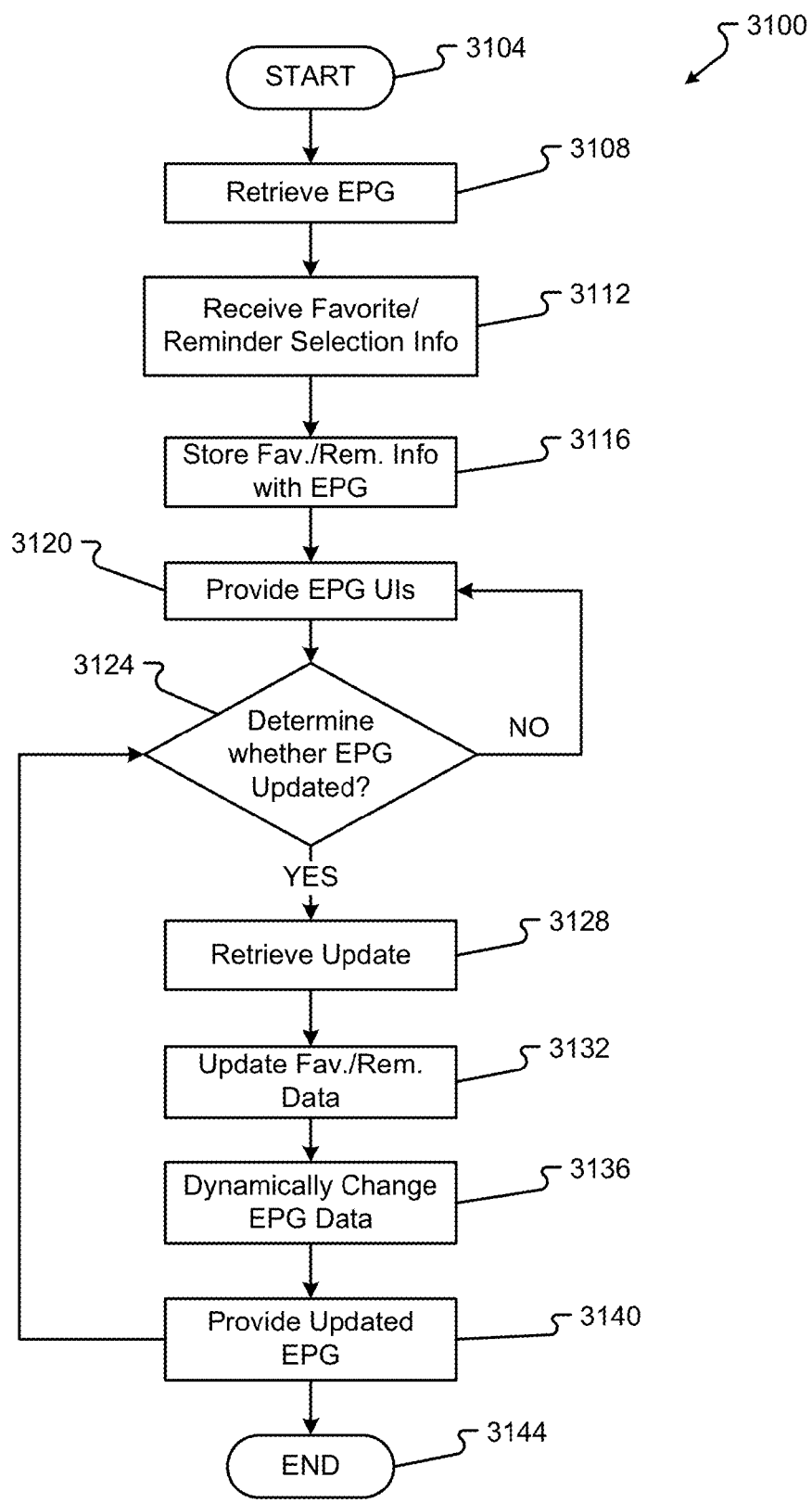
FIG. 31 is a flowchart view of an embodiment of a method for managing electronic programming guide information.

An embodiment of a method 3100 for dynamically changing EPG data is shown in FIG. 31. While a general order for the steps of the method 3100 is shown in FIG. 31. Generally, the method 3100 starts with a start operation 3104 and ends with an end operation 3144. The method 3100 can include more or fewer steps or can arrange the order of the steps differently than those shown in FIG. 31. The method 3100 can be executed as a set of computer-executable instructions, executed by a computer system, and encoded or stored on a computer readable medium. Further, the method 3100 can be executed by a gate or other hardware device or component in an Application Specific Integrated Circuit, a Field Programmable Gate Array, or other type of hardware device. Hereinafter, the method 3100 shall be explained with reference to the systems, components, modules, software, data structures, user interfaces, etc. described herein.

The processor 364 can execute the EPG subservice 624, which can create an instance of EPG source plug-in 648. The EPG source plug-in 648 can retrieve EPG data, in step 3108. Here, the EPG source plug-in 648 may connect through a network 132 to distant EPG information 136. This distant EPG information 136 may be then downloaded or retrieved by the EPG source plug-in 648 and stored in database 636. The database 636 can include the information as shown in database 1700, as shown in FIG. 17.

Figure 32:
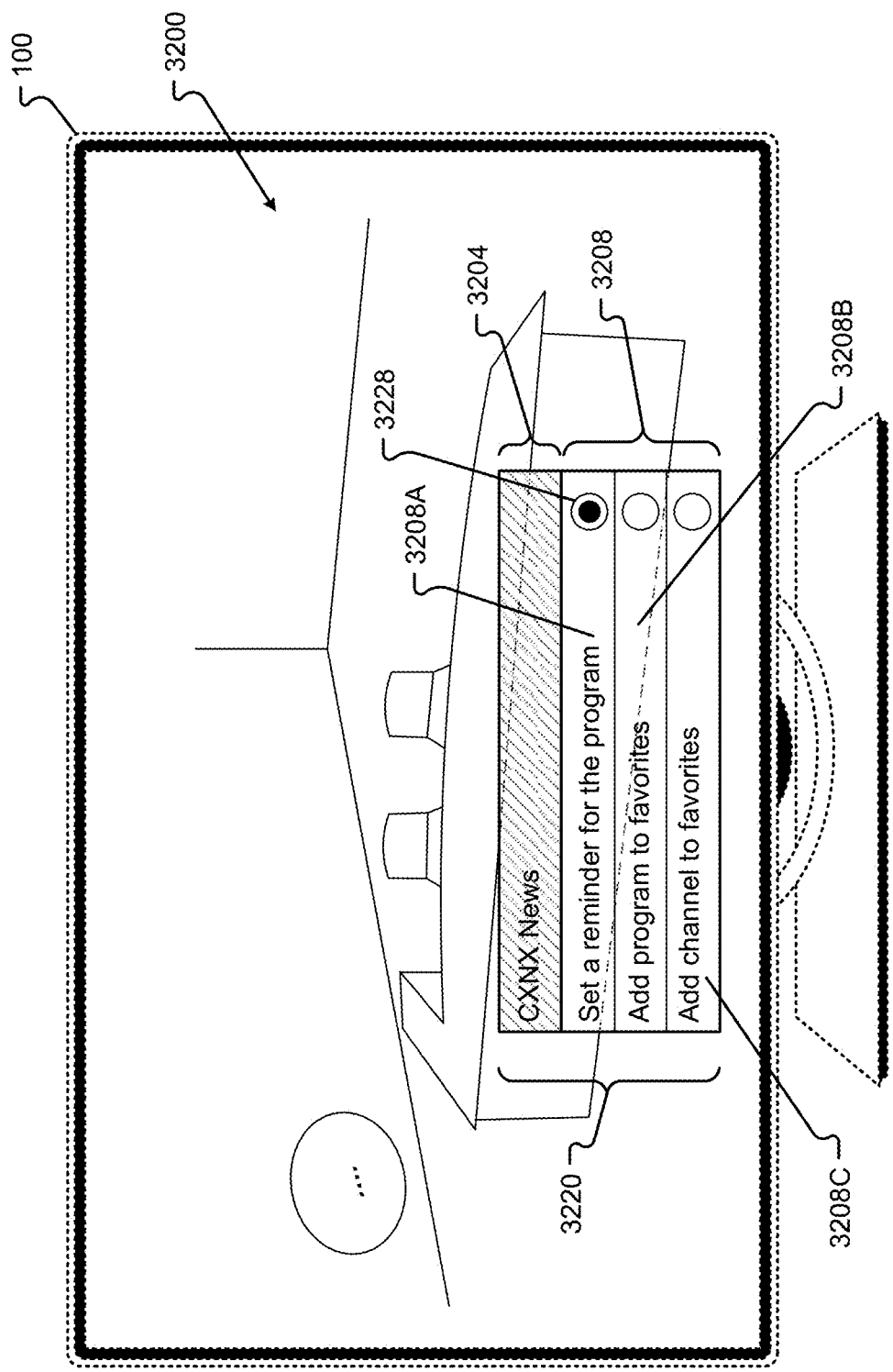
FIG. 32 is a view of an embodiment of a user interface for an Intelligent TV for managing data.

User interface 468 may also receive favorite or reminder information, in step 3112. For example, upon selection of a remote control button, the user interface 468 can provide a user interface menu 3220, shown in FIG. 32. Here, the user may set a reminder in section 3208A, can add the program as a favorite in section 3208B, or set the channel as a favorite in 3208C. This different information 3208 may be used to set specific attributes to the content for the user. The user need only select a button 3228 to set a reminder or make a favorite. This reminder or favorite then may be associated with the content indicated in banner 3204. The user interface 3200 allows the user to set such reminders or favorites for any of the content provided by the Intelligent TV 100. This information may be received by the user interface 468 and sent to the EPG subservice 624. The EPG subservice 624 may then store the favorite or reminder information with the EPG data, in step 3116.

Here, the EPG subservice 624 may store the favorites in field 1728, or reminders in field 1732. The information may then be maintained with the EPG data for that channel or program thereinafter.

At some time thereinafter, the processor 364 may inscribe or receive notice that the EPG subservice 624 needs to obtain updated EPG data from EPG source 136. Thus, the EPG source plug-in 648 can obtain and receive EPG data thereinafter. As some point, the EPG subservice 624 provides information to the user interface application 468 to provide EPG data, for example, through user interface 3300 shown in FIG. 33. A panel manager 536, or silo manager 532, can provide the EPG data, in step 3120.

The processor may thereinafter determine if an EPG update is available, in step 3124. If no EPG update is available, the method 3100 proceeds NO back to step 3120. However, if there is an update, the method 3100 proceeds YES to step 3128.

In step 3128, the EPG source plug-in 648 retrieves the EPG update, in step 3128. As explained previously, the EPG source plug-in 648 accesses new EPG data from EPG source 136 and stores the EPG data in the database 636. The EPG subservice 624 may then access the favorites 728 and reminders 732, associated with the EPG data, and update those favorites or reminder data, in step 3132. In this instance, the EPG subservice 624 can determine if any of the favorites 728 or reminders 732 apply to the updated information. If so, those favorites 728 and reminders 732 are copied over to the new EPG data. Thus, as updates are received, the EPG subservice 628 can dynamically change the EPG data, in step 3136.

Figure 33:
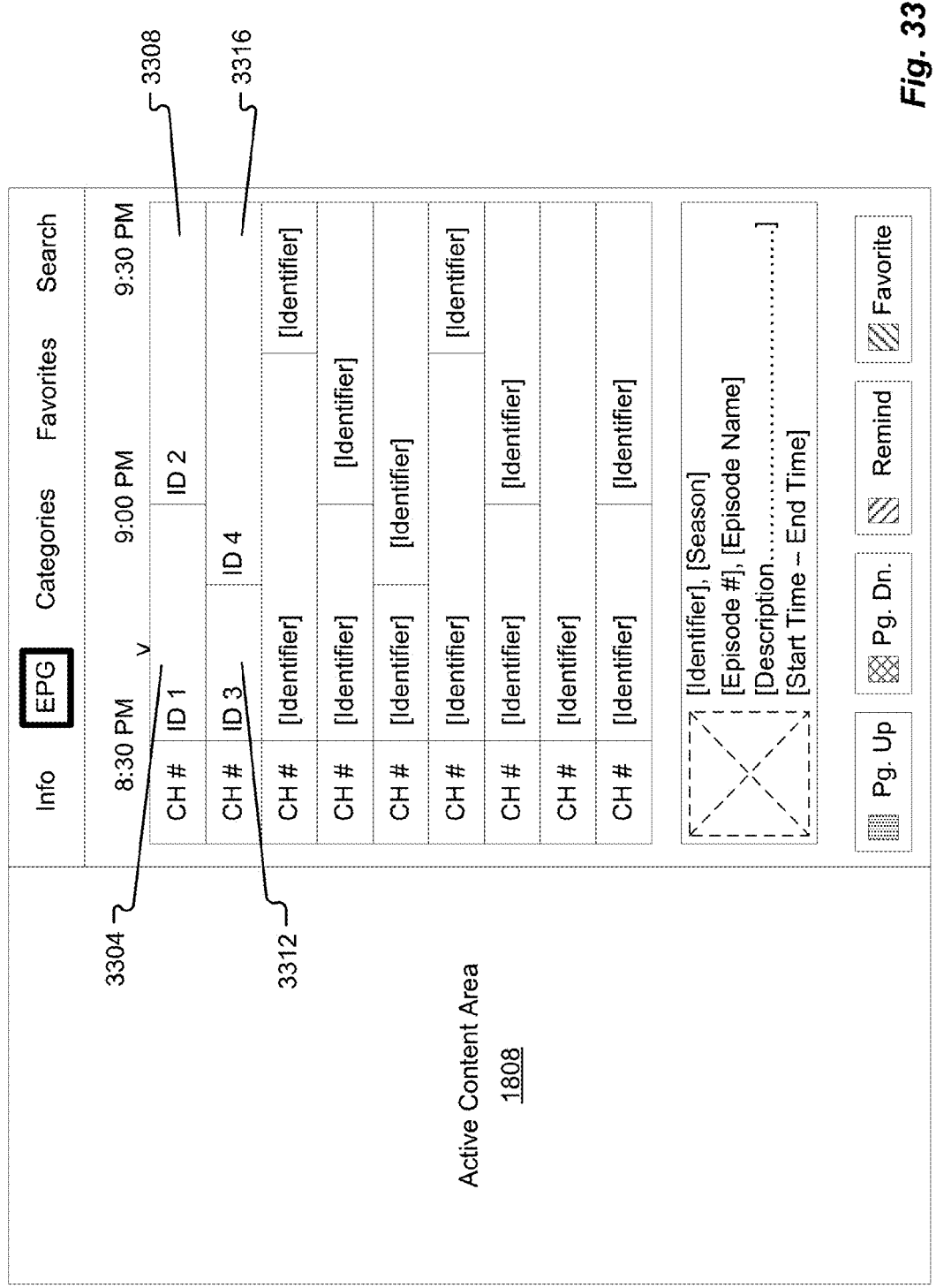
FIG. 33 is a view of an embodiment of a user interface for an Intelligent TV for managing data.

This updated information may then be provided as an update in a user interface, in step 3140. Here, the EPG data subservice 624 may send those updates to the user interface application 468 to be provided by the panel manager 536 or silo manager 532 in a user interface. For example, as shown in FIG. 33, EPG data includes fields 3304 through 3316 that have identifiers for certain content.

Figure 34:
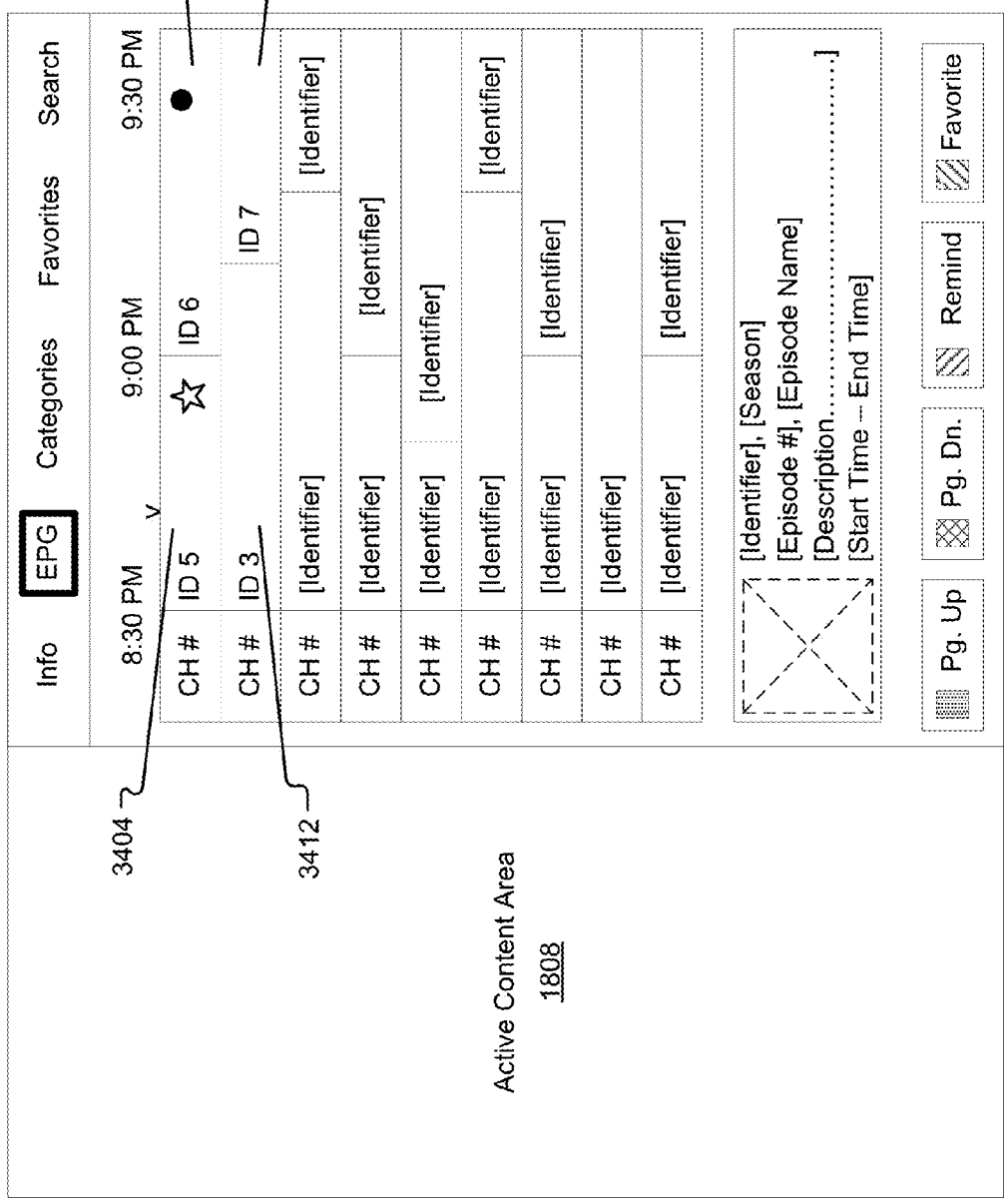
FIG. 34 is a view of an embodiment of a user interface for an Intelligent TV for managing data.

While viewing or before viewing, the EPG subservice 624 may change or update the data associated with those channels. Thus, the EPG subservice 624 can provide these updates to the silo manager 532 and/or panel manager 536 to change the user interface either dynamically, in real-time, or before the user views the EPG, thus providing a new user interface 3400 as shown in FIG. 34. Here, new programs are shown with new time data in fields 3404 through 3416. Further, the field 3404 indicates that the new program is a favorite by displaying a star in the field, and field 3408 indicates that the new program is a recommendation by displaying a dot (the dot can also mean that the content has already been watched). Thus, this information may be updated dynamically for the user as the user is viewing the EPG data. It may also be possible that the EPG data is not updated until the user decides to view and EPG user interface, thus showing changes in real-time or in near real-time, to when the user is viewing the actual information in the EPG user interface 3400.

Figure 35:
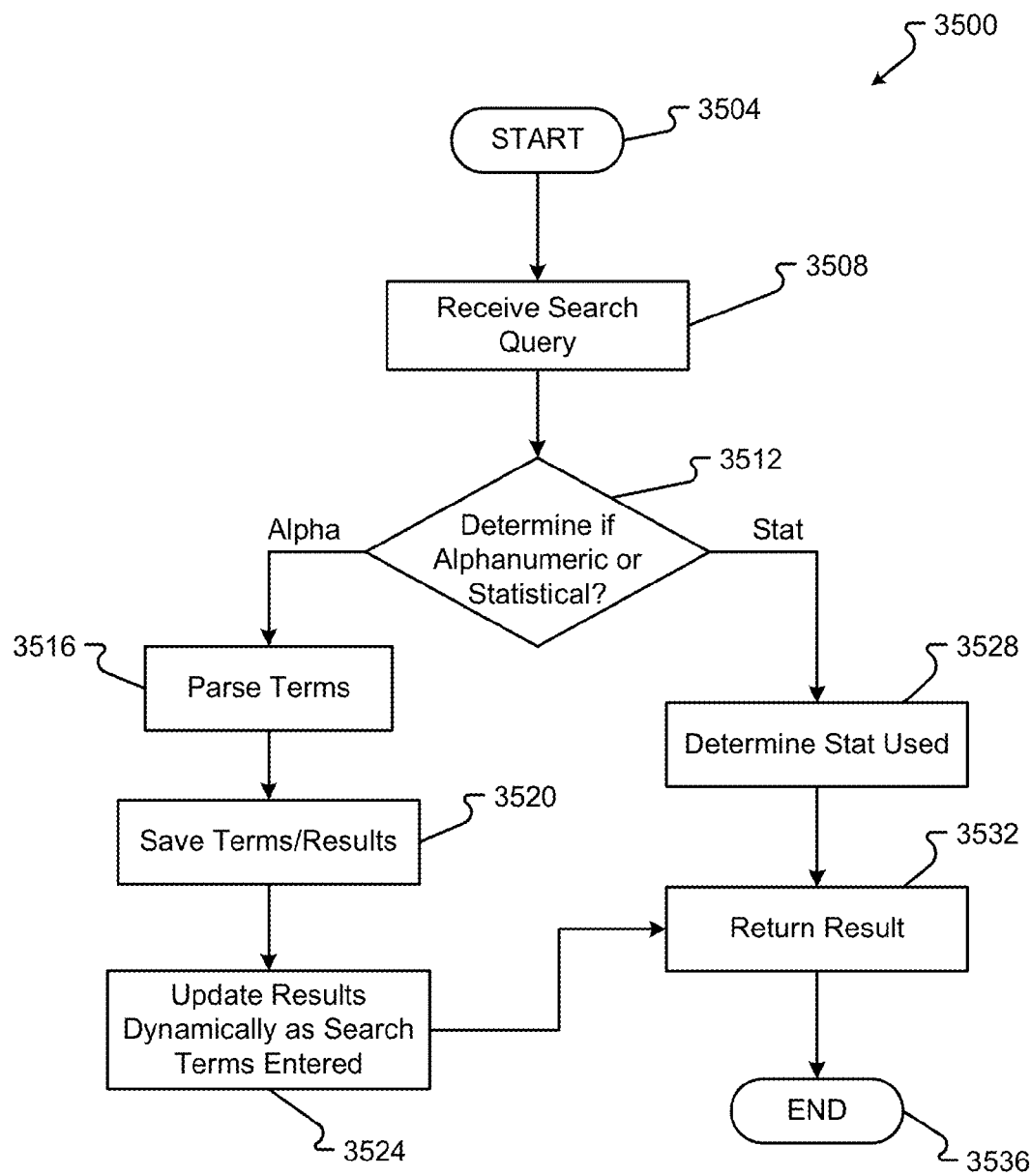
FIG. 35 is a flowchart view of an embodiment of a method for managing data.

An embodiment of a method 3500 for obtaining and saving search term results is shown in FIG. 35. While a general order for the steps of the method 3500 is shown in FIG. 35. Generally, the method 3500 starts with a start operation 3504 and ends with an end operation 3536. The method 3500 can include more or fewer steps or can arrange the order of the steps differently than those shown in FIG. 35. The method 3500 can be executed as a set of computer-executable instructions, executed by a computer system, and encoded or stored on a computer readable medium. Further, the method 3500 can be executed by a gate or other hardware device or component in an Application Specific Integrated Circuit, a Field Programmable Gate Array, or other type of hardware device. Hereinafter, the method 3500 shall be explained with reference to the systems, components, modules, software, data structures, user interfaces, etc. described herein.

Figure 36:
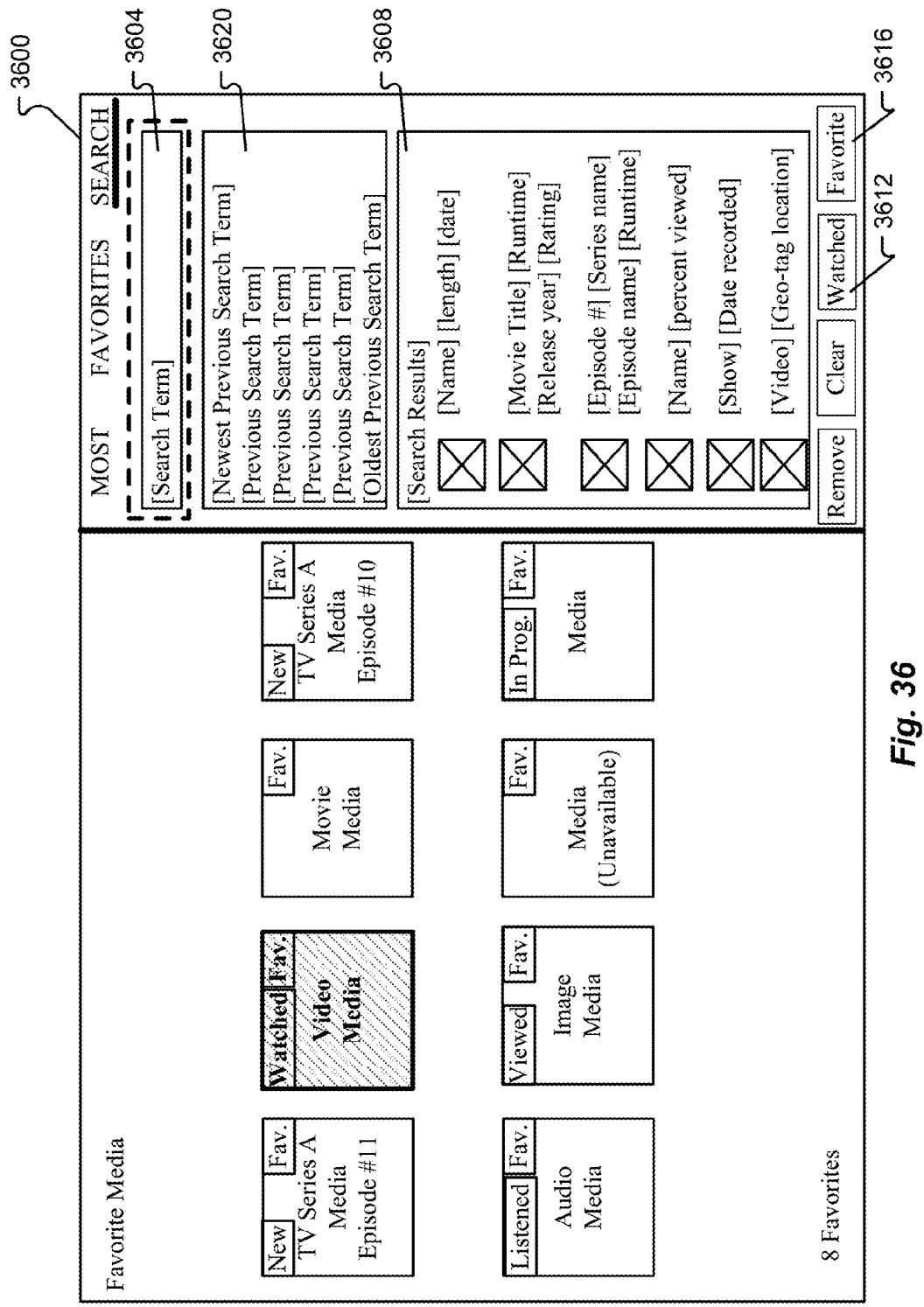
FIG. 36 is a view of an embodiment of a user interface for an Intelligent TV for managing data.

A search service associated with data service 432 may be able to search EPG data 636, media data 640, video demand data 632, or live TV data 1412. The data service 432 may receive a search query, in step 3508. For example, as shown in FIG. 36, the user may select a search panel 3600 and be provided with a display shown in FIG. 36. The search panel can include an area 3604 to enter search terms. These search terms can be an alphanumeric indication of a program that the user desires to try and locate. In other situations, the user may also search for statistic data, for example, favorites or most watched data indicated by user interface selections 3612 and 3616. A data service 432 may then determine if the search query is statistical, alphanumerical, in step 3512. If the search is alphanumeric, the method 3500 proceeds through the ALPHANUMERIC branch to step 3516 and step 3524. If the search is statistical, the method 3500 proceeds through the STATISTICAL branch to step 3528.

In step 3516, that data service 432 can parse the terms used in the search. Parsing the terms means determining or separating the terms for the search results, either for new combinations or other combinations of those terms. The data subservice 432 may then save these terms and any results associated with the search, in step 3512. Thus, the data service 432 may store search terms in database 1800, in field 1816, with the results stored in field 1820. This information may then be stored in statistics database 428, or in live TV database 1412.

The data service 432 may also provide results by scanning for the search terms dynamically as those search terms are entered. For example, as the user enters the first search term, the search results in field 3608, in FIG. 36, are provided. As the next term is entered, the list of results is pared according to the newly entered search term. This paring of search results continues until the user has completed entry of search terms in field 3604 or until a single result is provided in field 3608.

Figure 37:
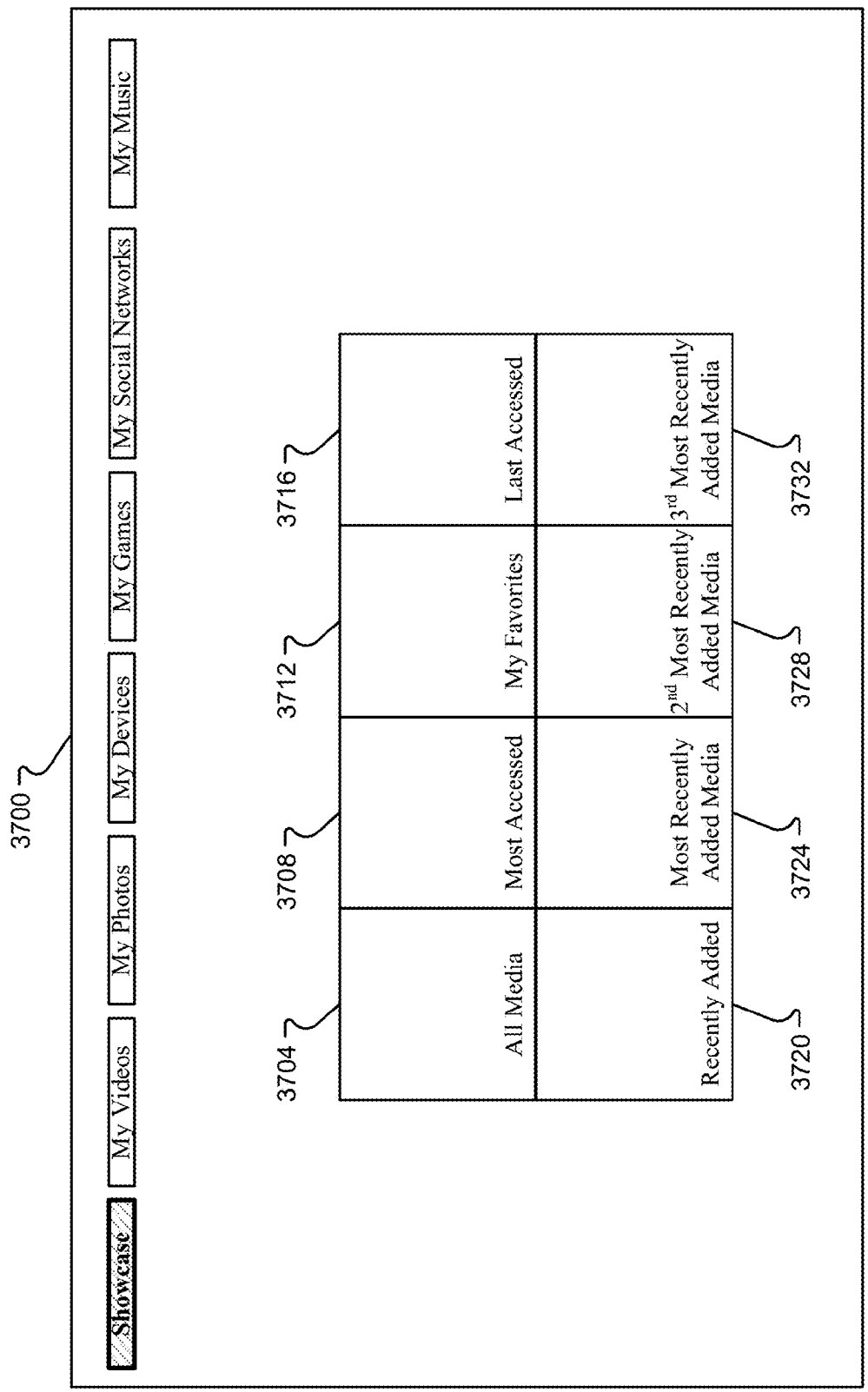
FIG. 37 is a view of an embodiment of a user interface for an Intelligent TV for managing data.

In step 3528, the data service 432 may determine the statistic chosen by the user. For example, in user interface 3700, shown in FIG. 37, the user may search for content based on one or more statistics based on all media 3704, most accessed 3708, favorites 3712, last accessed 3716, recently added 3720, next most recently added media 3724, second most recently added media 3728-3732, etc. Any of these different statistics may be chosen by the user.

Figure 38:
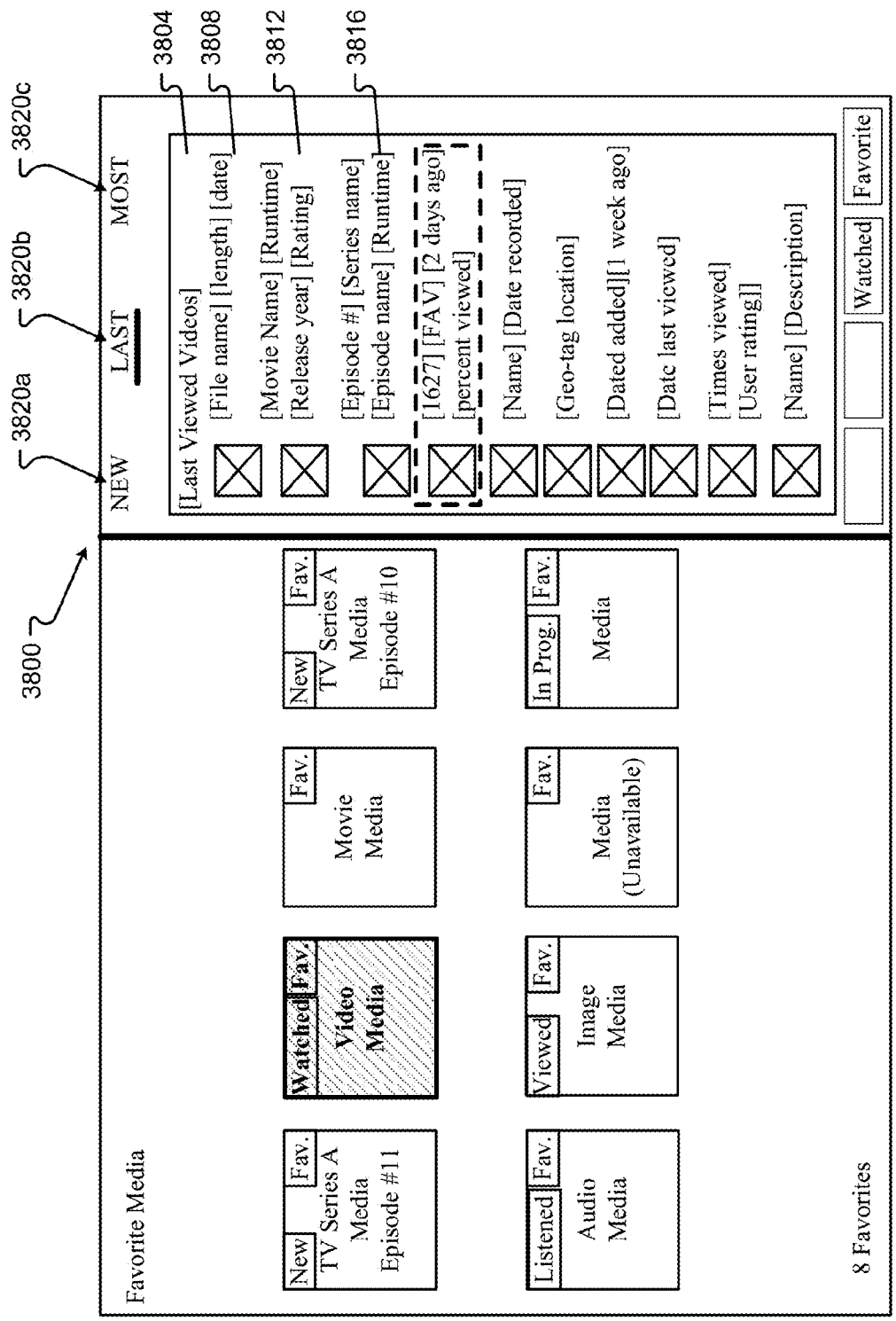
FIG. 38 is a view of an embodiment of a user interface for an Intelligent TV for managing data.

In another circumstance, the user may be provided with user interface 3800 shown in FIG. 38. Here, the user may select one or more categories, 3820*a* through 3820*c*, that better statistics that help sort the content. For example, the user has selected the last category 3820*b*, which then presents content based on the most recently last viewed video to the least most recent viewed video shown in fields 3804 through 3816.

Figure 39:
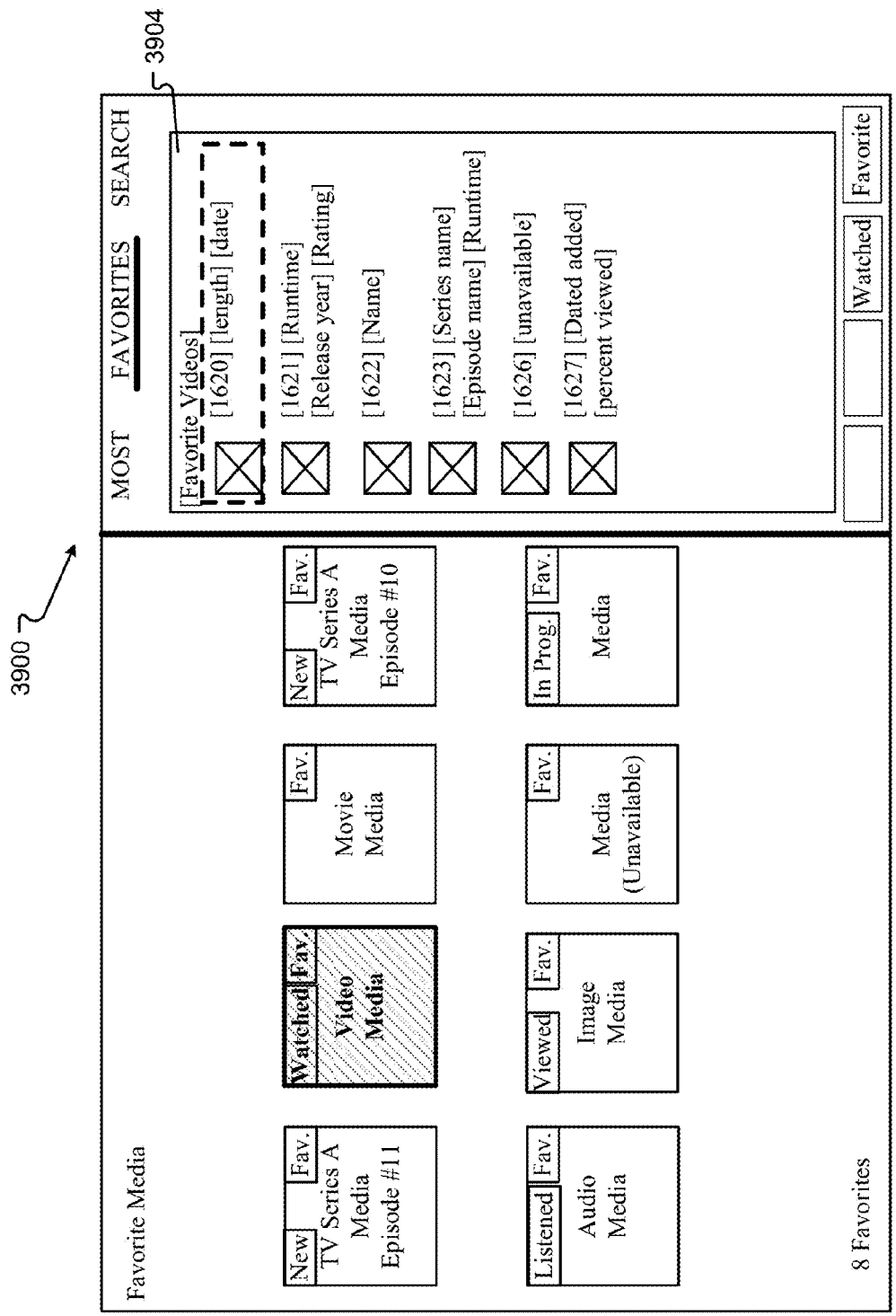
FIG. 39 is a view of an embodiment of a user interface for an Intelligent TV for managing data.

In user interface 3900 in FIG. 39, the user may sort be selected favorites that are stored with the EPG data 1700. Thus, the user may be provided with a list of favorites 3904. Thus, based on the type of search done, the EPG data service 432 may provide this information to the user interface application to provide for and instruct the silo manager 532 and/or panel manager 536 to provide a user interface of those search results, in step 3532. The user interface can be the same or similar to those described in FIGS. 36 through 39.

Figure 40:
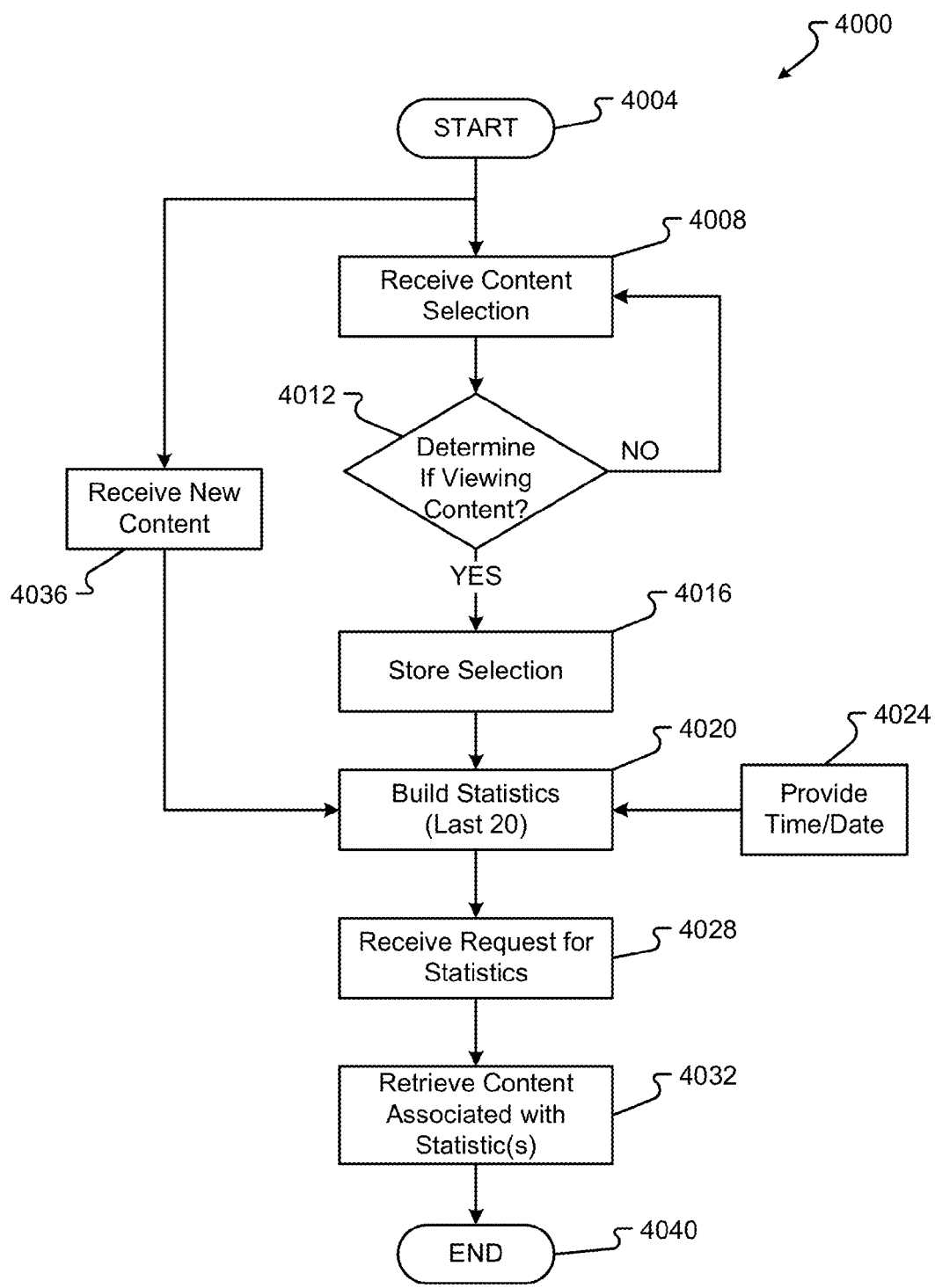
FIG. 40 is a flowchart view of an embodiment of a method for storing statistics about user behavior.

An embodiment of a method 4000 for recording usage statistics, or statistics about the content for searches is presented in FIG. 40. While a general order for the steps of the method 4000 is shown in FIG. 40. Generally, the method 4000 starts with a start operation 4004 and ends with an end operation 4040. The method 4000 can include more or fewer steps or can arrange the order of the steps differently than those shown in FIG. 40. The method 4000 can be executed as a set of computer-executable instructions, executed by a computer system, and encoded or stored on a computer readable medium. Further, the method 4000 can be executed by a gate or other hardware device or component in an Application Specific Integrated Circuit, a Field Programmable Gate Array, or other type of hardware device. Hereinafter, the method 4000 shall be explained with reference to the systems, components, modules, software, data structures, user interfaces, etc. described herein.

The user interface application 468 can receive a content selection, in step 4008. Here, the user may select a remote control button from the remote control 700. The remote control may send a signal to the IR/RF module 354. This signal may then be presented to the processor 364, which may execute a driver 420 to interpret the electrical signal. The driver 420 can then send a signal to the user interface application 468. The user interface application 468 can interpret the data in the signal as selecting an item of content.

The statistics subservice 1424 may, in response to the selection, determine if the content is being viewed, in step 4012. The determination of whether the content is being viewed may be a determination of how long the user loiters on the content before the Intelligent TV 100 receives another content selection. The determination can be some other determination that the user is viewing the content, rather than simply surfing though channels. If the content is being viewed, the method 4000 proceeds YES to step 4016. If the content is not being viewed, the method 4000 proceeds NO back to step 4008.

In step 4016, the statistic subservice 1424 stores the election of content and the information about the content in the database 1428. Thus, the statistics subservice 1424 can create a data structure 1904 to store statistics about the content selection. The statistic subservice 1424 then builds a statistic database 1900 that is associated with selected content. the user, and other data, in step 4020. For example, the statistic subservice 1424 can create usage statistics 1920 and 1924.

Further, in step 4036, the statistic subservice 1424 can receive information about new content received and uploaded into EPG data 1700, in step 4036. The statistic subservice 1424 can include this information into statistics about TV data in the statistics database 1900. This information can include an ID of the content, and time/date added 1936, 1940.

Further, the statistic subservice 1424 can receive the time and date information, in step 4024. Thus, the processor 364 can provide information about current time and date to allow the statistic subservice 1424 to establish time tags and date tags for when content was received, when the content was last viewed, and other information. This information then builds a statistics database 1900. The statistic subservice 1424 may minimize the amount of data stored by only storing information about the last 20 items of content viewed or used by the user. Or for each category, only provide the last 20 entries. This restriction eliminates a large and growing database within the Intelligent TV 100.

At some time thereinafter, the Intelligent Television 100 can receive a request for statistics, in step 4028. Here, the user may decide to search or look at information about the content. The user may select a remote control button on remote control 700, or some other interface in the Intelligent Television, which will send a signal to the processor 364. The processor may then send a request for information to the statistic subservice 1424 to retrieve the data to be presented to the user.

The statistic subservice 1424 can then retrieve the content by searching the content fields in data structure 1904 for the type of statistics desired by the user. This information may then be presented, in a user interface, developed by the user interface application 464. In other circumstances, the Intelligent Television 100 may receive a request for statistics from a customer service or other outside system or operation. The customer service application 144 can send a request for statistics through the network 132 to the Intelligent Television 100. This request may be for statistics about what programs the user is viewing. The processor 364 can then send a request to statistic subservice 1424 to retrieve the data associated with how the user is interacting with the television 100, including what content has been viewed, for how long that content was viewed, and any viewed content, any favorites, any reminders, any applications being used by the user, any media being viewed by the user, etc. This information may then be packaged in a data file, which is sent by the processor 364 through the port interfaces 352 and through the network 132, back to the customer service operation 144. Thus, the Intelligent Television 100 allows for outside data collection, which can then help to better target content and advertising to the user.

The exemplary systems and methods of this disclosure have been described in relation to an Intelligent Television. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for managing data associated with an intelligent television, the method comprising:

receiving media associated with a user at the intelligent television, wherein the media includes one or more of a text, audio, a still image, an animation, a video, or interactivity content, wherein at least a portion of the media includes user-created media, wherein the user-created media includes one or more of a user-created text, user-created audio, a user-created still image, a user-created animation, a user-created video, or user-created interactivity content, wherein the user-created media is generated from a second device and uploaded to the intelligent television;

receiving one or more user-defined organization criteria;

storing the one or more user-defined organization criteria;

organizing the media based on the one or more user-defined organization criteria;

providing a user interface displaying a representation of the media and organized based on the one or more user-defined organization criteria, wherein the media includes one or more of a video file, a picture file, or an audio file, wherein the media includes a source, and wherein the source of the media is also stored, wherein the media includes one or more items of metadata stored with the media, and wherein the user-defined criteria sort the media based on one or more of the metadata, wherein the metadata includes one or more of a location at which the media was created, a time at which the media was created, and a date at which the media was created, wherein the media is stored in a media database that is local to the intelligent television, wherein there are two or more user-defined organization criteria are stored as categories in the media database, wherein a first set user-defined organization criteria are associated with a first user and a second set user-defined organization criteria are associated with a second user, determining whether new media has been received;

if new media has been received, retrieving the one or more user-defined organization criteria;

changing the user interface to incorporate the new media while based on the one or more user-defined organization criteria; and providing the changed user interface.

2. The method as defined in claim 1, wherein the intelligent television receives new media from a device in communication with the intelligent television.

3. The method as defined in claim 2, wherein the intelligent television detects a connection of the device to a local network connected to the intelligent television.

4. The method as defined in claim 2, wherein the intelligent television detects a connection of the device to a port interface of the intelligent television.

5. The method as defined in claim 1, wherein at least a portion of the media is retrieved from a second source distant to the intelligent television.

6. The method as defined in claim 5, wherein the intelligent television creates an instance of a media source plug-in to retrieve the retrieved from the at least a portion of the media retrieved from the second source distant to the intelligent television.

7. The method as defined in claim 1, wherein the media is displayed in the user interface as a presentation of two or more tiles depicting photos.

8. The method as defined in claim 7, wherein the tiles are organized by date.

9. The method as defined in claim 7, wherein the tiles are associated with a place.

10. The method as defined in claim 9, wherein the tiles are sized based on an amount of media associated with the place.

11. The method as defined in claim 1, wherein the media is displayed in the user interface as a Fibonacci spiral of three or more tiles depicting photos.

12. An intelligent television system comprising:
a memory operable to store social media data;
a processor in communication with the memory, the processor operable to:
execute a live television sub service operable to:
receive media associated with a user at the intelligent television, wherein the media includes one or more of a text, audio, a still image, an animation, a video, or interactivity content, wherein at least a portion of the media includes user-created media, wherein the user-created media includes one or more of a user-created text, user-created audio, a user-created still image, a user-created animation, a user-created video, or user-created interactivity content, wherein the user-created media is generated from a second device and uploaded to the intelligent television;
receive one or more user-defined organization criteria;
store the one or more user-defined organization criteria;
organize the media based on the one or more user-defined organization criteria;
execute a user interface application in communication with the live television subservice, the user interface application operable to provide a user interface that displays a representation of the media and organized based on the one or more user-defined organization criteria, wherein the media includes one or more of a video file, a picture file, or an audio file, and wherein the media includes a source, and wherein the source of the media is also stored, wherein the media includes one or more items of metadata stored with the media, and wherein the use-defined criteria sort the media based on one or more of the metadata, and wherein the metadata includes one or more of a location at which the media was created, a time at which the media was created, and a date at which the media was created, wherein there are two or more user-defined organization criteria are stored as categories in the media database, and wherein a first set user-defined organization criteria are associated with a first user and a second set user-defined organization criteria are associated with a second user, and
determine whether new media has been received, wherein the intelligent television receives new media from a device in communication with the intelligent television;
if new media has been received, retrieve the one or more user-defined organization criteria;
change the user interface to incorporate the new media while organized based on the one or more user-defined organization criteria; and
provide the changed user interface.

13. The intelligent television system as defined in claim 12, wherein the processor detects a connection of the device to a local network connected to the intelligent television.

14. The intelligent television system as defined in claim 12, wherein the processor detects a connection of the device to a port interface of the intelligent television.

15. The intelligent television system as defined in claim 12, wherein at least a portion of the media is retrieved from a second source distant to the intelligent television.

16. The intelligent television system as defined in claim 15, wherein the processor creates an instance of a media source plug-in to retrieve the retrieved from the at least a portion of the media retrieved from the second source distant to the intelligent television.

17. A non-transitory computer readable medium having stored thereon processor executable instructions that cause a computing system to execute a method, the instructions comprising:
  instructions to receive media associated with a user at the intelligent television, wherein the media includes one or more of a text, audio, a still image, an animation, a video, or interactivity content, wherein at least a portion of the media includes user-created media, wherein the user-created media includes one or more of a user-created text, user-created audio, a user-created still image, a user-created animation, a user-created video, or user-created interactivity content, wherein the user-created media is generated from a second device and uploaded to the intelligent television;
  instructions to receive one or more user-defined organization criteria;
  instructions to store the one or more user-defined organization criteria;
  instructions to organize the media based on the one or more user-defined organization criteria; and
  instructions to provide a user interface that displays a representation of the media and organized based on the one or more user-defined organization criteria, wherein the media includes one or more of a video file, a picture file, or an audio file, and wherein the media includes a source, and wherein the source of the media is also stored, wherein the media includes one or more items of metadata stored with the media, and wherein the user-defined criteria sort the media based on one or more of the metadata, and wherein the metadata includes one or more of a location at which the media was created, a time at which the media was created, and a date at which the media was created, wherein there are two or more user-defined organization criteria are stored as categories in the media database, and wherein a first set user-defined organization criteria are associated with a first user and a second set user-defined organization criteria are associated with a second user;
  instructions to determine whether new media has been received, wherein the intelligent television receives new media from a device in communication with the intelligent television;
  if new media has been received, instructions to retrieve the one or more user-defined organization criteria;
  instructions to change the user interface to incorporate the new media while organized based on the one or more user-defined organization criteria; and
  instructions to provide the changed user interface.

18. The non-transitory computer readable medium as defined in claim 17, wherein the media is displayed in the user interface as a presentation of two or more tiles depicting photos.

19. The non-transitory computer readable medium as defined in claim 17, wherein the tiles are organized by date.

20. The non-transitory computer readable medium as defined in claim 17, wherein the tiles are associated with a place, and wherein the tiles are sized based on an amount of media associated with the place.

* * * * *

UNITED STATES PATENT AND TRADEMARK OFFICE
CERTIFICATE OF CORRECTION

PATENT NO. : 9,686,582 B2
APPLICATION NO. : 14/839679
DATED : June 20, 2017
INVENTOR(S) : Sanjiv Sirpal et al.

It is certified that error appears in the above-identified patent and that said Letters Patent is hereby corrected as shown below:

Claim 1, Column 51, Line 36, replace "user," with --user;--.
Claim 1, Column 51, Line 41, replace "while based" with --while organized based--.
Claim 12, Column 52, Line 11, replace "sub service" with --subservice--.
Claim 12, Column 52, Line 43, replace "use-defined" with --user-defined--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*